(12) United States Patent
Teraguchi et al.

(10) Patent No.: US 11,772,527 B2
(45) Date of Patent: Oct. 3, 2023

(54) SEAT RECLINING DEVICE FOR VEHICLE

(71) Applicant: TOYOTA BOSHOKU KABUSHIKI KAISHA, Aichi-ken (JP)

(72) Inventors: Hiroaki Teraguchi, Aichi-ken (JP); Takeshi Nishiura, Aichi-ken (JP); Naoaki Hoshihara, Aichi-ken (JP)

(73) Assignee: TOYOTA BOSHOKU KABUSHIKI KAISHA, Aichi-ken (JP)

( * ) Notice: Subject to any disclaimer, the term of this patent is extended or adjusted under 35 U.S.C. 154(b) by 84 days.

(21) Appl. No.: 17/439,256

(22) PCT Filed: Apr. 24, 2020

(86) PCT No.: PCT/JP2020/017855
§ 371 (c)(1),
(2) Date: Sep. 14, 2021

(87) PCT Pub. No.: WO2020/218589
PCT Pub. Date: Oct. 29, 2020

(65) Prior Publication Data
US 2022/0219579 A1 Jul. 14, 2022

(30) Foreign Application Priority Data

Apr. 25, 2019 (JP) .............................. 2019-084148
Mar. 3, 2020 (JP) .............................. 2020-035602

(51) Int. Cl.
*B60N 2/235* (2006.01)

(52) U.S. Cl.
CPC ........... *B60N 2/235* (2013.01); *B60N 2/2356* (2013.01)

(58) Field of Classification Search
CPC .............................. B60N 2/2356; B60N 2/236
See application file for complete search history.

(56) References Cited

U.S. PATENT DOCUMENTS

2004/0066078 A1   4/2004   Matsuura et al.
2011/0148169 A1   6/2011   Villarroel
(Continued)

FOREIGN PATENT DOCUMENTS

DE   102012005963 B3 *   2/2013   ............... B60N 2/02
DE   202014002033 U1 *   5/2014   ............ B60N 2/2356
(Continued)

OTHER PUBLICATIONS

International Search Report issued in International Patent Application No. PCT/JP2020/017855, dated Jul. 21, 2020 (with translation).
(Continued)

*Primary Examiner* — Timothy J Brindley
(74) *Attorney, Agent, or Firm* — Greenblum & Bernstein, P.L.C.

(57) ABSTRACT

A seat reclining device includes a ratchet and a guide assembled to be rotatable relative to each other, a pawl capable of restricting relative rotation between the ratchet and the guide, and a rotation cam that pushes and moves the pawl. The pawl has an eccentric structure in which the pawl is pressed and inclined to one side in the rotation direction due to a pressing force received from the rotation cam, and has a first protrusion that restricts the inclination of the pawl by contact with a guide wall that the first protrusion faces.

7 Claims, 40 Drawing Sheets

(56) References Cited

U.S. PATENT DOCUMENTS

| | | |
|---|---|---|
| 2015/0035339 A1 | 2/2015 | Endou et al. |
| 2017/0334321 A1 | 11/2017 | Suzuki et al. |
| 2018/0009340 A1 | 1/2018 | Nagura et al. |
| 2020/0282879 A1* | 9/2020 | Schmitz ................. B60N 2/236 |

FOREIGN PATENT DOCUMENTS

| | | | | |
|---|---|---|---|---|
| DE | 102013210774 A1 * | 12/2014 | ........... | B60N 2/2356 |
| DE | 102019204341 A1 * | 10/2020 | | |
| EP | 3293041 A1 * | 3/2018 | ............... | A47C 7/00 |
| JP | 2004-357799 A | 12/2004 | | |
| JP | 2014-217662 A | 11/2014 | | |
| JP | 2015-029635 A | 2/2015 | | |
| JP | 2015-227071 A | 12/2015 | | |
| JP | 2017-210022 A | 11/2017 | | |
| KR | 20140001651 A * | 1/2014 | | |
| WO | WO2016-129423 A1 | 8/2016 | | |

OTHER PUBLICATIONS

Written Opinion issued in International Patent Application No. PCT/JP2020/017855, dated Jul. 21, 2020.
Office Action in the counterpart Japanese patent application No. 2020-035602, dated Jun. 20, 2023 (and its English translation).

\* cited by examiner

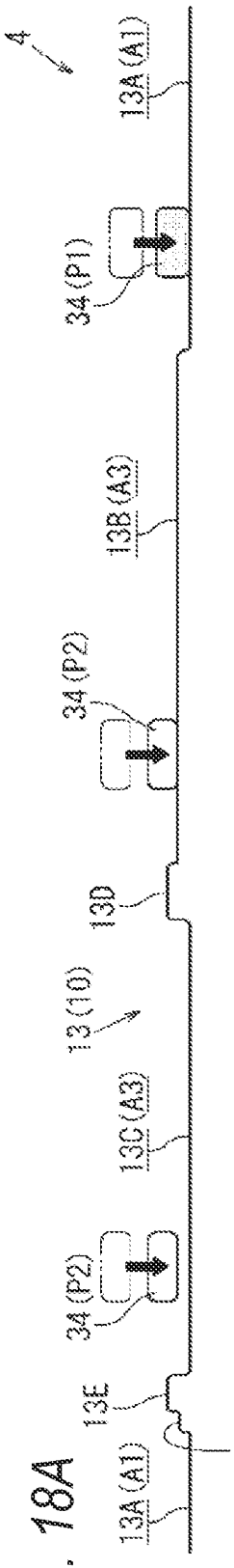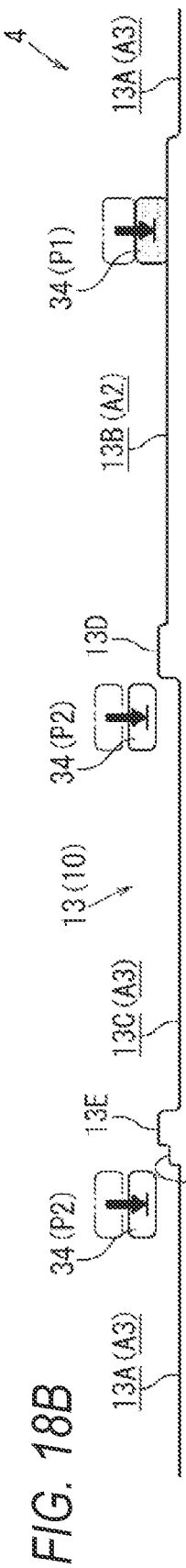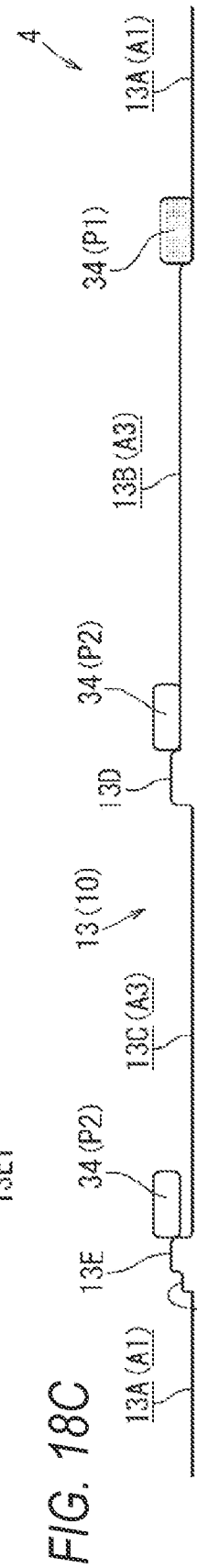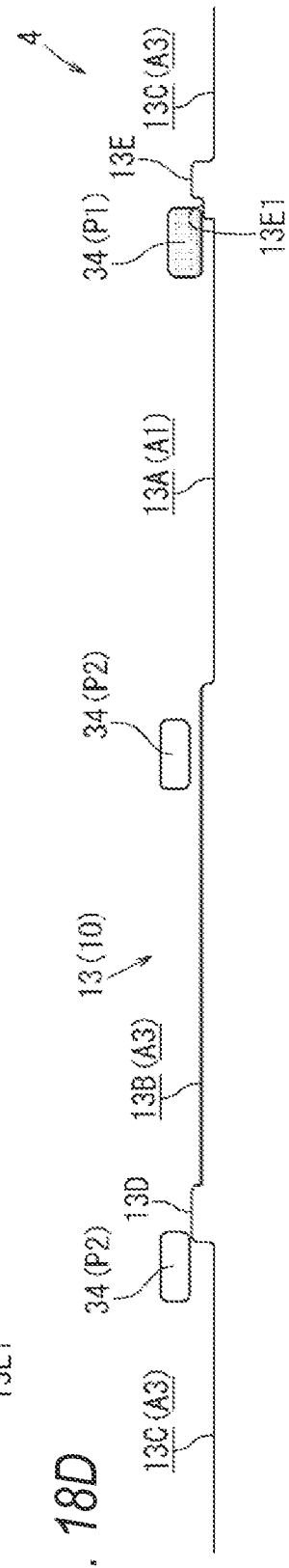

SEAT RECLINING DEVICE FOR VEHICLE

TECHNICAL FIELD

The present invention relates to a seat reclining device for a vehicle. Specifically, the present invention relates to a vehicle seat reclining device for adjusting an inclination angle of a seat back.

BACKGROUND ART

In the related art, there is known a vehicle seat reclining device including a stepped lock mechanism capable of adjusting a backrest angle of a seat back by a constant pitch angle (Patent Literature 1). The vehicle seat reclining device is a joint device that couples the seat back to a seat cushion such that the backrest angle is adjustable. Specifically, the vehicle seat reclining device includes a ratchet and a guide that are constituted by substantially disk-shaped metal members assembled to be rotatable relative to each other, and a lock mechanism that locks the relative rotation between the ratchet and the guide.

The lock mechanism is configured such that a plurality of pawls set on the guide are biased and thereby pressed against and meshed with inner circumferential teeth formed on an outer circumferential portion of the ratchet, thereby locking the relative rotation between the ratchet and the guide. Each of the pawls is supported by the guide from both sides in a rotation direction and is guided to be movable only inward and outward in a radial direction.

CITATION LIST

Patent Literature

Patent Literature 1: WO 2016/129423

SUMMARY OF INVENTION

Technical Problem

In order to ensure a sliding performance of each pawl, it is necessary to set a slight gap in the rotation direction between each pawl and each guide wall of the guide that supports the pawl from both sides in the rotation direction. However, when the gap is large, a posture of each pawl may be unstable (that is, so-called "rattling" occurs) due to inclination of each pawl between the guide walls. One object of the present invention is to provide a vehicle seat reclining device capable of ensuring a sliding performance of a pawl and preventing rattling at the same time.

Solution to Problem

[1] In a first aspect of the present invention, a vehicle seat reclining device includes:
a ratchet and a guide assembled in an axial direction to be rotatable relative to each other;
a pawl supported from both sides in a rotation direction by a pair of guide walls provided on the guide, and configured to be meshed with the ratchet due to movement in which the pawl is pressed outward in a radial direction, so as to restrict the relative rotation between the ratchet and the guide; and
a cam configured to press and move the pawl outward from an inner side in the radial direction, wherein
the pawl has an eccentric structure in which the pawl is pressed and inclined to one side in the rotation direction between the pair of guide walls due to a pressing force received from the cam, and has a first protrusion that projects from a side surface of the pawl on the one side in the rotation direction and restricts the inclination of the pawl by contact with the guide wall that the first protrusion faces.

According to the first aspect, although a gap in the rotation direction is provided between the pawl and each guide wall, the inclination of the pawl in the gap can be restricted by the contact between the first protrusion and the guide wall. Therefore, the sliding performance of the pawl can be ensured and the rattling can be prevented at the same time.

[2] In a second aspect of the present invention according to the first aspect,
the pawl has a second protrusion that projects from a side surface of the pawl on the other side in the rotation direction and holds, by contact with the guide wall that the second protrusion faces, the pawl in a posture in which the pawl is in contact with both of the pair of guide walls.

According to the second aspect, the pawl can be abutted against both of the guide walls and held in a state in which the gap in the rotation direction is eliminated, and the rattling of the pawl can be eliminated more appropriately.

[3] In a third aspect of the present invention according to the second aspect,
the second protrusion is located outward in the radial direction than the first protrusion.

According to the third aspect, the second protrusion can be abutted against the guide wall at a relatively early stage and restrict the inclination of the pawl when the pawl is inclined, with an abutting point between the first protrusion and the guide wall as a base point, in a direction to close the gap between the guide wall and the other side surface of the pawl on an outer circumferential side close to the meshing portion with the ratchet.

[4] In a fourth aspect of the present invention according to the second aspect or the third aspect,
the pawl has a main body surface portion that receives, from the inner side in the radial direction, the pressing force from the cam, and an offset surface portion that has a shape of being extruded from the main body surface portion into a half-punched shape in the axial direction and is disposed adjacently with the cam in the axial direction, and
the second protrusion has a shape in which a slope of the second protrusion extends over at least an entire area of the main body surface portion on the side surface of the pawl on the other side in the rotation direction.

According to the fourth aspect, structural strength of the second protrusion can be increased as compared with a configuration in which the second protrusion is partially formed on the other side surface of the pawl in the rotation direction. Further, the second protrusion can be simply shaped.

[5] In a fifth aspect of the present invention according to any one of the first aspect to the fourth aspect,
a plurality of pawls are provided, and
the first protrusion is formed on a specific pawl among the plurality of pawls.

According to the fifth aspect, the rattling of the pawls can be reasonably prevented.

[6] In a sixth aspect of the present invention according to any one of the first aspect to the fifth aspect,
the pawl has a main body surface portion that receives, from the inner side in the radial direction, the pressing force from the cam, and an offset surface portion that has a shape of being extruded from the main body surface portion into a half-punched shape in the axial direction and is disposed adjacently with the cam in the axial direction, and the first protrusion has a shape in which a slope of the first protrusion extends over at least an entire area of the main body surface portion on the side surface of the pawl on the one side in the rotation direction.

According to the sixth aspect, structural strength of the first protrusion can be increased as compared with a configuration in which the first protrusion is partially formed on the one side surface of the pawl in the rotation direction. Further, the first protrusion can be simply shaped.

[7] In a seventh aspect of the present invention, a vehicle seat reclining device includes:

a ratchet and a guide assembled in an axial direction to be rotatable relative to each other;

a pawl supported from both sides in a rotation direction by a pair of guide walls provided on the guide, and configured to be meshed with the ratchet due to movement in which the pawl is pressed outward in a radial direction, so as to restrict the relative rotation between the ratchet and the guide;

a cam configured to press and move the pawl outward from an inner side in the radial direction;

an eccentric structure in which the pawl is pressed and inclined to one side in the rotation direction between the pair of guide walls due to a pressing force received from the cam; and a first protrusion configured to project from the guide wall that faces a side surface of the pawl on the one side in the rotation direction and restrict the inclination of the pawl by contact with the pawl.

According to the seventh aspect, although a gap in the rotation direction is provided between the pawl and each guide wall, the inclination of the pawl in the gap can be restricted by the contact between the first protrusion and the pawl. Therefore, the sliding performance of the pawl can be ensured and the rattling can be prevented at the same time.

[8] In an eighth aspect of the present invention according to the seventh aspect, the vehicle seat reclining device further includes a second protrusion configured to project from the guide wall that faces a side surface of the pawl on the other side in the rotation direction and restrict the inclination of the pawl by contact with the pawl, so as to hold the pawl in a posture in which the pawl is in contact with both of the pair of guide walls.

According to the eighth aspect, the pawl can be abutted against both of the guide walls and held in a state in which the gap in the rotation direction is eliminated, and the rattling of the pawl can be prevented more appropriately.

[9] In a ninth aspect of the present invention according to the eighth aspect, the second protrusion has a shape in which a slope of the second protrusion extends over an entire area of a side surface of the guide wall that faces the pawl.

According to the ninth aspect, structural strength of the second protrusion can be increased as compared with a configuration in which the second protrusion is partially formed on the guide wall. Further, the second protrusion can be simply shaped.

[10] In a tenth aspect of the present invention according to any one of the seventh aspect to the ninth aspect, the first protrusion has a shape in which a slope of the first protrusion extends over an entire area of a side surface of the guide wall that faces the pawl.

According to the tenth aspect, structural strength of the first protrusion can be increased as compared with a configuration in which the first protrusion is partially formed on the guide wall. Further, the first protrusion can be simply shaped.

BRIEF DESCRIPTION OF DRAWINGS

FIGS. 18A to 18D are schematic diagrams each showing a positional relation between an abutting protrusion of each pawl and a projecting portion of the ratchet in each of FIGS. 17A to 17D.

DESCRIPTION OF EMBODIMENTS

Figure 1:
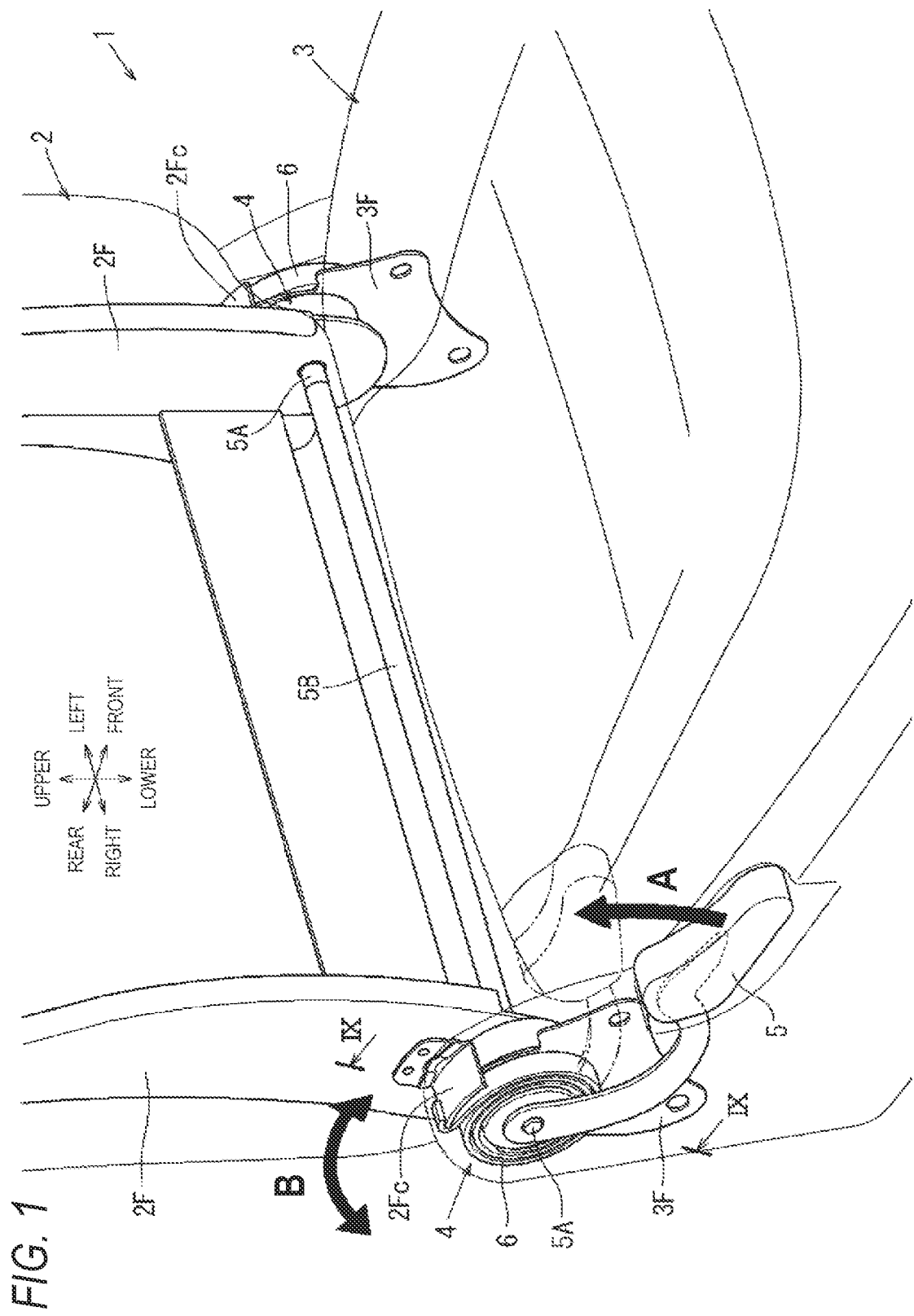
FIG. 1 is a perspective view showing a schematic configuration of a vehicle seat to which a vehicle seat reclining device according to a first embodiment is applied.

Embodiments of the present invention will be described below with reference to the drawings.

First Embodiment

Schematic Configuration of Seat Reclining Device 4 (Vehicle Seat Reclining Device)

First, a configuration of a seat reclining device 4 according to a first embodiment of the present invention will be described with reference to FIGS. 1 to 36. In the following description, directions such as front, rear, upper, lower, left, and right directions, indicate the directions shown in the drawings. Further, a "seat width direction" indicates a left-right direction of a seat 1 to be described later.

As shown in FIG. 1, the seat reclining device 4 of the present embodiment is applied to the seat 1 constituting a right seat of an automobile. The seat reclining device 4 is configured as a reclining adjustment mechanism that couples a seat back 2 constituting a backrest portion of the seat 1 to a seat cushion 3 constituting a seating portion, in a state in which a backrest angle is adjustable. Specifically, a pair of left and right seat reclining devices 4 are provided between the seat back 2 and the seat cushion 3. The seat reclining devices 4 are configured to fix and release the backrest angle of the seat back 2 by being switched at the same time to locked and unlocked states.

Figure 2:
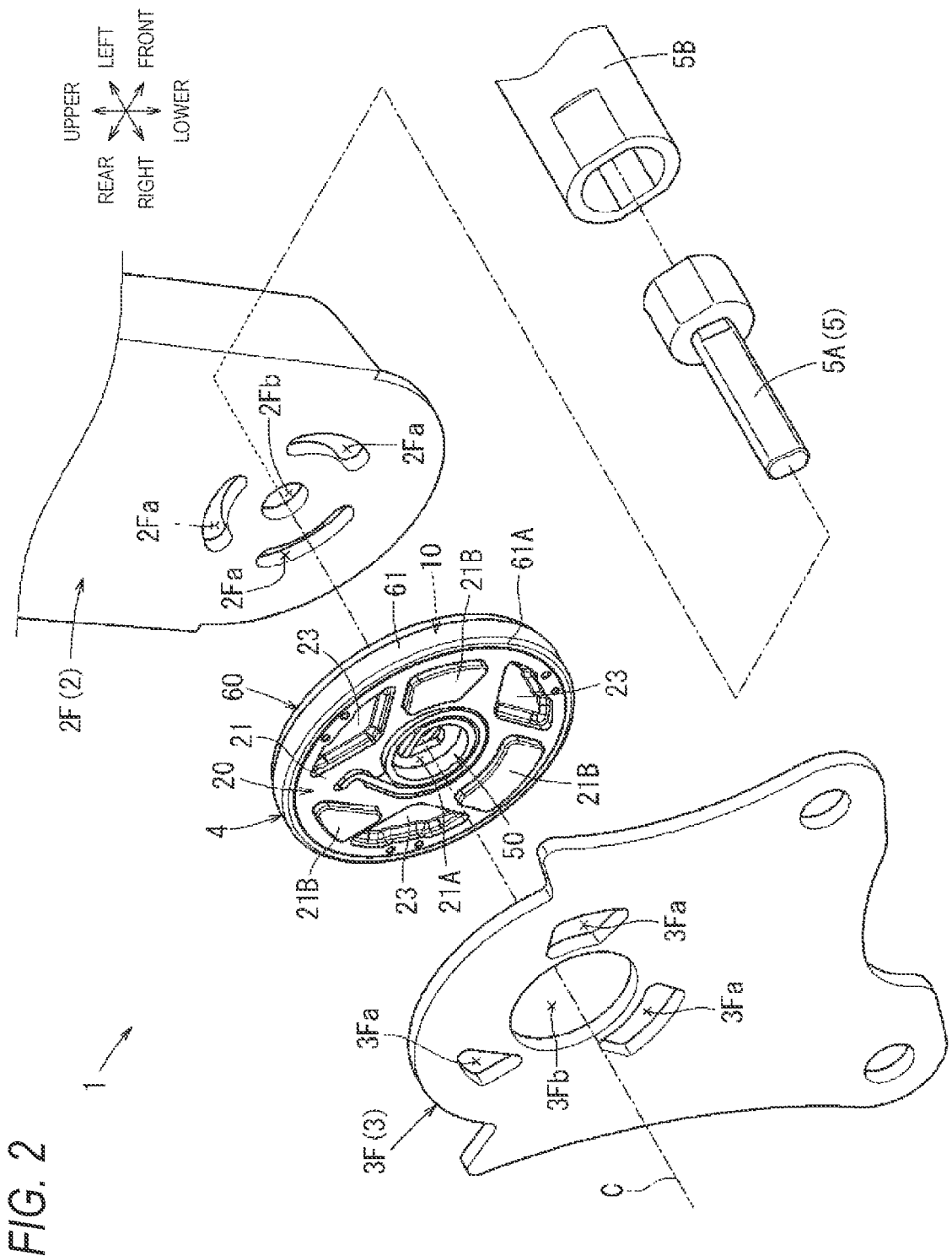
FIG. 2 is an exploded perspective view showing a main part of FIG. 1.
Figure 3:
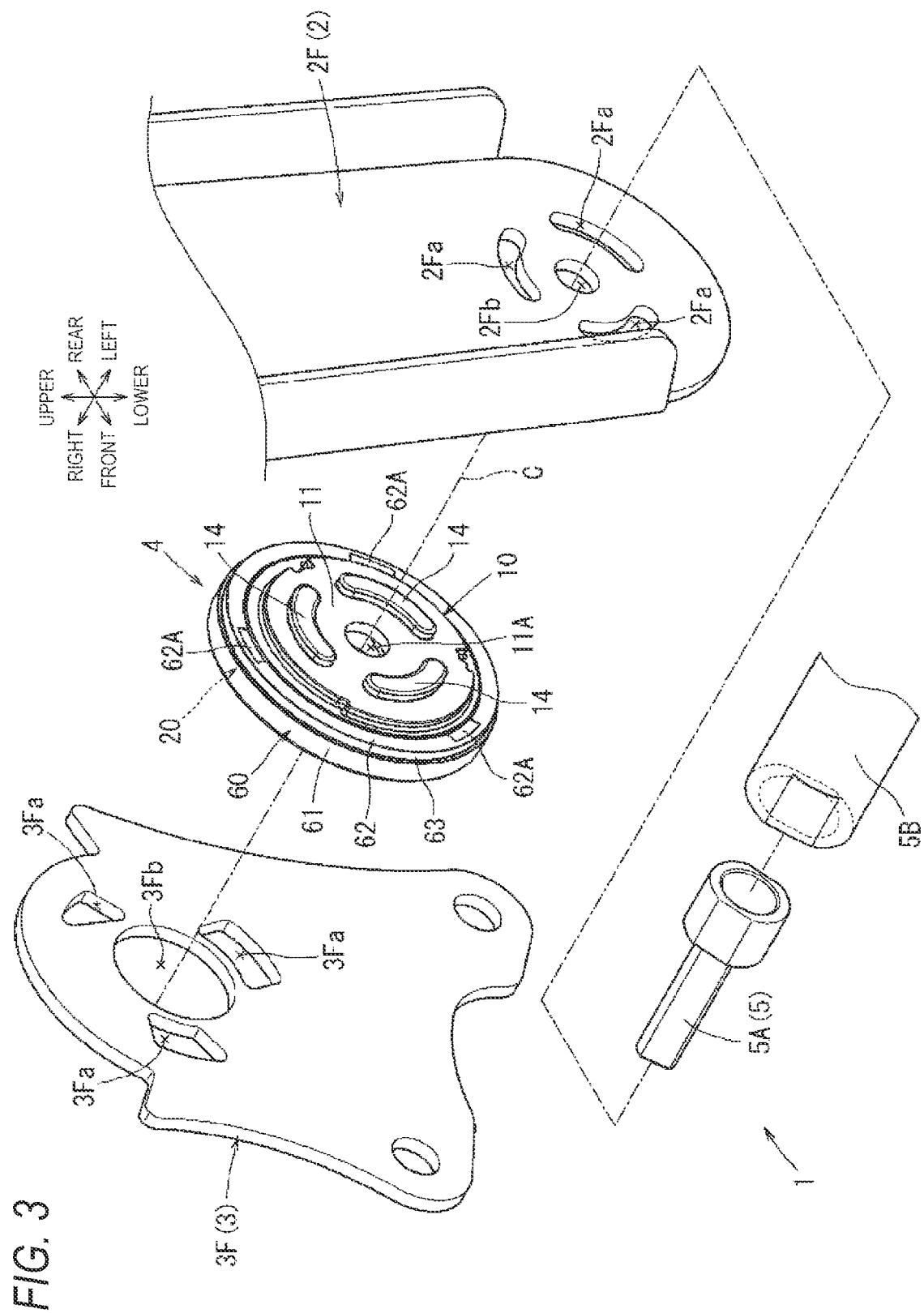
FIG. 3 is an exploded perspective view as viewed from a side opposite to that of FIG. 2.

Specifically, as shown in FIGS. 2 and 3, the seat reclining devices 4 are respectively interposed between lower end portions of side frames 2F constituting left and right side frameworks of the seat back 2 and reclining plates 3F coupled to rear end portions of left and right side frameworks of the seat cushion 3. The reclining plates 3F are located outward of the lower end portions of the side frames 2F in the seat width direction. The seat reclining devices 4 are coupled in a state of being coaxially rotatable relative to each other or prevented from rotating.

As shown in FIG. 1, the seat reclining devices 4 are normally held in the locked state in which the backrest angle of the seat back 2 is fixed. The seat reclining devices 4 are released from the locked state at the same time by an operation (Arrow A of FIG. 1) of a user pulling up a reclining lever 5 provided on a side portion on a vehicle outer side (right side) of the seat cushion 3. Accordingly, the seat reclining devices 4 are switched to the unlocked state in which the backrest angle of the seat back 2 is adjustable in a seat front-rear direction. When the operation of the reclining lever 5 is returned, the seat reclining devices 4 are biased and returned to the locked state again.

Return springs 6 for applying spring biasing forces in a direction in which the seat back 2 is tilted forward and rotated are respectively hooked between the left and right side frames 2F of the seat back 2 and the reclining plates 3F located outward of the side frames 2F. When the fixed state of the backrest angle fixed by the seat reclining devices 4 is released, the seat back 2 is raised to a position, at which the seat back 2 is abutted with a back of a seated occupant, due to the rotational biasing forces of the return springs 6.

Figure 21:
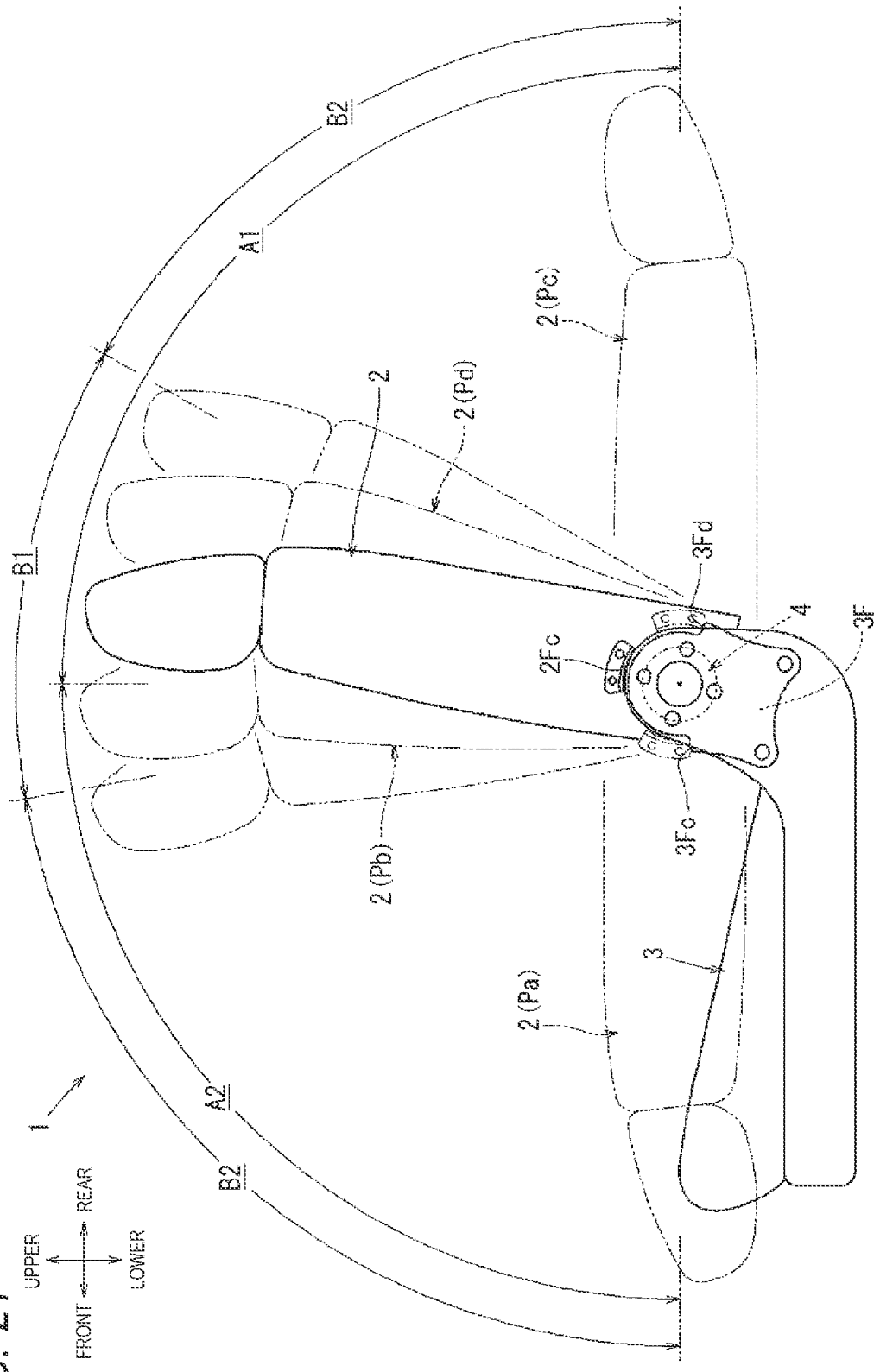
FIG. 21 is a side view showing an angle adjustment range of a seat back.

Then, the backrest angle of the seat back 2 is freely adjusted back and forth according to movement (Arrow B in FIG. 1) in which the back of the seated occupant is tilted back and forth. Thus, the backrest angle of the seat back 2 can be easily adjusted by providing the return springs 6 for applying biasing forces in a forward rotation direction to the seat back 2. Specifically, as shown in FIG. 21, the seat back 2 can be rotated in a seat front-rear direction in a rotation region of about 180 degrees between a forward tilt position Pa at which the seat back 2 is folded on an upper surface of the seat cushion 3 and a rearward tilt position Pc at which the seat back 2 is tilted rearward substantially horizontally.

A structure for locking the seat back 2 to the forward tilt position Pa is a structure in which locking plates 2Fc, which are coupled to outer surface portions of the side frames 2F of the seat back 2 are abutted against and locked to front stoppers 3Fc which are formed by projecting from front edge portions of the reclining plates 3F. A structure for locking the seat back 2 to the rearward tilt position Pc is a structure in which the locking plates 2Fc, which are coupled to the outer surface portions of the side frames 2F of the seat back 2, are abutted against and locked to rear stoppers 3Fd which are formed by projecting from rear edge portions of the reclining plates 3F.

Here, in the rotation region of the seat back 2, a rotation region in which the backrest angle of the seat back 2 is changed by about 90 degrees from an initial lock position Pb at which the seat back 2 stands up substantially vertically to the rearward tilt position Pc is set as a "lock region A1" in which the backrest angle of the seat back 2 is returned to the fixed state by releasing the operation of pulling up the reclining lever 5. Further, a rotation region in which the backrest angle of the seat back 2 is changed by about 90 degrees from the initial lock position Pb to the forward tilt position Pa is set as a "free region A2", in which the angle of the seat back 2 is not fixed but maintained in a released state (a state in which the lock is disabled) even when the operation of pulling up the reclining lever 5 is released.

The lock region A1 and the free region A2 are set to-be-described functions of the seat reclining devices 4. By setting the free region A2, when the reclining lever 5 is operated and the seat back 2 is tilted forward to a position where the seat back 2 enters the free region A2 in a state in which no person is seated in the seat 1, the seat back 2 is naturally tilted to the forward tilt position Pa even when the operation of the reclining lever 5 is not continued.

Specifically, as shown in FIGS. 2 and 3, the seat reclining device 4 includes a ratchet 10 (see FIG. 2) integrally coupled to the outer surface portion of the side frame 2F on each side of the seat back 2, and a guide 20 (see FIG. 3) integrally coupled to an inner surface portion of the reclining plate 3F on each side. The seat reclining devices 4 are configured to fix and release the backrest angle of the seat back 2 by being switched to lock and release the relative rotation between the ratchet 10 and the guide 20.

Configurations of Components of Seat Reclining Device 4

Hereinafter, configurations of components of the pair of left and right seat reclining devices 4 will be described in detail. The seat reclining devices 4 are bilaterally symmetrical to each other and have the same configuration. Therefore, hereinafter, as an example, a configuration of the seat reclining device 4 disposed on the vehicle outer side (right side) shown in FIGS. 2 and 3 will be described in detail.

Figure 4:
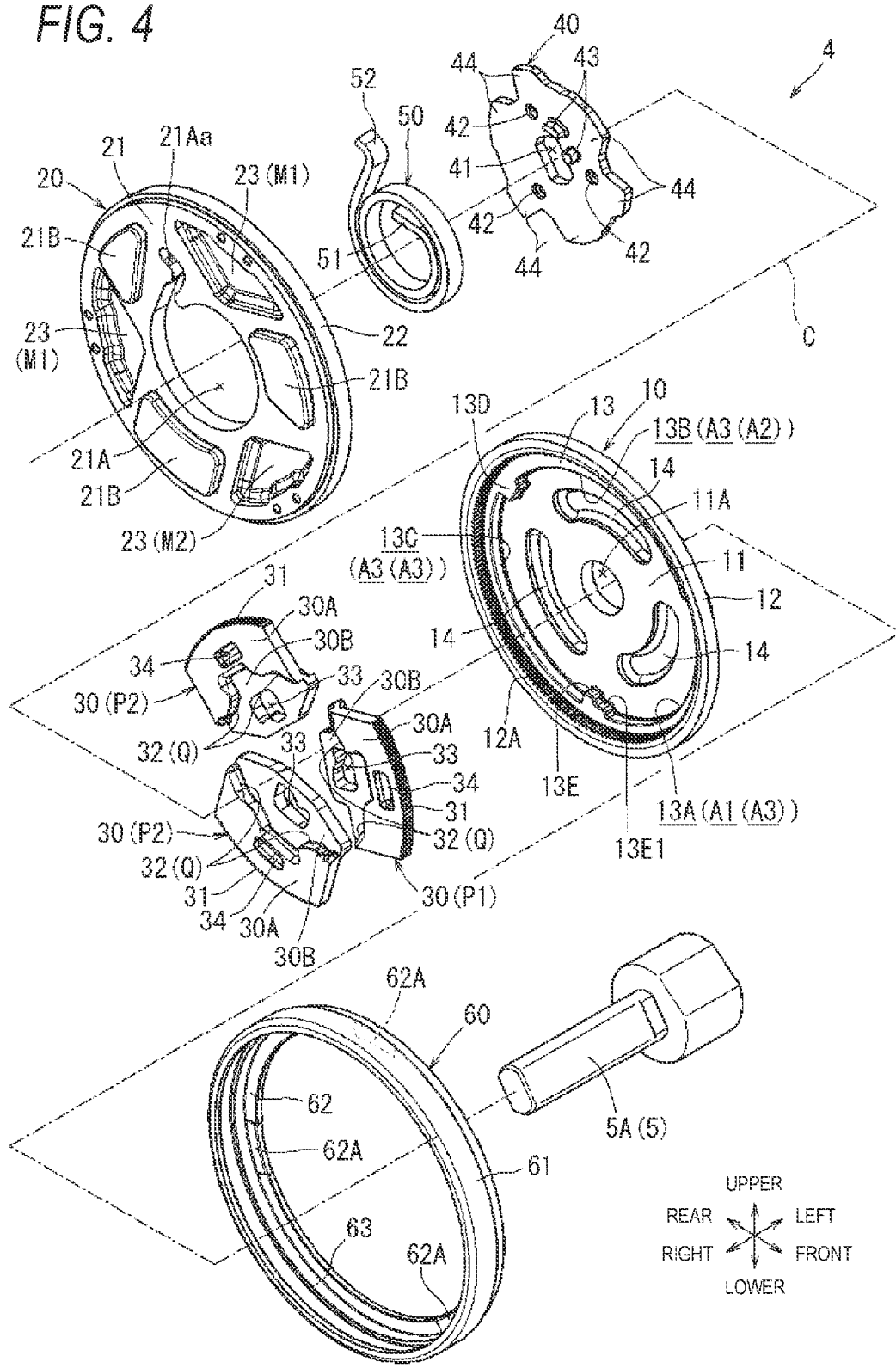
FIG. 4 is an exploded perspective view of the vehicle seat reclining device.
Figure 5:
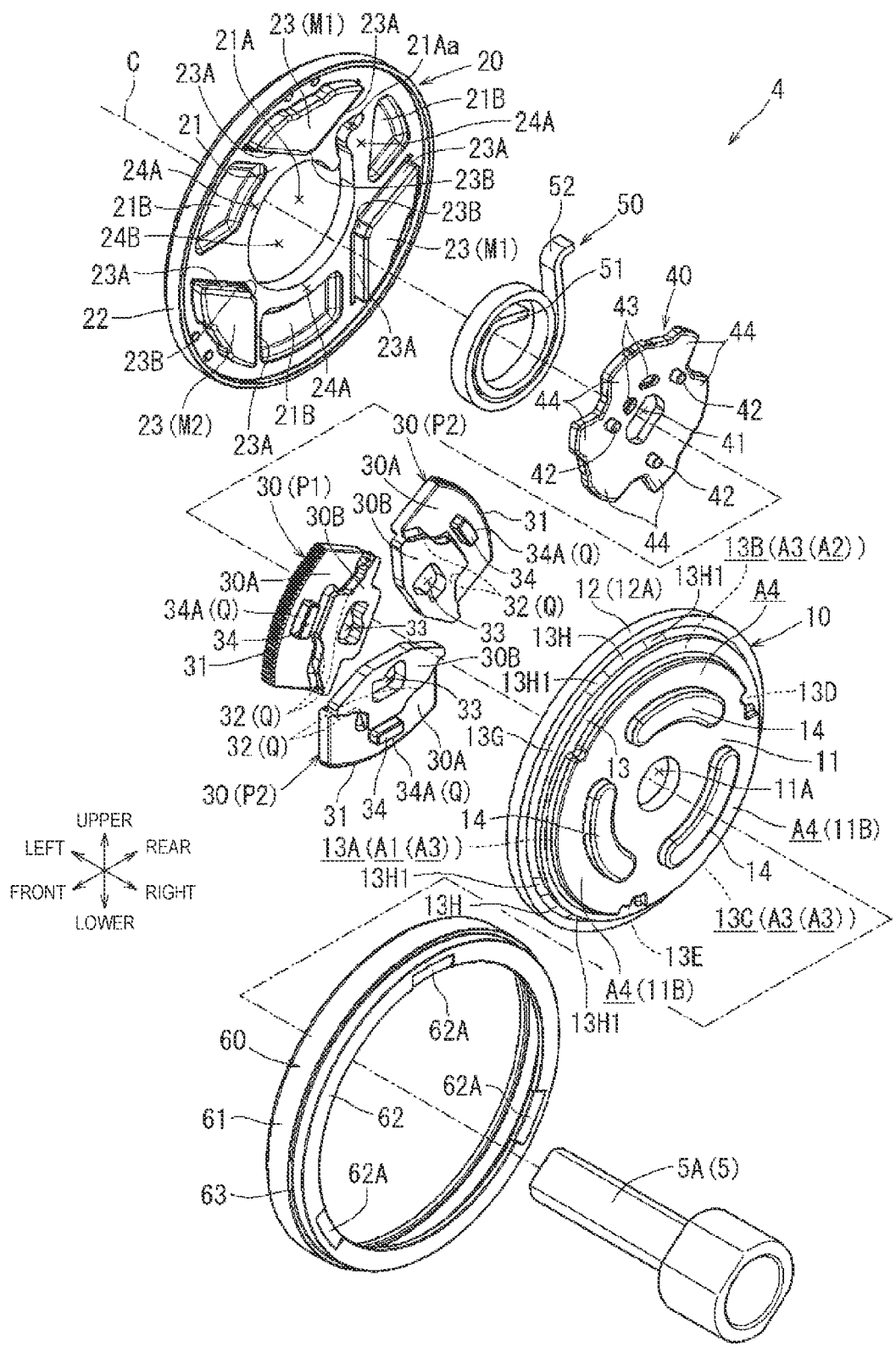
FIG. 5 is an exploded perspective view as viewed from a side opposite to that of FIG. 4.

As shown in FIGS. 4 and 5, the seat reclining device 4 includes the substantially circular plate-shaped ratchet 10 and guide 20 which are assembled to each other in an axial direction, three pawls 30 assembled between the ratchet 10 and the guide 20, and a rotation cam 40 that moves the pawls 30 inward and outward in a radial direction. Further, the seat reclining device 4 includes a lock spring 50 (spiral spring) that biases the rotation cam 40 relative to the guide 20 in a lock rotation direction, and a substantially cylindrical outer circumferential ring 60 that is mounted across outer circumferential portions of the ratchet 10 and the guide 20.

The outer circumferential ring 60 functions as a holding member that holds the ratchet 10 and the guide 20 in a state of being assembled to each other in the axial direction. Here, the rotation cam 40 corresponds to a "cam" of the present invention. Each of the ratchet 10, the guide 20, the three pawls 30, and the rotation cam 40 is hardened by quenching processing after press shaping and has high structural strength.

Ratchet 10

As shown in FIG. 4, the ratchet 10 is formed by cutting one metal plate member into a substantially disk shape and extruding the substantially disk-shaped plate member into a half-punched shape in a plate thickness direction (axial direction) at some positions. Specifically, the ratchet 10 is configured to be formed such that a stepped cylindrical portion projecting in two stages into a stepped cylindrical shape in the axial direction, which is the assembling direction of the ratchet 10 to the guide 20, is extruded in a half-punched shape and formed on an outer circumferential edge portion of a disk main body 11 of the ratchet 10.

A cylindrical part on an outer circumferential side of the stepped cylindrical portion is formed as a cylindrical portion 12 whose entire inner circumferential surface is formed with inner teeth 12A. A cylindrical part on an inner circumferential side is formed as an intermediate cylindrical portion 13 having a projecting length in the axial direction shorter than that of the cylindrical portion 12. The inner teeth 12A of the cylindrical portion 12 is set to a tooth surface shape with which to-be-described outer teeth 31 formed on outer circumferential surface portions of the pawls 30 can be meshed with the inner teeth 12A from an inner side in the radial direction, Specifically, the inner teeth 12A have a shape in which tooth surfaces are arranged at equal intervals at a pitch of two degrees in the rotation direction.

On an inner circumferential surface of the intermediate cylindrical portion 13, three regions (a first region 13A, a second region 13B, and a third region 13C) in which an inner diameter dimension from a rotation center C of the ratchet 10 or a length in the rotation direction are set individually, and a first projection portion 13D and a second projection portion 13E which project inward in the radial direction from boundaries between these regions are formed.

Each of the first region 13A, the second region 13B, and the third region 13C is formed to have an inner circumferential surface shape curving in an arc shape drawn around the rotation center C of the ratchet 10. Specifically, as shown in FIG. 10, the first region 13A and the third region 13C have an inner circumferential surface shape of the same inner diameter dimension slightly larger than that of the second region 13B.

Figure 10:
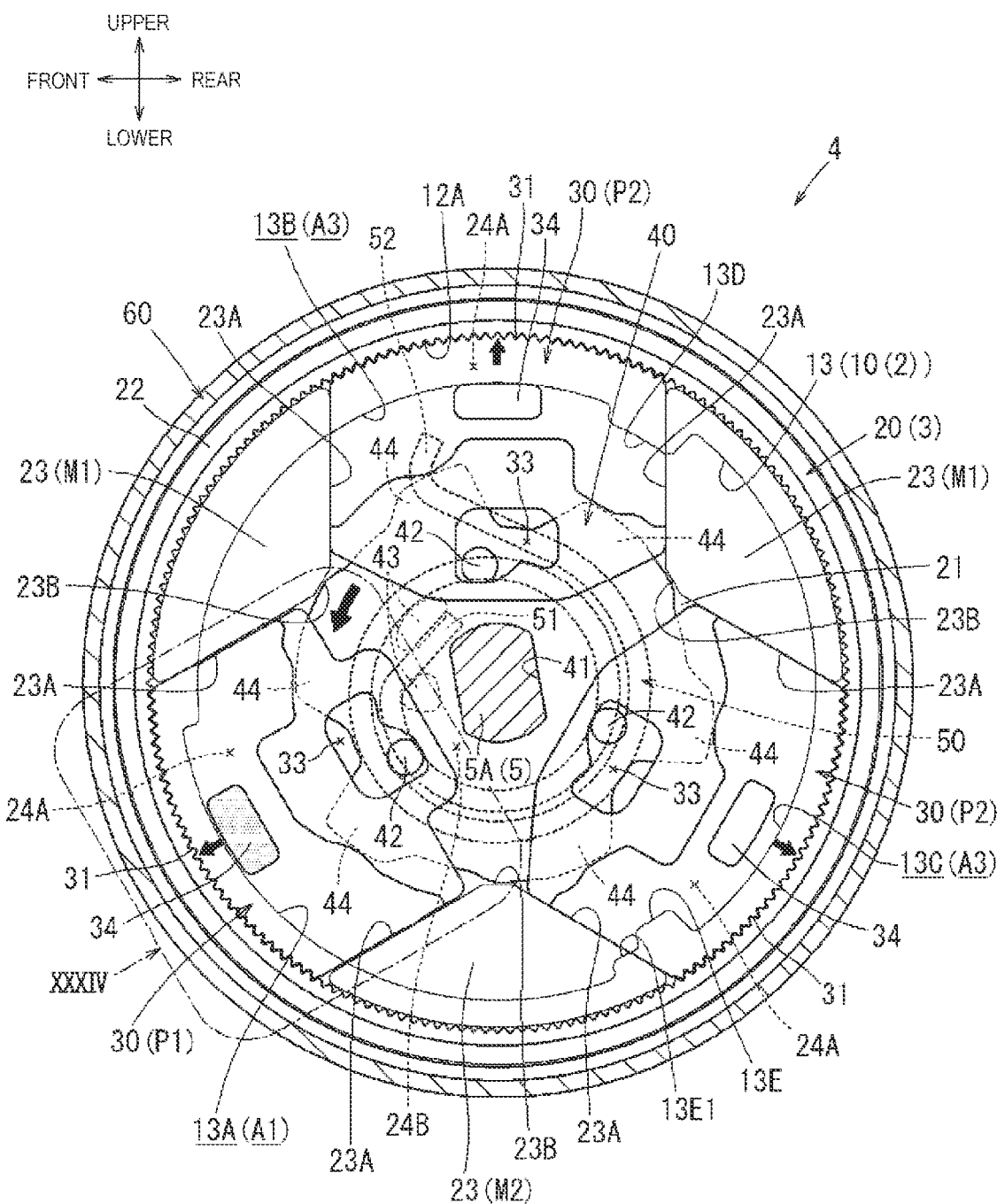
FIG. 10 is a cross-sectional view taken along a line X-X of FIG. 8 and showing a locked state of the vehicle seat reclining device.
Figure 17A:
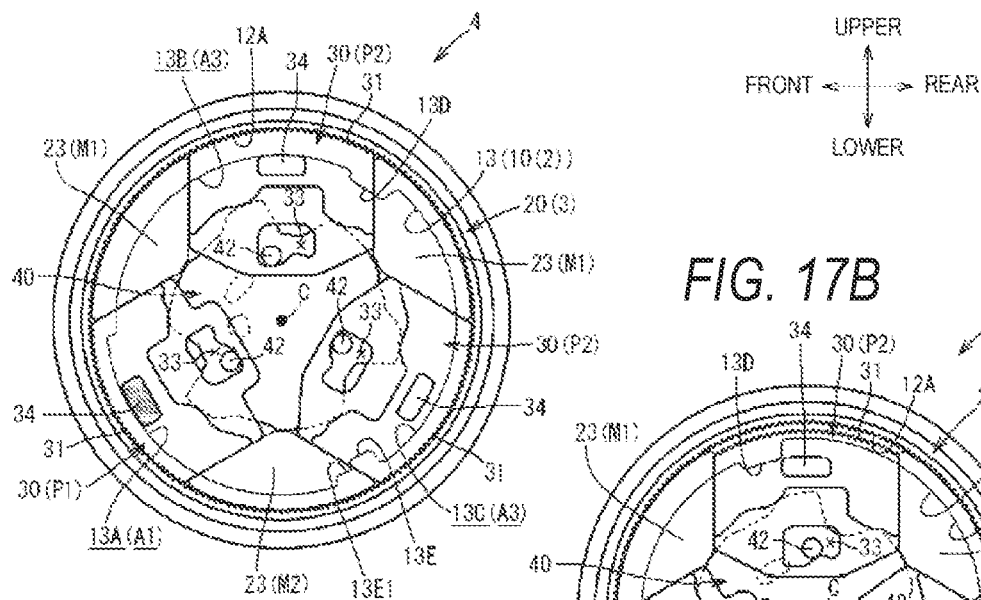
FIGS. 17A to 17D are cross-sectional views showing different cases of a change in the locking operation of each pawl caused by a change in a rotation position of the ratchet.

As shown in FIGS. 10, 17A, and 18A, when the ratchet 10 is at a rotation angle at which the first region 13A overlaps in the rotation direction with a to-be-described main pawl P1 that is one of the three pawls 30, the first region 13A is the lock region A1 in which the main pawl P1 is allowed to mesh with the inner teeth 12A. At this time, the second region 13B and the third region 13C are disposed to overlap with the remaining two sub-pawls P2 in the rotation direction and are set as relief regions A3 in which the sub-pawls P2 are allowed to mesh with the inner teeth 12A. Here, the main pawl P1 corresponds to a "specific pawl" of the present invention.

Figure 12:
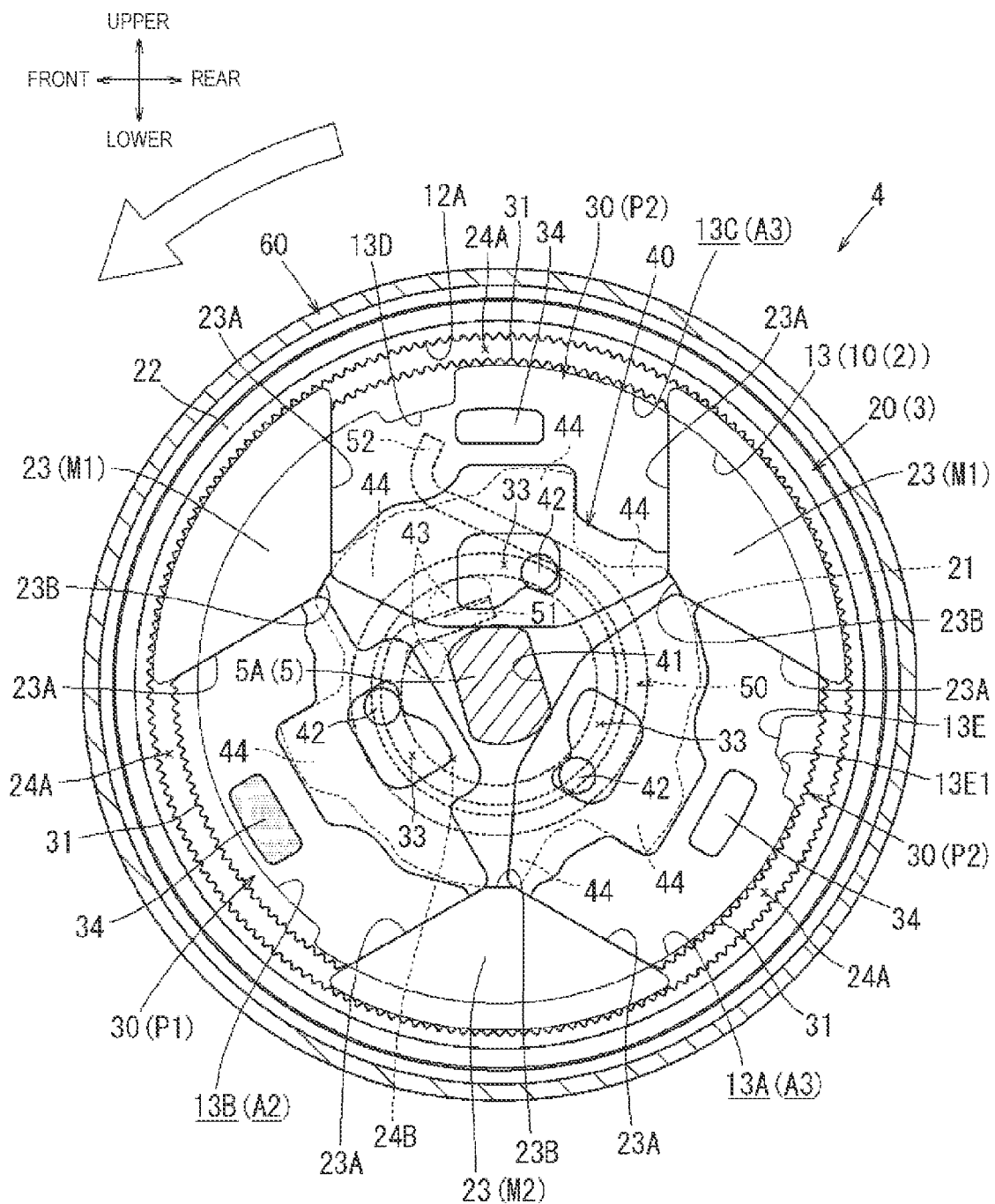
FIG. 12 is a cross-sectional view showing a state in which a ratchet is rotated from FIG. 11 to a free region.
Figure 13:
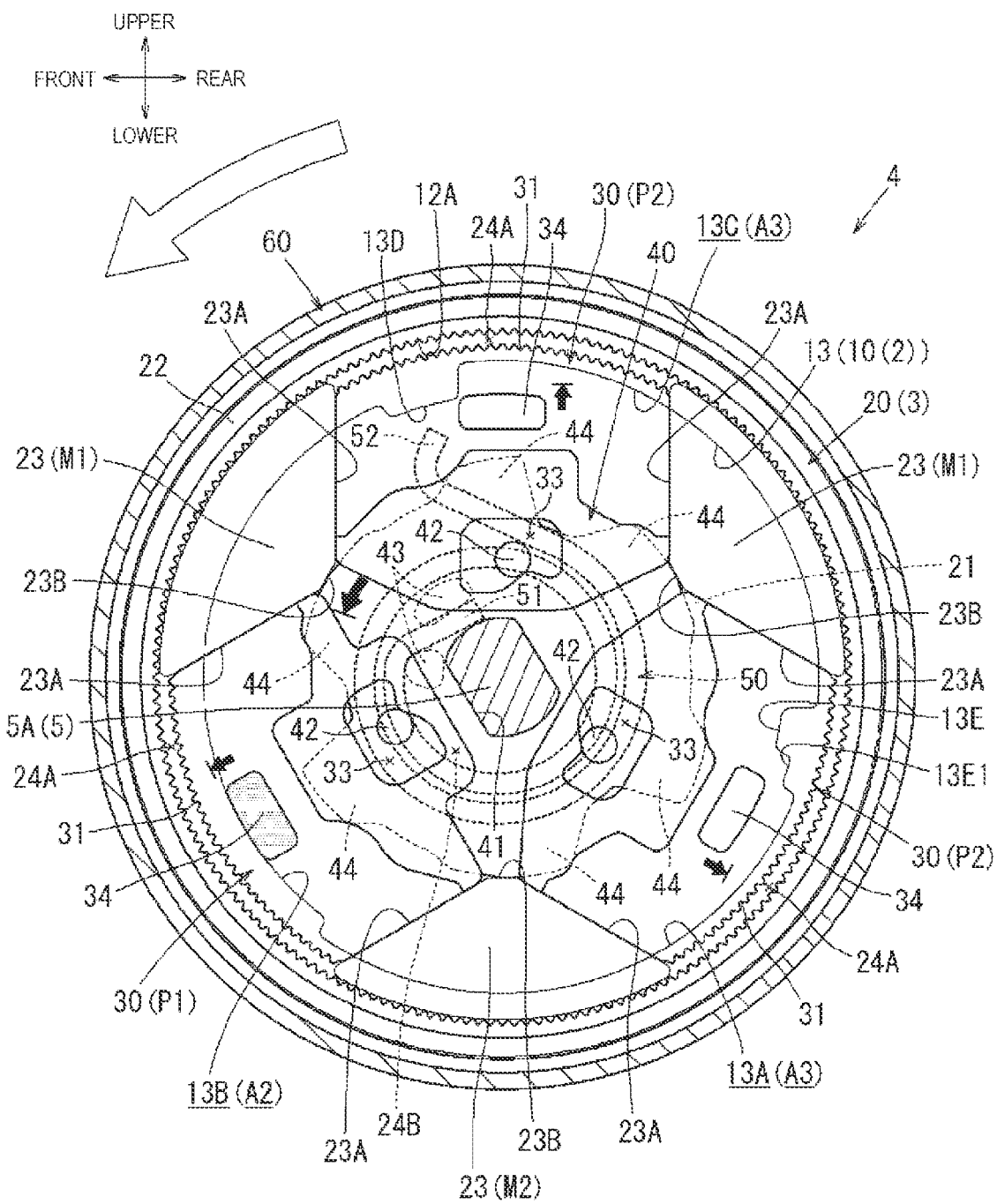
FIG. 13 is a cross-sectional view showing a state in which a locking operation of the vehicle seat reclining device is blocked from FIG. 12.
Figure 17B:
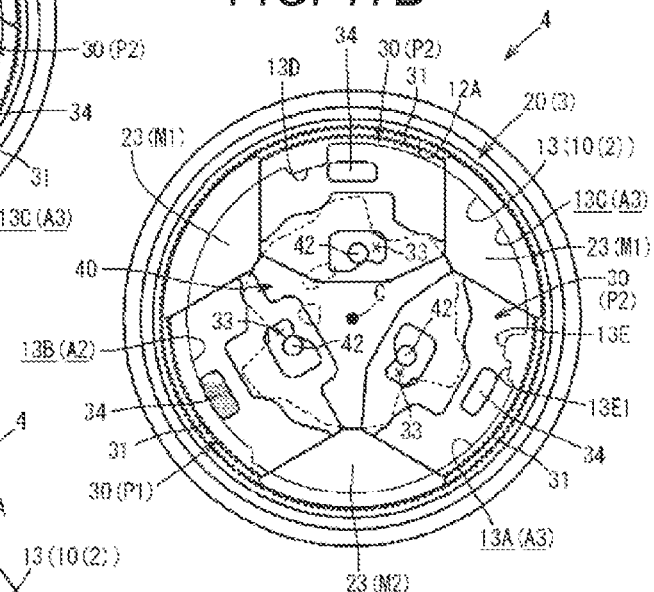

Meanwhile, when the ratchet 10 is at a rotation angle at which the second region 13B overlaps with the main pawl P1 in the rotation direction as shown in FIG. 12, the second region 13B is the free region A2 in which the main pawl P1 rides on the inner circumferential surface and the meshing thereof with the inner teeth 12A is blocked, as shown in FIGS. 13, 17B, and 18B. At this time, the third region 13C and the first region 13A are disposed to overlap with the remaining two sub-pawls P2 in the rotation direction and are set as relief regions A3 in which movement of the sub-pawls P2 are allowed to escape.

That is, the intermediate cylindrical portion 13 of the ratchet 10 is configured to allow the locking operation of the main pawl P1 in the first region 13A as shown in FIG. 10, and block the locking operation of the main pawl P1 in the second region 13B as shown in FIGS. 12 and 13. As shown in FIG. 10, when the locking operation of the main pawl P1 among the pawls 30 is allowed, the locking operation of the remaining two sub-pawls P2 is also allowed. As shown in FIGS. 12 and 13, when the locking operation of the main pawl P1 among the pawls 30 is blocked, the locking operation of the remaining two sub-pawls P2 is also blocked.

In this way, the intermediate cylindrical portion 13 of the ratchet 10 controls allowance and prevention of the locking operation of the main pawl P1 by the first region 13A and the second region 13B. When the first region 13A functions as the lock region A1 (see FIG. 10), the other two regions (second region 13B, third region 13C) function as the relief regions A3 in which the locking operation of the remaining two sub-pawls P2 is allowed. Further, when the second region 13B functions as the free region A2 (see FIG. 13), the other two regions (first region 13A, third region 13C) function as the relief regions A3 in which the movement of the remaining two sub-pawls P2 is released.

Figure 17C:
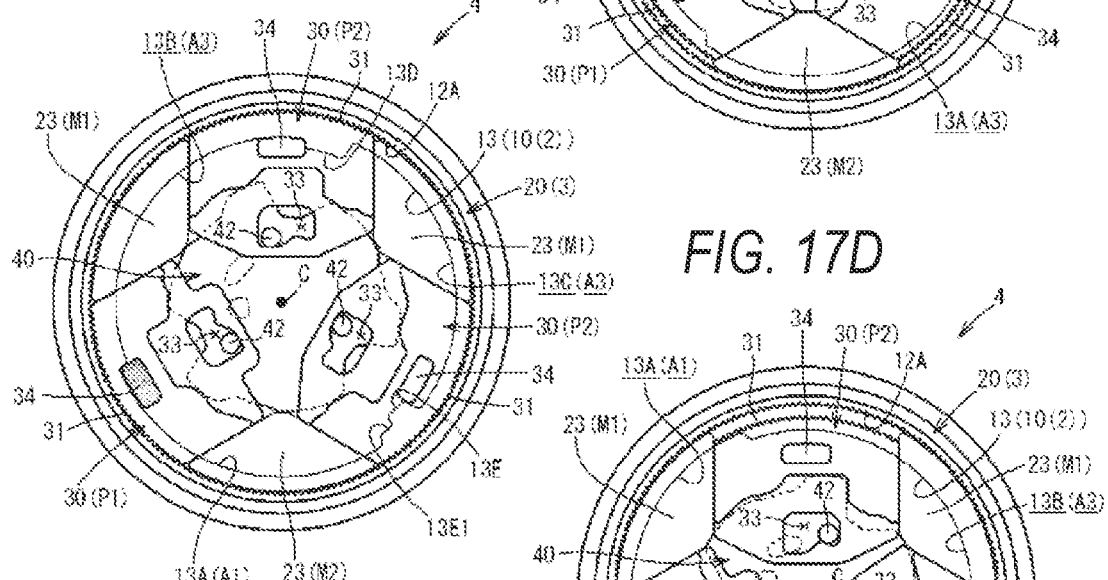

As shown in FIGS. 17C and 18C, when the main pawl P1 moves from the lock region A1 (first region 13A) to the free region A2 (second region 13B) due to the rotation of the ratchet 10, the main pawl P1 may be abutted against a step between the first region 13A and the second region 13B in the rotation direction in a state in which the main pawl P1 is halfway pushed outward in the radial direction. The first projection portion 13D and the second projection portion 13E are respectively formed at positions at which the sub-pawls P2 are abutted against the first projection portion 13D and the second projection portion 13E in the rotation direction at the same time in the above case. Due to the abutment of the sub-pawls P2 at the same time, a load that the main pawl P1 receives when being abutted against the step can also be distributed to the other two sub-pawls P2.

Specifically, the first projection portion 13D and the second projection portion 13E are formed at positions at which, when an abutting protrusion 34 of the main pawl P1 is abutted against the step between the first region 13A and the second region 13B in the rotation direction due to the rotation of the ratchet 10, abutting protrusions 34 of the remaining two sub-pawls P2 are abutted against the first projection portion 13D and the second projection portion 13E in the same rotation direction at the same time. Configurations of the abutting protrusions 34 will be described in detail later.

Figure 14:
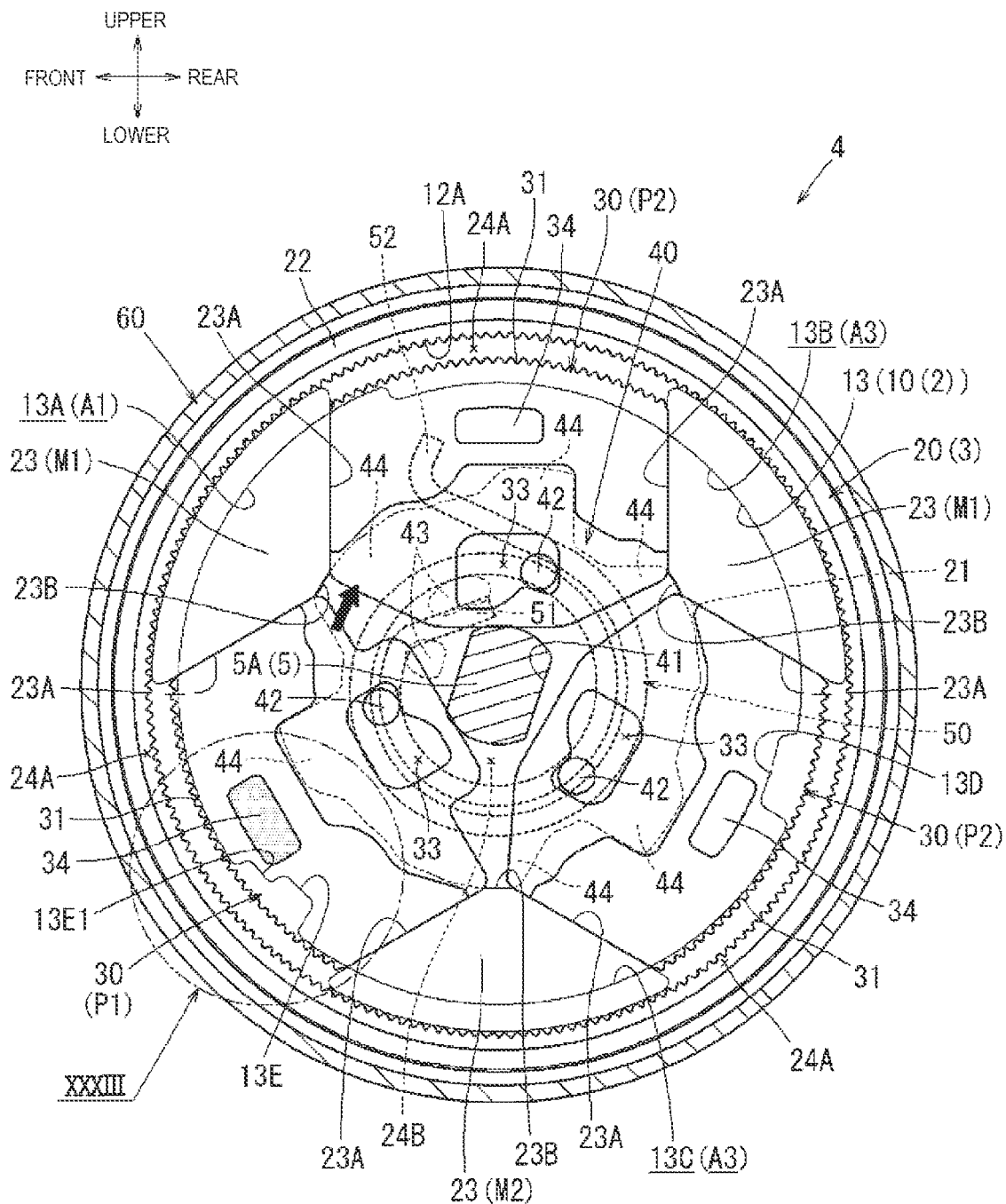
FIG. 14 is a cross-sectional view showing a state in which the ratchet is rotated to a start position of a lock region.
Figure 17D:
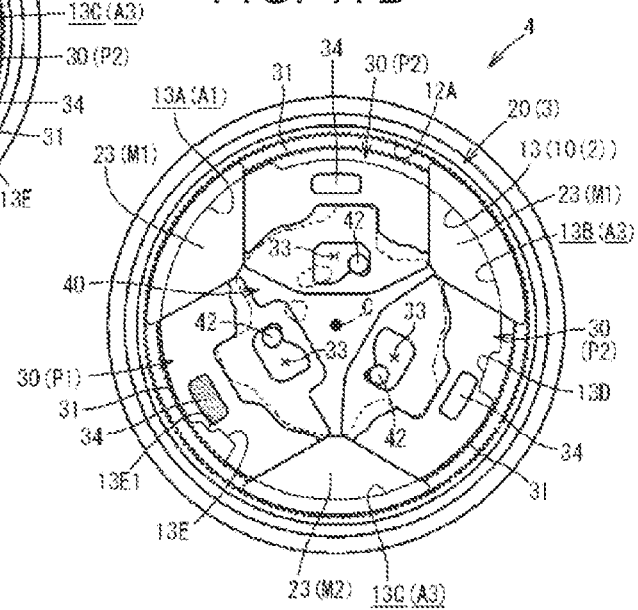
Figure 19:
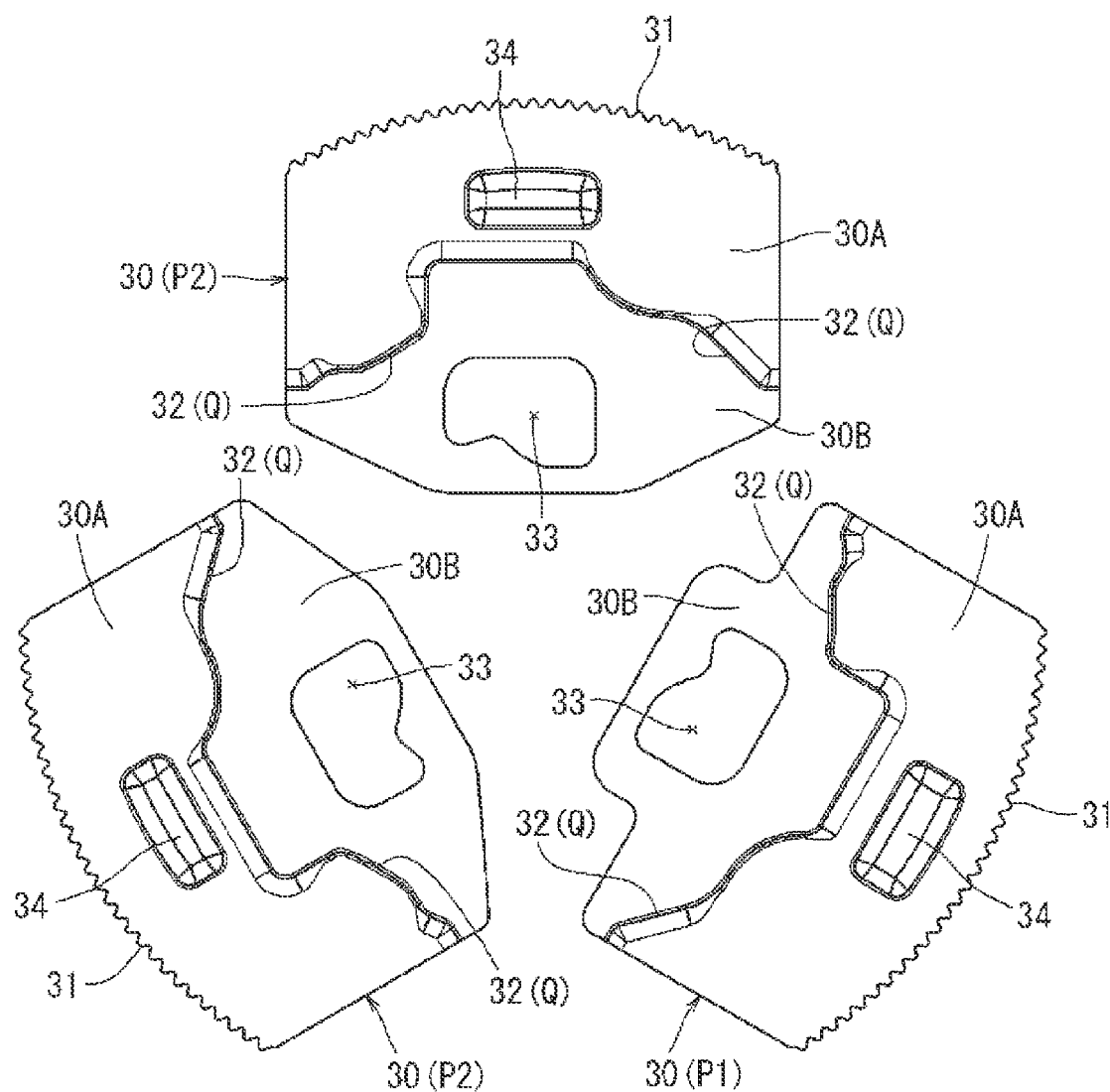
FIG. 19 is an outer side view of the pawls.
Figure 20:
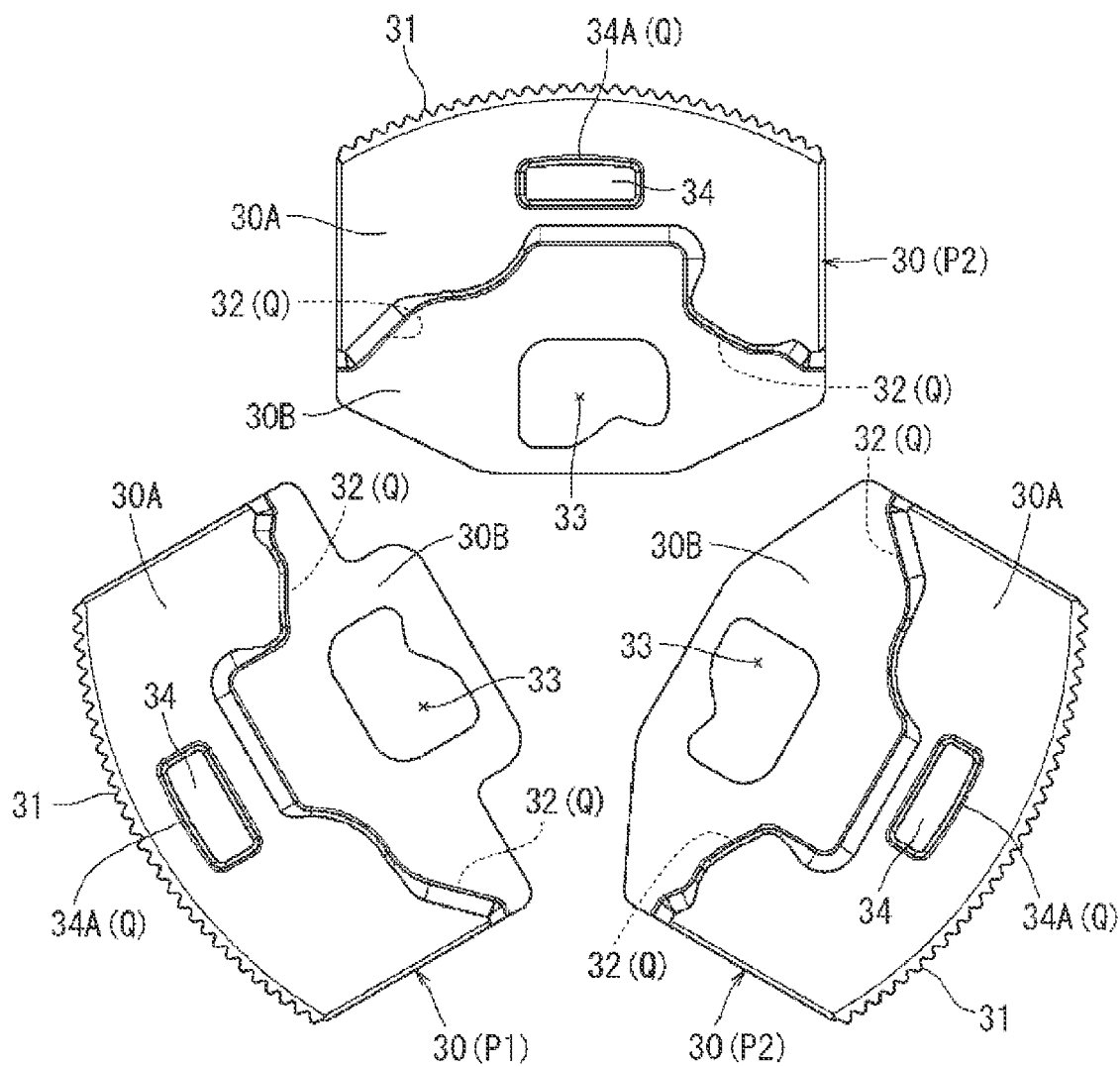
FIG. 20 is an inner side view of the pawls.

As shown in FIGS. 14, 17D, and 18D, the second projection portion 13E is formed to protrude on a starting side in the rotation direction of the lock region A1 (first region 13A), that is, an end portion of the lock region A1 on a side opposite to a side adjacent to the free region A2 (second region 13B). The second projection portion 13E is formed at a position at which the second projection portion 13E can overlap with the abutting protrusion 34 of the main pawl P1 in the rotation direction as shown in FIGS. 14, 17D, and 18D when the seat back 2 is tilted to a starting end of the lock region A1, that is, the rearward tilt position Pc as shown in FIG. 21.

The reason is as follows. That is, as shown in FIG. 21, when the seat back 2 is tilted to the rearward tilt position Pc, the locking plate 2Fc is abutted against and locked to the rear stopper 3Fd of the reclining plate 3F. At this time, when the abutting protrusion 34 of the main pawl P1 shown in FIG. 14 is abutted, against the second projection portion 13E in the rotation direction before the locking plate 2Fc is abutted against the rear stopper 3Fd of the reclining plate 3F due to the fitting of the seat reclining device 4 and peripheral components thereof, a large load is applied to the seat reclining device 4. Therefore, in order to prevent such a situation, the second projection portion 13E is formed with a relief recess portion 13E1 that releases the abutment of the abutting protrusion 34 of the main pawl P1 against the second projection portion 13E in the rotation direction.

Figure 33:
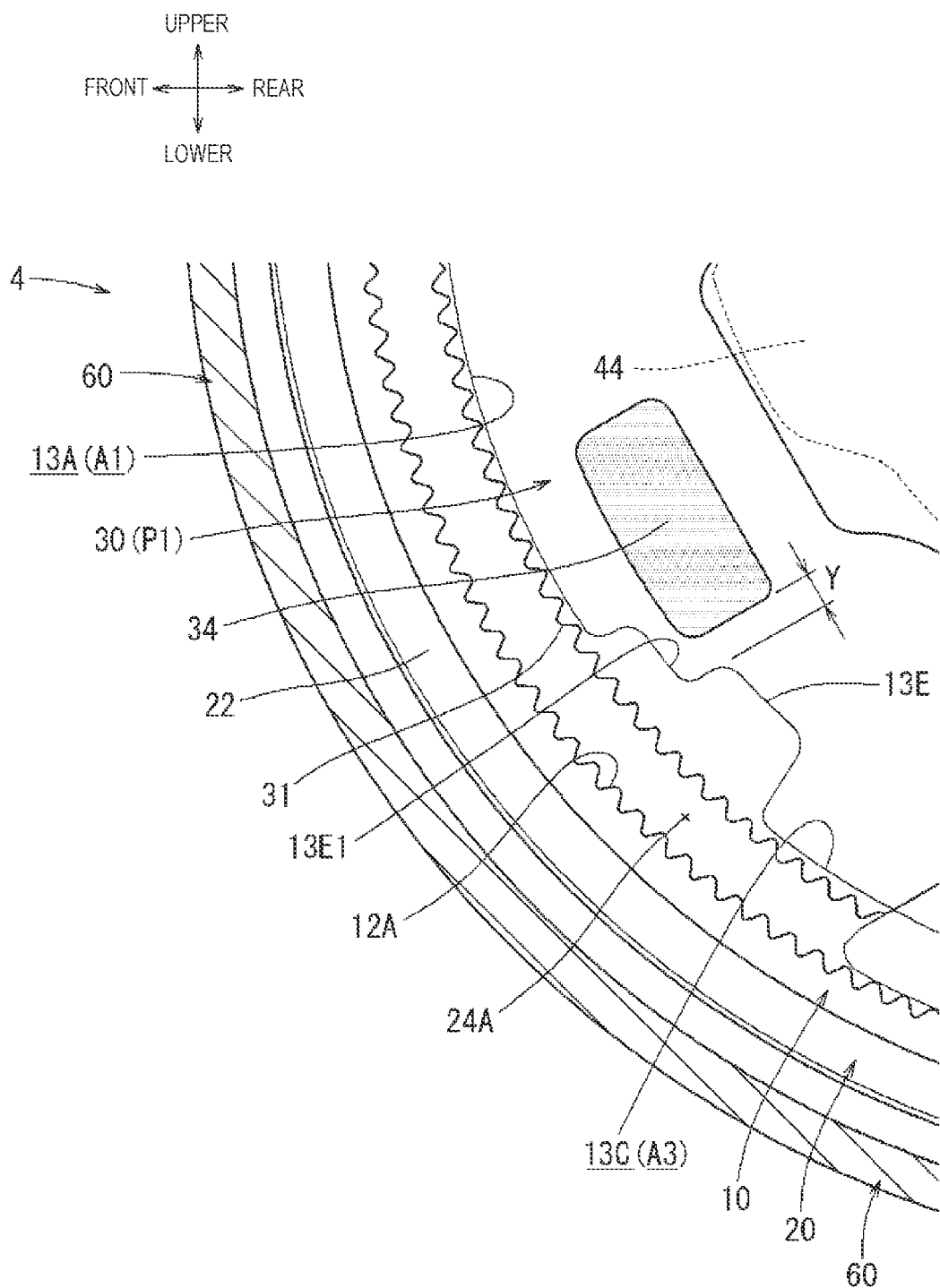
FIG. 33 is an enlarged view of a portion XXXIII in FIG. 14.

As shown in FIG. 33, the relief recess portion 13E1 is formed in a shape in which a corner portion of the second projection portion 13E on a shown clockwise direction side is thinned into a substantially rectangular shape. When the seat back 2 is tilted to the rearward tilt position Pc and the locking plate 2Fc is abutted against and locked to the rear stopper 3Fd of the reclining plate 3F as shown in FIG. 21, due to dimensional variation of the fitting, even when the abutting protrusion 34 of the main pawl P1 overlaps with the second projection portion 13E in the rotation direction as shown in FIG. 33, the relief recess portion 13E1 receives the abutting protrusion 34 such that the abutting protrusion 34 is not abutted against the second projection portion 13E in the rotation direction, Specifically, the relief recess portion 13E1 receives the abutting protrusion 34 in a state in which there is a gap Y in the rotation direction between the relief recess portion 13E1 and a side surface of the abutting protrusion 34 on a shown counterclockwise direction side.

When the abutting protrusion 34 of the main pawl P1 that enters the relief recess portion 13E1 is pushed outward in the radial direction, the abutting protrusion 34 rides on an inner circumferential surface of the relief recess portion 13E1, and the main pawl P1 is prevented from meshing with the inner teeth 12A of the ratchet 10. As a result, the main pawl P1 is prevented from being locked at a position (a rotation position beyond the lock region A1) at which the abutting protrusion 34 of the main pawl P1 enters the relief recess portion 13E1.

As shown in FIGS. 4 and 5, a through hole 11A penetrating in a round hole shape is formed at a central portion (a position at the rotation center C) of the disk main body 11 of the ratchet 10. In the through hole 11A, an operation pin 5A inserted into a central portion (a position at the rotation center C) of the rotation cam 40 to be described later is inserted in a freely rotatable state from the outside in the axial direction.

As shown in FIG. 3, the ratchet 10 is set such that an outer surface of the disk main body 11 is in surface contact with an outer surface of the side frame 2F of the seat back 2 and the ratchet 10 is integrally coupled to the side frame 2F of the seat back 2 by welding contact portions therebetween. Specifically, the ratchet 10 is set in a state in which three dowels 14 formed to project on the outer surface of the disk main body 11 of the ratchet 10 are fitted into three corresponding fitting holes 2Fa formed in the side frame 2F of the seat back 2, and the outer surface of the disk main body 11 is in surface contact with the outer surface of the side frame 2F.

Then, the ratchet 10 is coupled to the side frame 2F by laser-welding peripheral regions (coupling regions A4) of the fitted portions to the side frame 2F. As shown in FIG. 5, the dowels 14 are formed respectively in regions in the rotation direction in which the first region 13A, the second region 13B, and the third region 13C of the intermediate cylindrical portion 13 are located. Each of the dowels 14 is formed to curve in an arc shape around the rotation center C of the ratchet 10.

Figure 7:
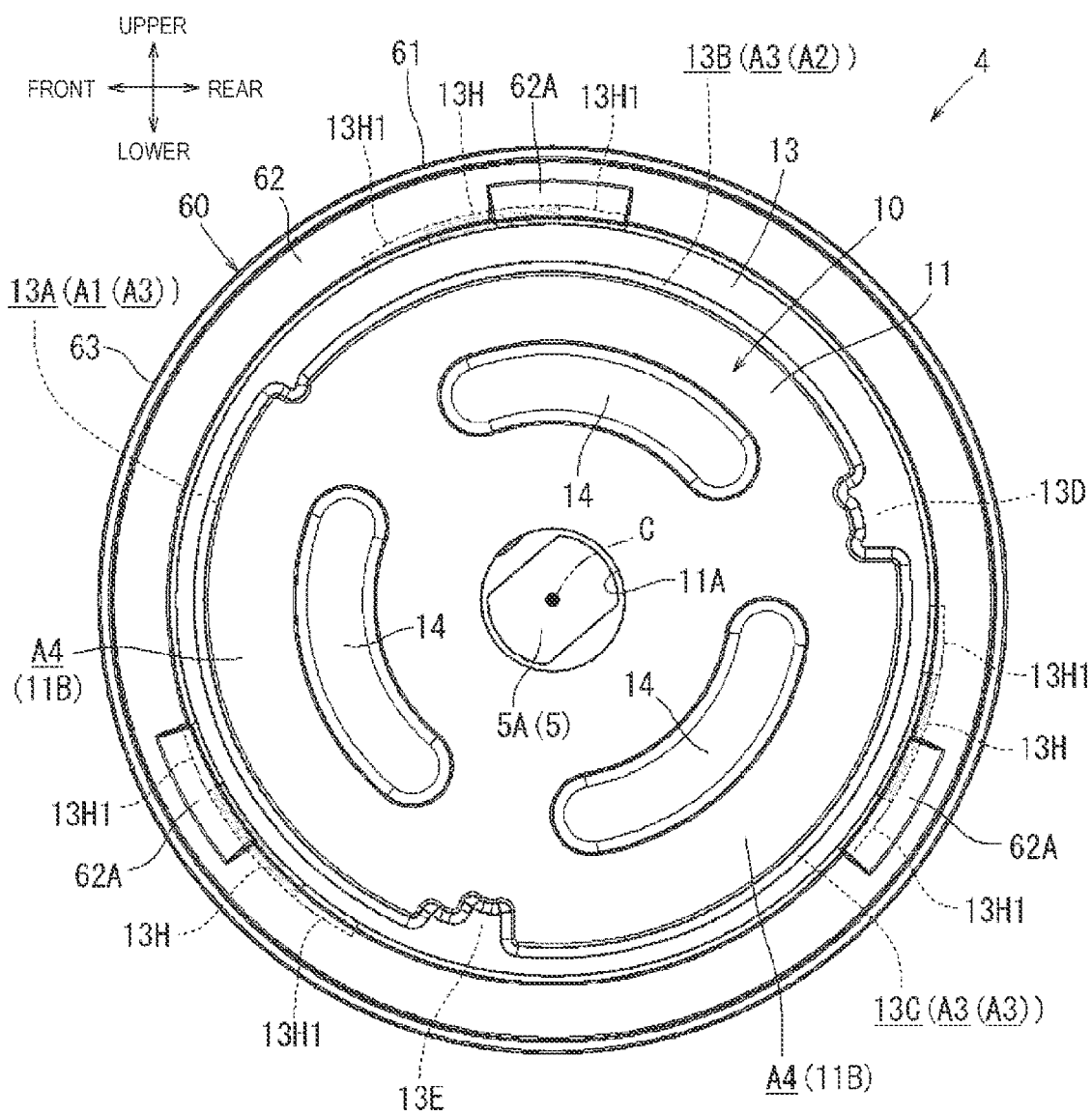
FIG. 7 is an inner side view of the vehicle seat reclining device.
Figure 8:
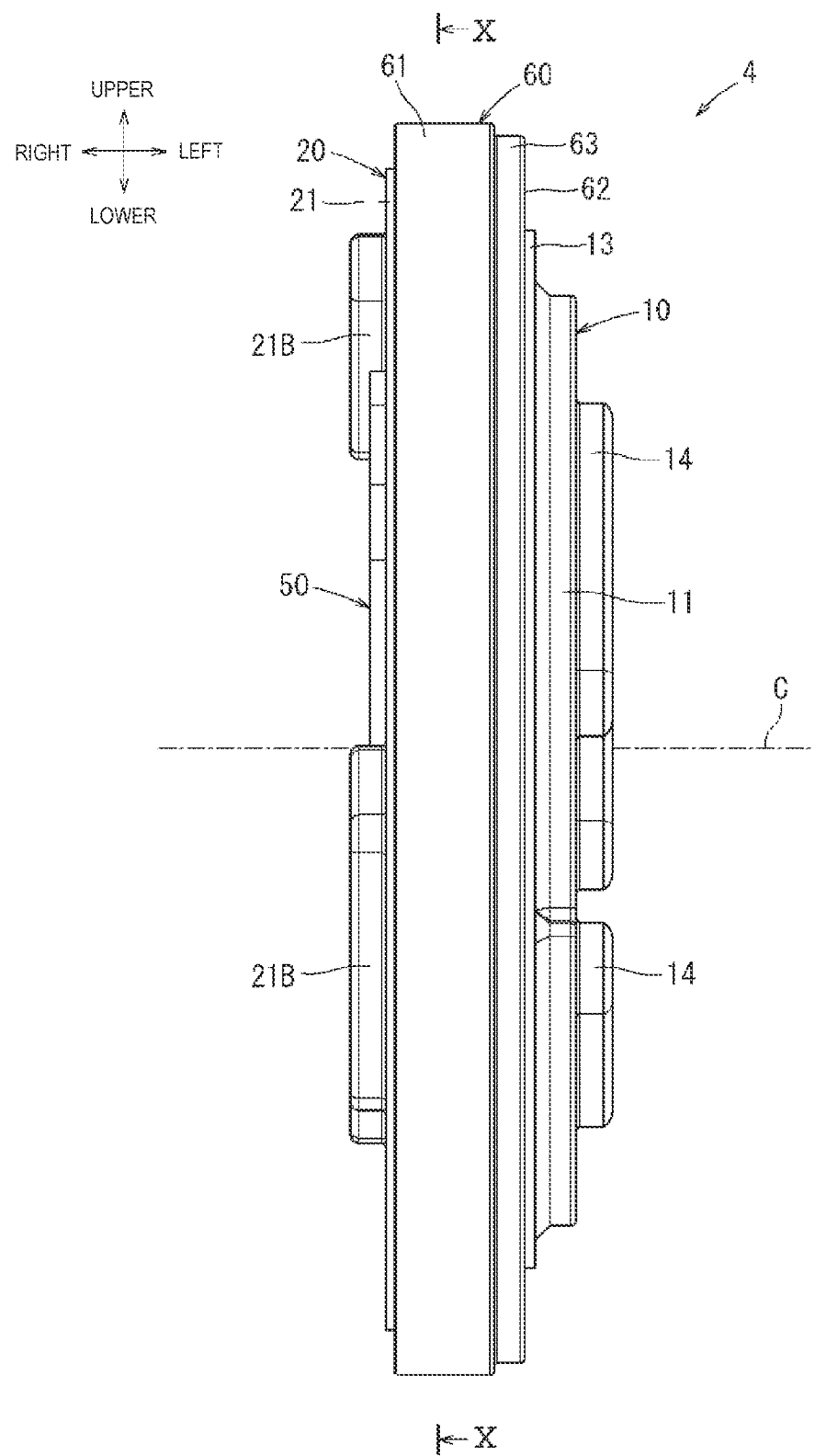
FIG. 8 is a front side view of the vehicle seat reclining device.

Regions on a radially outer side of the dowels 14 on the outer surface of the disk main body 11 of the ratchet 10 are defined as the coupling regions A4 in which the outer surface of the disk main body 11 is abutted against and laser-welded to the side frame 2F in a surface contact state. As shown in FIG. 7, the coupling regions A4 are configured such that, due to the projection-recess shape of the intermediate cylindrical portion 13 formed on outer circumferential edge portions of the coupling regions A4, the coupling regions 4A at positions at which the first region 13A and the third region 13C are located each have an expanded surface portion 11B whose dimension in the radial direction is expanded from the coupling region A4 at a position at which the second region 13B is located.

That is, as described above, the first region 13A and the third region 13C formed on the intermediate cylindrical portion 13 are formed to have a shape expanded outward in the radial direction from the second region 13B. Therefore, the coupling regions 4A at the positions at which the first region 13A and the third region 13C are formed each are configured to expand in dimension in the radial direction as compared with the coupling region A4 at the position at which the second region 13B is formed. According to the above configuration, the outer surface of the disk main body 11 of the ratchet 10 is firmly welded to the side frame 2F in a state in which the two coupling regions A4 each having the expanded surface portion 11B, which are at the positions at which the first region 13A and the third region 13C are formed, are abutted against the side frame 2F more widely to the outer side in the radial direction.

The welding of the ratchet 10 to the side frame 2F is performed such that welding beads are placed to enclose each dowel 14 in a C shape spanning from a radially outer side to both the side regions in the rotation direction. As shown in FIG. 3, a round hole-shaped penetrating hole 2Fb penetrating the side frame 2F is formed in the side frame 2F at a position at which the penetrating hole 2Fb faces the through hole 11A, which is formed in the central portion (position at the rotation center C) of the ratchet 10, in the axial direction. The operation pin 5A inserted through the through hole 11A of the ratchet 10 is inserted through the penetrating hole 2Fb in the axial direction.

Guide 20

As shown in FIG. 5, the guide 20 is formed by cutting a metal plate-shaped member into a substantially disk shape having an outer diameter slightly larger than that of the ratchet 10 and extruding the substantially disk-shaped plate member into a half-punched shape in a plate thickness direction (axial direction) at some portions. Specifically, the guide 20 is configured such that a cylindrical portion 22 projecting into a cylindrical shape in the axial direction, which is the assembling direction of the guide 20 to the ratchet 10, is extruded into a half-punched shape and formed on an outer circumferential edge portion of a disk main body 21 of the guide 20.

Figure 9:
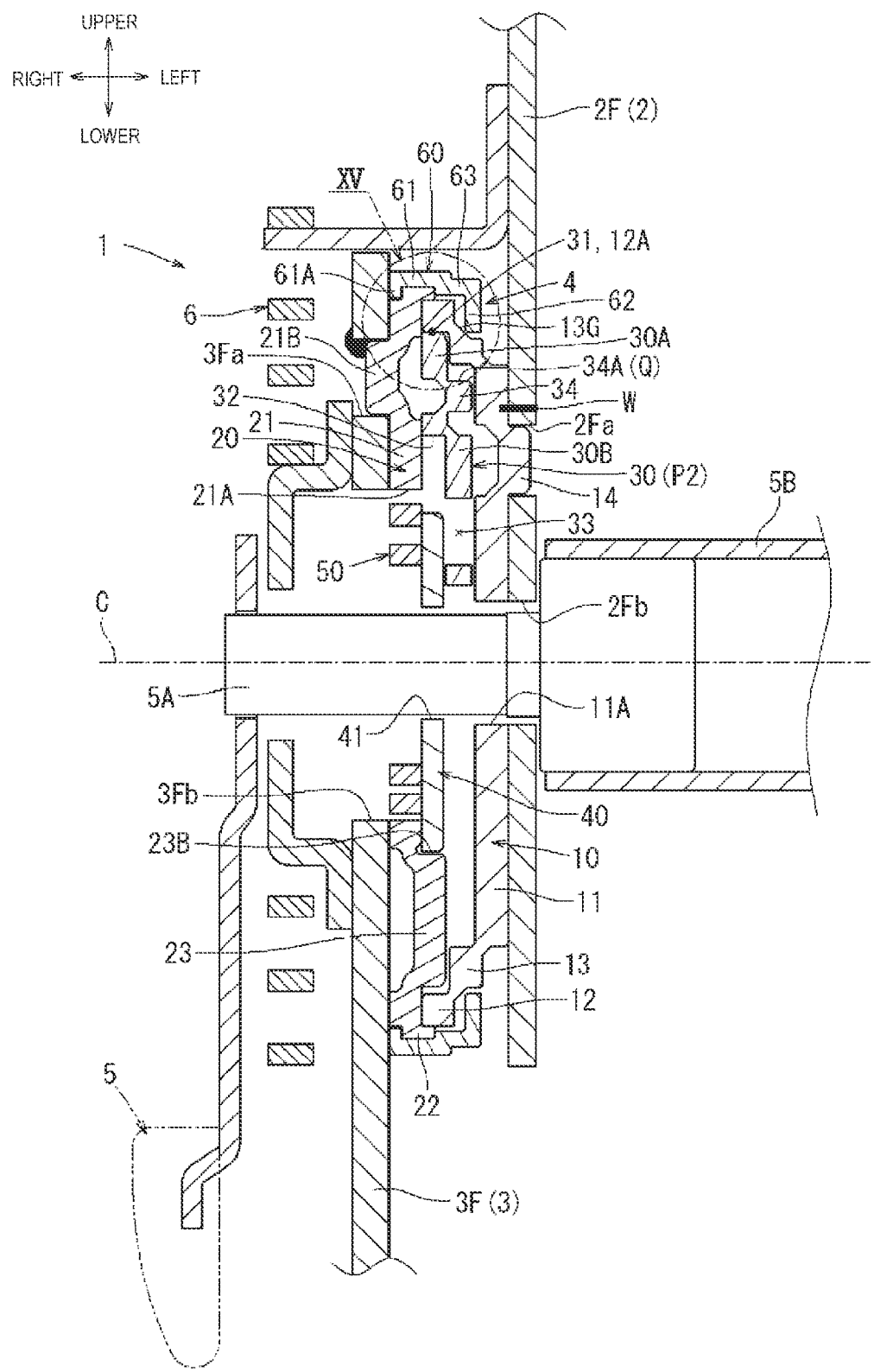
FIG. 9 is a cross-sectional view taken along a line IX-IX in FIG. 1.

The cylindrical portion 22 is formed to have an inner diameter dimension slightly larger than an outer diameter dimension of the cylindrical portion 12 of the ratchet 10. Specifically, the cylindrical portion 22 is configured such that a thickness thereof in the radial direction is formed to be smaller than a plate thickness of the outer circumferential ring 60 to be described later (see FIG. 15). More specifically, the cylindrical portion 22 is configured such that the thickness thereof in the radial direction is thinned to an extend than an outer circumferential surface thereof is located inward in the radial direction than an outer circumferential surface of a stepped portion 63 of the outer circumferential ring 60 to be described later. As shown in FIG. 9, the guide 20 is set such that the cylindrical portion 12 of the ratchet 10 is loosely fitted into the cylindrical portion 22 in the axial direction.

Therefore, the guide 20 is assembled in a state in which the cylindrical portions 22, 12 are loosely fitted to each other on an inner side and an outer side in the radial direction between the guide 20 and the ratchet 10 and are supported from the inner side and the outer side to be rotatable relative to each other. Then, the outer circumferential ring 60 to be described later is mounted in a manner of crossing the cylindrical portion 22 of the guide 20 and the cylindrical portion 12 of the ratchet 10 from an outer circumferential side, and thereby the guide 20 is assembled to the ratchet 10 via the outer circumferential ring 60 in a state in which the guide 20 is prevented from coming off in the axial direction (see FIGS. 2 to 3 and 6 to 9).

As shown in FIG. 5, guide walls 23 each projecting in a substantially fan shape in the axial direction, which is the assembling direction to the ratchet 10, are extruded into a half-punched shape at three positions in the rotation direction and formed on an inner surface of the disk main body 21 of the guide 20. The guide walls 23 have a shape in which outer circumferential surfaces thereof on an outer side in the radial direction are curved so as to draw an arc on the same circumference drawn around the rotation center C of the guide 20. The guide walls 23 are set in a state of being loosely fitted into the cylindrical portion 12 of the ratchet 10 assembled inside the cylindrical portion 22 of the guide 20.

Due to formation of the guide walls 23, recess-shaped pawl accommodating grooves 24A are formed in regions between the guide walls 23 in the rotation direction on an inner surface of the disk main body 21 of the guide 20. In the pawl accommodating grooves 24A, the three pawls 30, which will be described later, can be set to slide only inward and outward in the radial direction. Further, a cam accommodating groove 24B in which the rotation cam 40 to be described later can be set to be axially rotatable is formed in a central region on the inner surface of the disk main body 21 surrounded by the guide walls 23.

Figure 11:
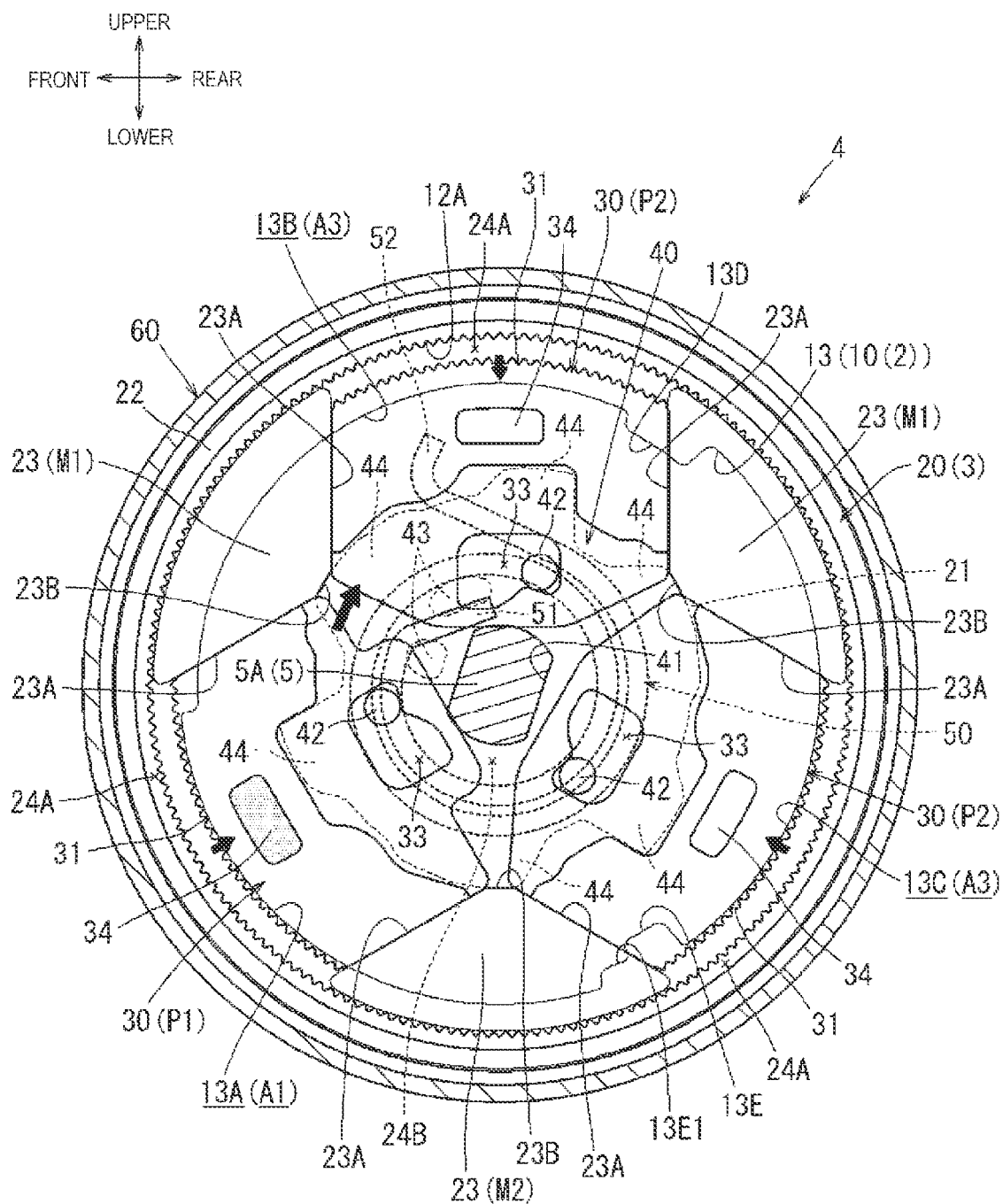
FIG. 11 is a cross-sectional view corresponding to FIG. 10 and showing an unlocked state of the vehicle seat reclining device.

As shown in FIGS. 10 and 11, the guide walls 23 support the corresponding pawl 30, which is set in the pawl accommodating groove 24A, from both sides in the rotation direction by regulating surfaces 23A which are two side surfaces in the rotation direction that face the corresponding pawl accommodating groove 24A. Accordingly, the guide walls 23 guide the corresponding pawl 30 from both sides in the rotation direction such that the pawl 30 slides only inward and outward in the radial direction.

Further, the guide walls 23 support the rotation cam 40, which is set in the cam accommodating groove 24B, from the outer side in the radial direction by support surfaces 23B which are inner circumferential surfaces of the guide walls 23 in the radial direction that face the cam accommodating groove 24B. Therefore, the guide walls 23 guide the rotation cam 40 from the outer side in the radial direction such that the rotation cam 40 is rotatable in a substantially central (rotation center C) position on the disk main body 21 of the guide 20.

Further, a substantially round hole-shaped through hole 21A, in which a lock spring 50 to be described later is set, passes in the axial direction through a central portion (a position at the rotation center C) of the disk main body 21 of the guide 20. In the through hole 21A, an elongated hooking hole 21Aa extending outward in the radial direction is formed. An outer end portion 52 of the lock spring 50 set in the through hole 21A is fitted into the hooking hole 21Aa in the axial direction and is set in an integral state in the rotation direction.

As shown in FIG. 2, the guide 20 is set such that the outer surface of the disk main body 21 is in surface contact with the inner surface of the reclining plate 3F, and the guide 20 is integrally coupled to the reclining plate 3F by welding the contact portions between the guide 20 and the reclining plate 3F. Specifically, the ratchet 20 is set in a state in which three dowels 21B formed to project on the outer surface of the disk main body 21 of the guide 20 are fitted into three corresponding fitting holes 3Fa formed in the reclining plate 3F, and the outer surface of the disk main body 21 is in surface contact with the inner surface of the reclining plate 3F.

Then, the guide 20 is coupled to the reclining plate 3F by laser-welding peripheral regions of the fitted portions to the reclining plate 3F. As shown in FIG. 4, the dowels 21B are formed such that the dowels 21B are extruded in the axial direction as floating islands in regions on a back side of the pawl accommodating grooves 24A (see FIG. 5) on the outer surface of the disk main body 21. As shown in FIG. 2, a round hole-shaped penetrating hole 3Fb penetrating the reclining plate 3F is formed in the reclining plate 3F at a position at which the penetrating hole 3Fb faces the through hole 21A, which is formed in the central portion (position at the rotation center C) of the guide 20, in the axial direction.

The operation pin 5A inserted through the through hole 21A of the guide 20 passes through the penetrating hole 3Fb in the axial direction.

Pawl 30

As shown in FIGS. 4 and 5, each of the pawls 30 is formed by cutting one metal plate-shaped member into a substantially rectangular shape and extruding the substantially rectangular member into a half-punched shape in a plate thickness direction (axial direction) at some positions. Specifically, the pawl 30 has a shape in which an offset surface portion 30B constituting a substantially half region of the pawl 30 on the inner side in the radial direction is extruded into a half-punched shape by a substantial plate thickness in the axial direction that is the assembling direction of the pawl 30 to the ratchet 10 relative to a main body surface portion 30A constituting a substantially half region on the outer side in the radial direction.

The three pawls 30 have substantially the same shape, and one of the three pawls 30 serves as the main pawl P1 having a function different from those of the other two sub-pawls P2. Specific configurations thereof will be described in detail below. Hereinafter, specific configurations of components common to the pawls 30 will be described first.

As shown in FIGS. 10 and 11, the pawls 30 are set in a state of being accommodated one by one in the pawl accommodating grooves 24A formed on the inner surface of the disk main body 21 of the guide 20. With such setting, each of the pawls 30 is surface-supported from both sides in the rotation direction by the regulating surfaces 23A of the guide walls 23 facing the pawl accommodating groove 24A from both sides in the rotation direction. As a result, each of the pawls 30 is supported to be only movable inward and outward in the radial direction along the regulating surfaces 23A.

Specifically, as shown in FIG. 9, when the pawls 30 are set in the pawl accommodating grooves 24A (see FIG. 5), main body surface portions 30A of the pawls 30 are abutted against the inner surface of the disk main body 21 of the guide 20. Therefore, the inner teeth 12A of the cylindrical portion 12 of the ratchet 10 set inside the cylindrical portion 22 of the guide 20 face the pawls 30 in the radial direction at positions on outer sides of the main body surface portions 30A in the radial direction. The offset surface portions 30B of the pawls 30 are set in a state of being separated in the axial direction from the inner surface of the disk main body 21 of the guide 20, and are set in a state of overlapping with the intermediate cylindrical portion 13 of the ratchet 10 in the axial direction.

As shown in FIG. 4, outer teeth 31 whose tooth surfaces face outward in the radial direction are formed on an outer circumferential surface of the main body surface portion 30A of each pawl 30 on an outer side in the radial direction so as to be arranged continuously over the entire region in the rotation direction. The outer circumferential surface of each pawl 30 on which the outer teeth 31 are formed has a projection curving surface shape along the inner circumferential surface shape of the cylindrical portion 12 on which the inner teeth 12A of the ratchet 10 are formed.

Figure 34:
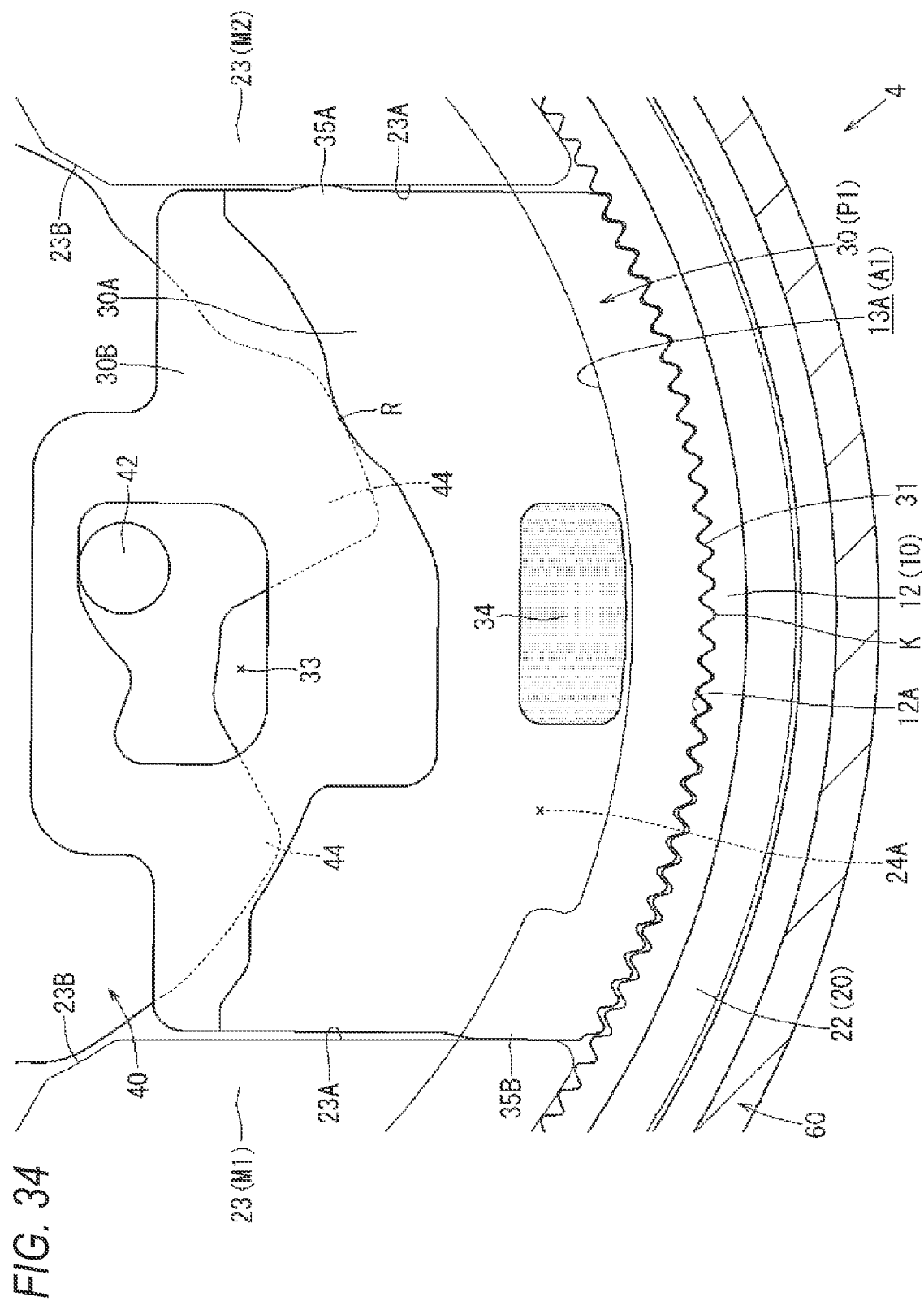
FIG. 34 is an enlarged view of a portion XXXIV of FIG. 10 showing an enlarged meshing state of a specific pawl with respect to the ratchet.

Similarly to the inner teeth 12A of the ratchet 10 that are meshed with the outer teeth 31, the outer teeth 31 of each pawl 30 have a shape in which tooth surfaces are arranged at equal intervals at a pitch of two degrees in the rotation direction. With the above configuration, as shown in FIG. 10, the outer teeth 31 of the pawls 30 are pressed into the inner teeth 12A of the ratchet 10 from the inner side in the radial direction, and thereby all the outer teeth 31 are meshed with the inner teeth 12A. However, strictly, as shown in FIG. 34, the outer teeth 31 of each pawl 30 are configured such that the outer teeth 31 are meshed with the inner teeth 12A of the ratchet 10 with a central tooth surface of the outer teeth 31 in the rotation direction enters the inner teeth 12A most deeply, and a tooth height decrease from the center in the rotation direction toward both ends in the rotation direction such that an entering depth into the inner teeth 12A gradually becomes shallower.

Thus, during meshing of the outer teeth 31 of each pawl 30 with the inner teeth 12A of the ratchet 10, even when the pawl 30 is pressed straight outward in the radial direction, the tooth surfaces of the outer teeth 31 is not all in contact with the tooth surfaces of the inner teeth 12A, and the outer teeth 31 can be appropriately meshed with the inner teeth 12A. That is, the outer teeth 31 of each pawl 30 are configured such that the central tooth surface faces a tooth surface straightly in a traveling direction of the meshing movement.

However, other tooth surfaces of the outer teeth 31 arranged from the central tooth surface toward both end sides in the rotation direction face tooth surfaces obliquely in the rotation direction relative to the tooth surface at the center. Therefore, when each pawl 30 is pushed outward in the radial direction, the central tooth surface moves straightly toward a corresponding central tooth surface of the inner teeth 12A of the ratchet 10, while other teeth enter the inner teeth 12A with tooth surfaces thereof face corresponding tooth surfaces of the inner teeth 12A at an oblique angle.

However, as described above, since the tooth surfaces of the outer teeth 31 have a shape in which the tooth height gradually decreases from the central tooth surface toward the tooth surfaces on both end sides in the rotation direction, the tooth surfaces of the outer teeth 31 other then the central tooth surface can be brought into a state (meshing state) of entering the tooth surfaces of the inner teeth 12A without being abutted against the tooth surfaces of the inner teeth 12A even when the tooth surfaces other than the central tooth surface enter the tooth surfaces of the inner teeth 12A at an oblique angle. Since a tooth surface shape of the outer teeth 31 is the same as that disclosed in JP-A-2015-29635 and the like, detailed description thereof will be omitted.

As shown in FIG. 9, the to-be-described rotation cam 40 set at the central portion of the guide 20 is set to face, in the radial direction, inner circumferential regions of the main body surface portions 30A of the pawls 30. By such setting, the pawls 30 are provided in a state in which the main body surface portions 30A face the rotation cam 40 in the radial direction and the offset surface portions 30B face the rotation cam 40 in the axial direction.

As shown in FIG. 5, a pressed surface portion 32 is formed on an inner circumferential surface portion of the main body surface portion 30A of each pawl 30. The pressed surface portion 32 faces the rotation cam 40 in the radial direction and is pressed outward from an inner side in the radial direction with the rotation of the rotation cam 40. A pull-in hole 33 is formed to penetrate, in the axial direction, an intermediate portion of the offset surface portion 30B of each pawl 30. The pull-in holes 33 are operated such that pull-in pins 42 formed at corresponding positions of the rotation cam 40 are inserted into the pull-in holes 33 and are pulled inward in the radial direction with the rotation of the rotation cam 40. The abutting protrusion 34 projecting in the same direction as the extruding direction of the offset surface portion 30B is formed at an intermediate portion of the main body surface portion 30A of each pawl 30.

As shown in FIG. 10, when the rotation cam 40 is rotated in the shown counterclockwise direction by a spring biasing force of the lock spring 50 hooked between the rotation cam 40 and the guide 20, the pressed surface portions 32 of the pawls 30 are pressed outward from the inside in the radial direction by corresponding pressing portions 44 formed on an outer circumferential surface portion of the rotation cam 40. Accordingly, the outer teeth 31 of the pawls 30 are pressed against and meshed with the inner teeth 12A of the ratchet 10, and the pawls 30 are held in this state (locked state).

Accordingly, the pawls 30 are integrally coupled to the ratchet 10 in the rotation direction, and the relative rotation between the ratchet 10 and the guide 20 is locked via the pawls 30. Specifically, due to the meshing of the pawls 30 in the radial direction, the ratchet 10 and the guide 20 are locked in a state in which rattling in the radial direction is prevented. Preventing the rattling in this way is also generally referred to as "rattling elimination".

As shown in FIG. 11, when the rotation cam 40 is rotated in the shown clockwise direction against the spring biasing force of the lock spring 50 due to an operation on the reclining lever 5, the pull-in holes 33 of the pawls 30 are pulled inward in the radial direction by the corresponding pull-in pins 42 of the rotation cam 40. Accordingly, the outer teeth 31 of the pawls 30 are released from the meshing state of being meshed with the inner teeth 12A of the ratchet 10, and the pawls 30 are held in this state (unlocked state). Accordingly, a rotation locked state between the ratchet 10 and the guide 20 is released.

As shown in FIG. 9, the abutting protrusion 34 of each pawl 30 is extruded into a half-punched shape to the substantially same position in the axial direction as the offset surface portion 3011 of each pawl 30, and is set in a state in which an outer circumferential surface portion 34A of the abutting protrusion 34 faces the inner circumferential surface of the intermediate cylindrical portion 13 of the ratchet 10 in the radial direction. As shown in FIGS. 10, 17A and 18A, when a rotation position of the ratchet 10 relative to the guide 20 is in the lock region A1, even if the pawls 30 are pushed outward in the radial direction by the rotation cam 40, the abutting protrusion 34 of each pawl 30 is not pressed against the inner circumferential surface of the intermediate cylindrical portion 13 of the ratchet 10, and thus does not hinder movement of each pawl 30 meshing with the inner teeth 12A of the ratchet 10.

As shown in FIGS. 13, 17B and 18B, when the rotation position of the ratchet 10 relative to the guide 20 is shifted to the free region A2, the pawls 30 are pressed outward in the radial direction by the rotation cam 40, and thus the abutting protrusion 34 of each pawl 30 is pressed against the inner circumferential surface of the intermediate cylindrical portion 13 of the ratchet 10, so as to stop the movement of each pawl 30 meshing with the inner teeth 12A of the ratchet 10 in the middle. Hereinafter, the above configurations will be described in detail.

The abutting protrusions 34 of the pawls 30 are configured to be different in dimension in the radial direction from a central portion (a position at the rotation center C) of the guide 20 to the outer circumferential surface portion 34A, that is, different in forming positions in the radial direction, between the main pawl P1 and the other two sub-pawls P2. Specifically, the abutting protrusion 34 of the main pawl P1 is formed at a position at which the abutting protrusion 34 of the main pawl P1 protrudes outward in the radial direction than the abutting protrusions 34 of the other two sub-pawls P2.

As shown in FIGS. 10, 17A, and 18A, when overlapping in the rotation direction with the first region 13A (lock region A1) of the intermediate cylindrical portion 13 of the ratchet 10, the abutting protrusion 34 of the main pawl P1 is not pushed out to a position at which the abutting protrusion 34 rides on the first region 13A even if being pushed outward in the radial direction by the rotation cam 40, and thus does not hinder movement of the main pawl P1 meshing with the inner teeth 12A of the ratchet 10.

At this tittle, the abutting protrusions 34 of the other two sub-pawls P2 are also not pushed out to positions at which the abutting protrusions 34 respectively ride on the second region 13B and the third region 13C when being pushed outward in the radial direction by the rotation cam 40, and thus do not hinder movement of the sub-pawls P2 meshing with the inner teeth 12A of the ratchet 10. That is, the two sub-pawls P2 are formed at positions inward in the radial direction than the abutting protrusion 34 of the main pawl P1. Therefore, even when the two sub-pawls P2 overlap in the rotation direction with the second region 13B (relief region A3) and the third region 13C (relief region A3) which protrude inward in the radial direction than the first region 13A, the two sub-pawls P2 are not pushed to positions at which the two sub-pawls P2 respectively ride on the second region 13B and the third region 13C when the being pushed outward in the radial direction by the rotation cam 40.

As shown in FIGS. 13, 17B, and 18B, when overlapping in the rotation direction with the second region 13B (free region A2) of the intermediate cylindrical portion 13 of the ratchet 10, the abutting protrusion 34 of the main pawl P1 rides on the second region 13B when being pushed outward in the radial direction by the rotation cam 40, and thus stops movement of the main pawl P1 meshing with the inner teeth 12A of the ratchet 10 in the middle.

At this time, even when the abutting protrusions 34 of the other two sub-pawls P2 overlap in the rotation direction with the corresponding third region 13C (relief region A3) and the first region 13A (relief region A3), the abutting protrusions 34 of the other two sub-pawls P2 are not pushed to positions at which the abutting protrusions 34 ride on the third region 13C (relief region A3) and the first region 13A (relief region A3) when being pushed outward in the radial direction by the rotation cam 40, and thus do not stop outward movement of the sub-pawls P2 in the radial direction. In such a configuration as well, since the movement of the main pawl P1 is stopped in the middle to stop the rotation of the rotation cam 40 in the middle, the sub-pawls P2 are not further pushed outward in the radial direction, and thus the sub-pawls P2 are held together with the main pawl P1 in the unlocked state in which meshing movement to the inner teeth 12A of the ratchet 10 is blocked in the middle.

As shown in FIGS. 4, 5, and 19 to 20, each of the pawls 30 is formed such that the abutting protrusion 34 and the offset surface portion 30B are extruded from the main body surface portion 30A into a half-punched shape in the same axial direction. When the offset surface portion 30B of each pawl 30 is shaped, an accuracy control surface Q that controls accuracy of a shaping surface is not set on the outer circumferential surface portion of the offset surface portion 30B of each pawl 30, but on the inner circumferential surface portion (pressed surface portion 32) of the main body surface portion 30A. Accordingly, each pawl 30 has a configuration in which the pressed surface portion 32 is formed with high accuracy.

When the abutting protrusion 34 of each pawl 30 is shaped, an accuracy control surface Q that controls accuracy of the shaping surface is set on the outer circumferential surface portion 34A that faces the outer side in the radial direction. Accordingly, each pawl 30 has a configuration in which the outer circumferential surface portion 34A is formed with high accuracy. Thus, by shaping each pawl 30 such that the offset surface portion 30B and the abutting protrusion 34 are extruded into a half-punched shape from the main body surface portion 30A so as to be arranged and spaced apart from each other in the radial direction, the accuracy control surfaces Q are set on front and back sides as described above and the accuracy of the shaping surfaces can be obtained.

The pressed surface portion 32 of each pawl 30 is configured to be pressed from the inner side in the radial direction by the corresponding pressing portion 44 of the rotation cam 40 shown in FIG. 4, at regions on both sides in the rotation direction deviated from a formation position of the abutting protrusion 34 of the pawl 30. Therefore, the pressed surface portion 32 of each pawl 30 is configured such that the accuracy control surfaces Q are set in regions on both sides that do not overlap with the abutting protrusion 34 in the rotation direction, and the accuracy control surfaces Q are not set in a region that overlaps with the abutting protrusion 34 in the rotation direction. According to such a configuration, even when the offset surface portion 30B and the abutting protrusion 34 of each pawl 30 overlap with each other in the rotation direction, the accuracy control surfaces Q can be appropriately set and each shaping surface can be formed with high accuracy.

Rotation Cam 40

As shown in FIG. 5, the rotation cam 40 is formed by cutting one metal plate-shaped member into a substantially disk shape and extruding the substantially disk-shaped plate member into a half-punched shape in a plate thickness direction (axial direction) at some positions. The rotation cam 40 is set in a state of being accommodated in the cam accommodating groove 24B formed on the inner surface of the disk main body 21 of the guide 20. As shown in FIG. 9, the rotation cam 40 has a shape in which a plate thickness thereof is substantially equal to that of each pawl 30.

The rotation cam 40 is set to be sandwiched in the axial direction between the inner surface of the disk main body 21 of the guide 20 and the offset surface portions 30B extruded in a half-punched shape in the axial direction of the pawls 30. Accordingly, the rotation cam 40 is set in a state of being covered from the outer side in the radial direction by the pressed surface portions 32 that are inner circumferential surface portions of the main body surface portions 30A of the pawls 30.

As shown in FIG. 5, a through hole 41 is formed in a central portion (a position at the rotation center C) of the rotation cam 40. The operation pin 5A is inserted into the through hole 41 from an inner side in the axial direction and is coupled with the rotation cam 40 integrally in the rotation direction. The operation pin 5A is inserted to pass through the through hole 41 of the rotation cam 40 from the inner side to the outer side in the axial direction, and is integrally connected with the reclining lever 5 as shown in FIG. 1 at a tip end thereof. With the above assembly, the operation pin 5A integrally rotates the rotation cam 40 along with the operation of pulling up the reclining lever 5.

The operation pin 5A is integrally coupled to the operation pin 5A inserted into the seat reclining device 4 on the other side as shown in FIG. 1 via a connecting rod 5B. Accordingly, the two operation pins 5A are rotated at the same time due to the operation of pulling up the reclining lever 5, and rotation cams 40 of the two seat reclining devices 4 are rotated at the same time.

Figure 6:
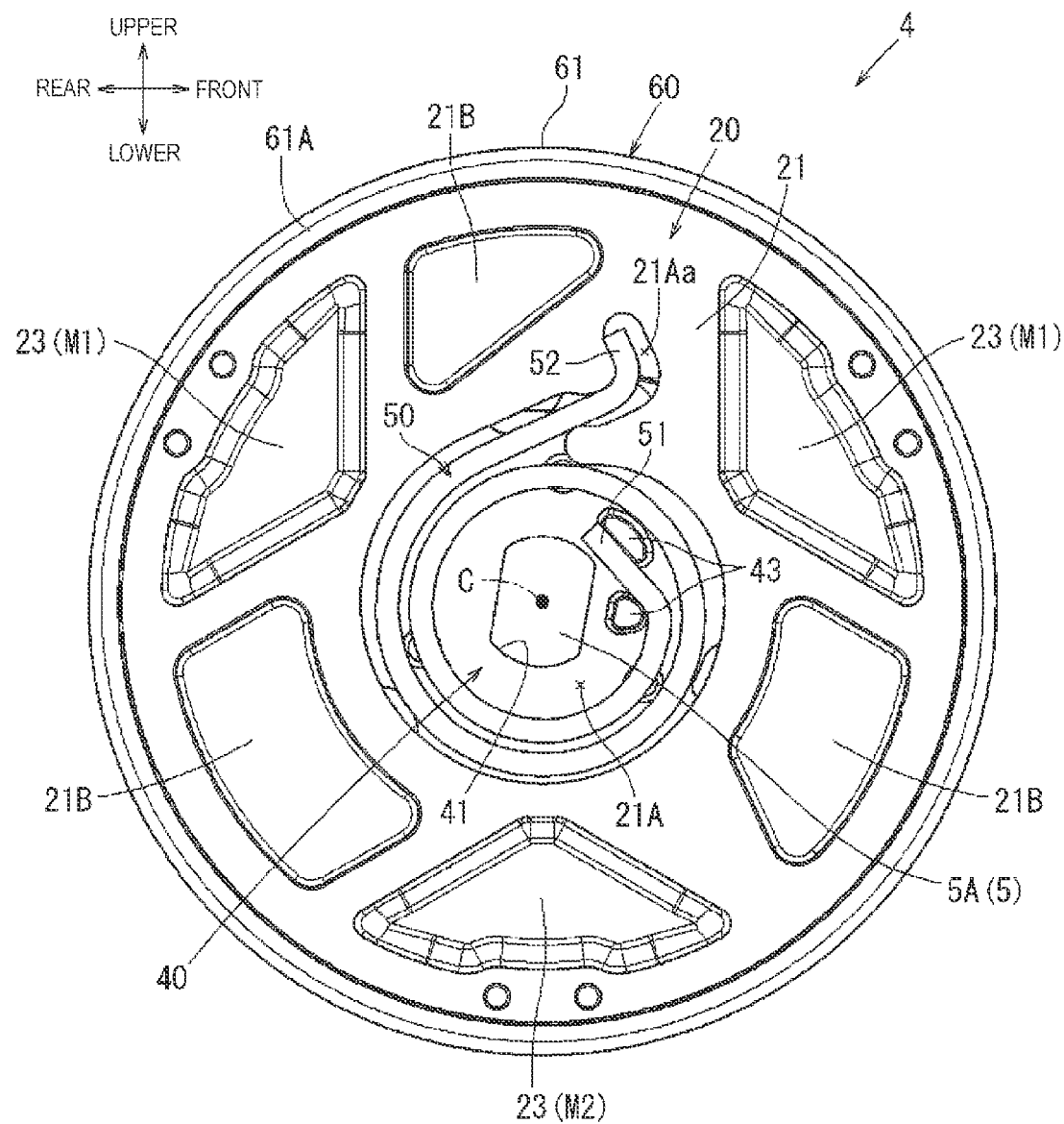
FIG. 6 is an outer side view of the vehicle seat reclining device.

As shown in FIG. 5, the rotation cam 40 is formed in a substantially disk shape that is slightly larger than the through hole 21A formed in the central portion (position at the rotation center C) of the guide 20. On an outer surface of the rotation cam 40 that faces an inner side of the through hole 21A of the guide 20, two hook pins 43 are formed to project in the axial direction. As shown in FIGS. 2 and 6, an inner end portion 51 of the lock spring 50 is hooked and fixed to the hook pins 43 in a form of being sandwiched therebetween. As shown in FIG. 10, on an inner surface of the rotation cam 40 that faces the offset surface portions 30B of the pawls 30, the pull-in pins 42 which are to enter the pull-in holes 33 of the pawls 30 are formed to project in the axial direction.

The rotation cam 40 is assembled to the guide 20 in a state of being elastically supported by the guide 20 via the lock spring 50. Specifically, the assembling is performed in the following procedure. First, the rotation cam 40 is set in the cam accommodating groove 24B of the guide 20. Next, the lock spring 50 is set in the through hole 21A of the guide 20, the inner end portion 51 of the lock spring 50 is hooked between the hook pins 43 of the rotation cam 40, and the outer end portion 52 of the lock spring 50 is hooked in the hooking hole 21Aa extending from the through hole 21A of the guide 20. As described above, the rotation cam 40 is assembled to the guide 20 in a state of being elastically supported by the guide 20 via the lock spring 50.

The rotation cam 40 is rotationally biased in the counterclockwise direction as shown in FIG. 10 with respect to the guide 20 by the spring biasing force of the lock spring 50) hooked between the rotation cam 40 and the guide 20. By the rotation caused by the biasing, the rotation cam 40 constantly presses the pressed surface portions 32 (see FIG. 9) of the pawls 30 from the inner side in the radial direction by the pressing portions 44 projecting from a plurality of locations on the outer circumferential surface portion of the rotation cam 40, and the pawls 30 are meshed with the inner teeth 12A of the ratchet 10.

As shown in FIG. 11, when the reclining lever 5 in FIG. 1 is pulled up, the rotation cam 40 is operated to rotate in the shown clockwise direction via the operation pin 5A. Accordingly, the rotation cam 40 pulls the pawls 30 inward in the radial direction by the pull-in pins 42 inserted into the pull-in holes 33 of the pawls 30, so as to release the pawls 30 from the meshing state of being meshed with the inner teeth 12A of the ratchet 10. Specifically, due to the rotation of the rotation cam 40 in the shown clockwise direction shown, the pull-in pins 42 are pressed against erected inclined surfaces on corresponding inner circumferential edge sides of the pull-in holes 33, and the pawls 30 are pulled inward in the radial direction.

As shown in FIG. 10, the rotation cam 40 is configured such that, in the state (locked state) in which the pawls 30 are pushed from the inner side in the radial direction and meshed with the inner teeth 12A of the ratchet 10, the inner end portion 51 of the lock spring 50 hooked on the hook pins 43 is disposed in a rotation region between two guide walls M1 on an upper left side and an upper right side in the figure among the three guide walls 23 formed on the guide 20.

In this state, the rotation cam 40 receives, due to the spring biasing force received from the inner end portion 51 of the lock spring 50, not only a rotational biasing force in the shown counterclockwise direction relative to the guide 20 but also a biasing force in an eccentric direction to be pushed outward in the radial direction. However, since the three pawls 30 are meshed with the inner teeth 12A of the ratchet 10, the rotation cam 40 is supported by the pawls 30 and is held in a centered state at the central portion (the position at the rotation center C) of the guide 20.

Figure 16:
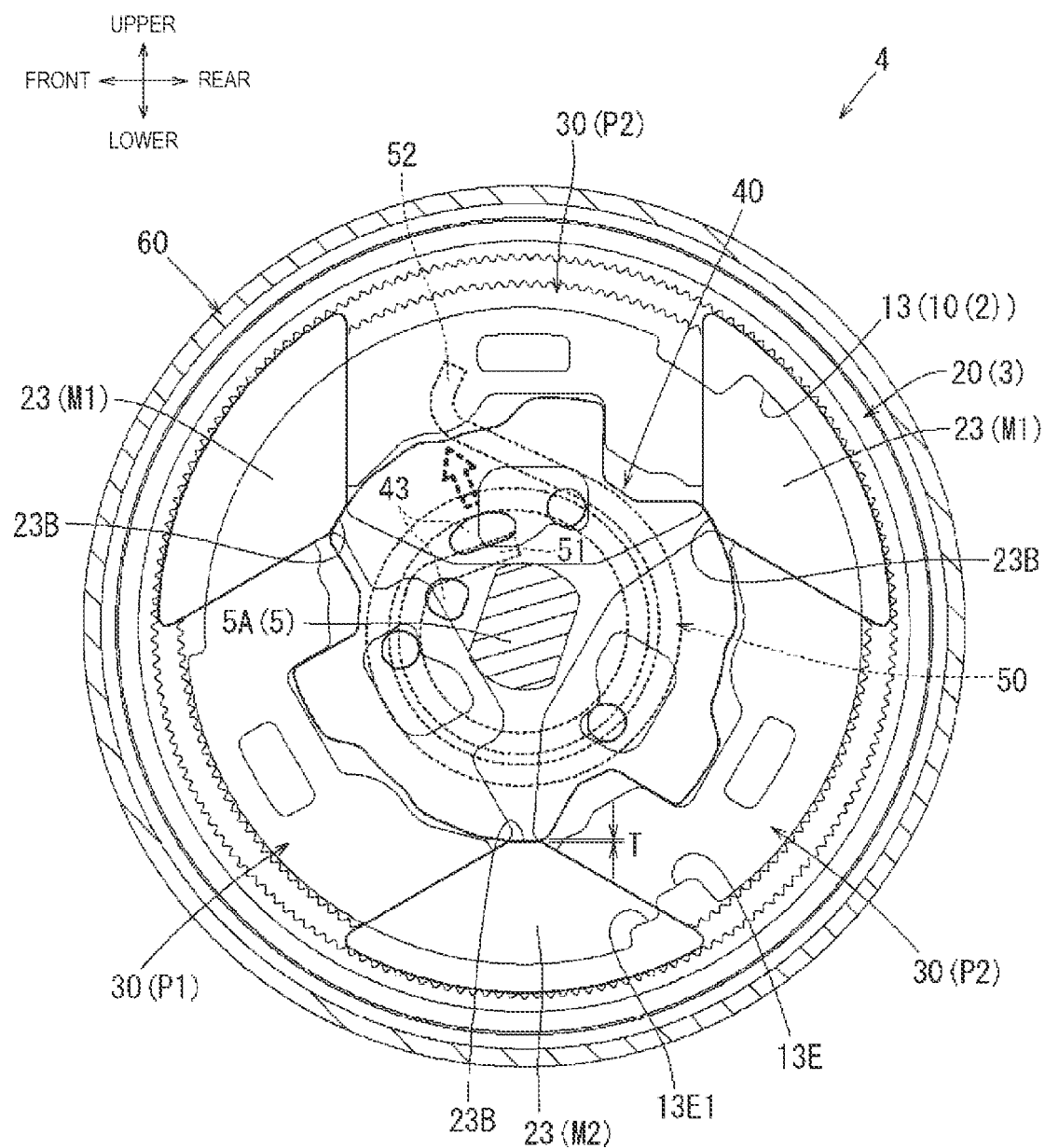
FIG. 16 is a cross-sectional view showing a state in which a rotation cam is biased and thereby pressed against a guide wall.

As shown in FIG. 11, the rotation cam 40 is operated to rotate in the shown clockwise direction shown and the pawls 30 are released from the meshing state of being meshed with the inner teeth 12A of the ratchet 10. Thus, the rotation cam 40 is rotated in the shown clockwise direction such that, due to the biasing force in the eccentric direction received from the inner end portion 51 of the lock spring 50, the rotation cam 40 is pressed against the support surfaces 23B on inner circumferential side of the two guide walls M1 as shown in FIG. 16 while sliding on the support surfaces 23B of the two guide walls M1. At this time, unlike the two guide walls M1, the remaining guide wall M2 (a guide wall M2 on a lower side in the figure) is not in contact with an outer circumferential surface of the rotation cam 40, and a slight gap T in the radial direction is generated between the guide wall M2 and the outer circumferential surface of the rotation cam 40.

With such a configuration, the rotation cam 40 can be appropriately supported by the two guide walls M1 against which the rotation cam 40 is pressed due to the spring biasing force of the lock spring 50 so as not to move in the axial deviation direction (eccentric direction). The rotation cam 40 can appropriately escape axial deviation (eccentric) movement in a direction in which the remaining guide wall M2 exists, with the two guide walls M1 as fulcrums. Therefore, the rotation cam 40 can be smoothly slid and rotated in a release direction without being eccentric.

Outer Circumferential Ring 60

As shown in FIGS. 4 and 5, the outer circumferential ring 60 is formed in a substantially cylindrical shape having a hollow disk plate-shaped base (flange portion 62) by punching a thin metal plate member into a ring shape and drawing an outer circumferential edge portion of the punched metal plate to project into a cylindrical shape in the axial direction. Specifically, the outer circumferential ring 60 includes the hollow disk plate-shaped flange portion 62 having a straight surface facing the axial direction, and a coupling portion 61 projecting from an outer circumferential edge portion of the flange portion 62 into a substantially cylindrical shape in the axial direction.

Specifically, the outer circumferential edge portion of the outer circumferential ring 60 has a shape of being extruded to project into a stepped cylindrical shape with two stages in the axial direction. Accordingly, a cylindrical part on an outer circumferential side of the stepped cylinder is formed as the substantially cylindrical coupling portion 61, and a cylindrical part on an inner circumferential side is formed as a stepped portion 63 having a projecting length in the axial direction shorter than that of the coupling portion 61.

The outer circumferential ring 60 is mounted across the outer circumferential portions of the ratchet 10 and the guide 20 as follows, and is assembled in a state of preventing the ratchet 10 and the guide 20 from coming off in the axial direction. First, the three pawls 30, the rotation cam 40, and the lock spring 50 are set on the guide 20. Next, the ratchet 10 is assembled to the guide 20, and the ratchet 10 and the guide 20 are set inside the cylinder of the outer circumferential ring 60 (inside the coupling portion 61).

Figure 15:
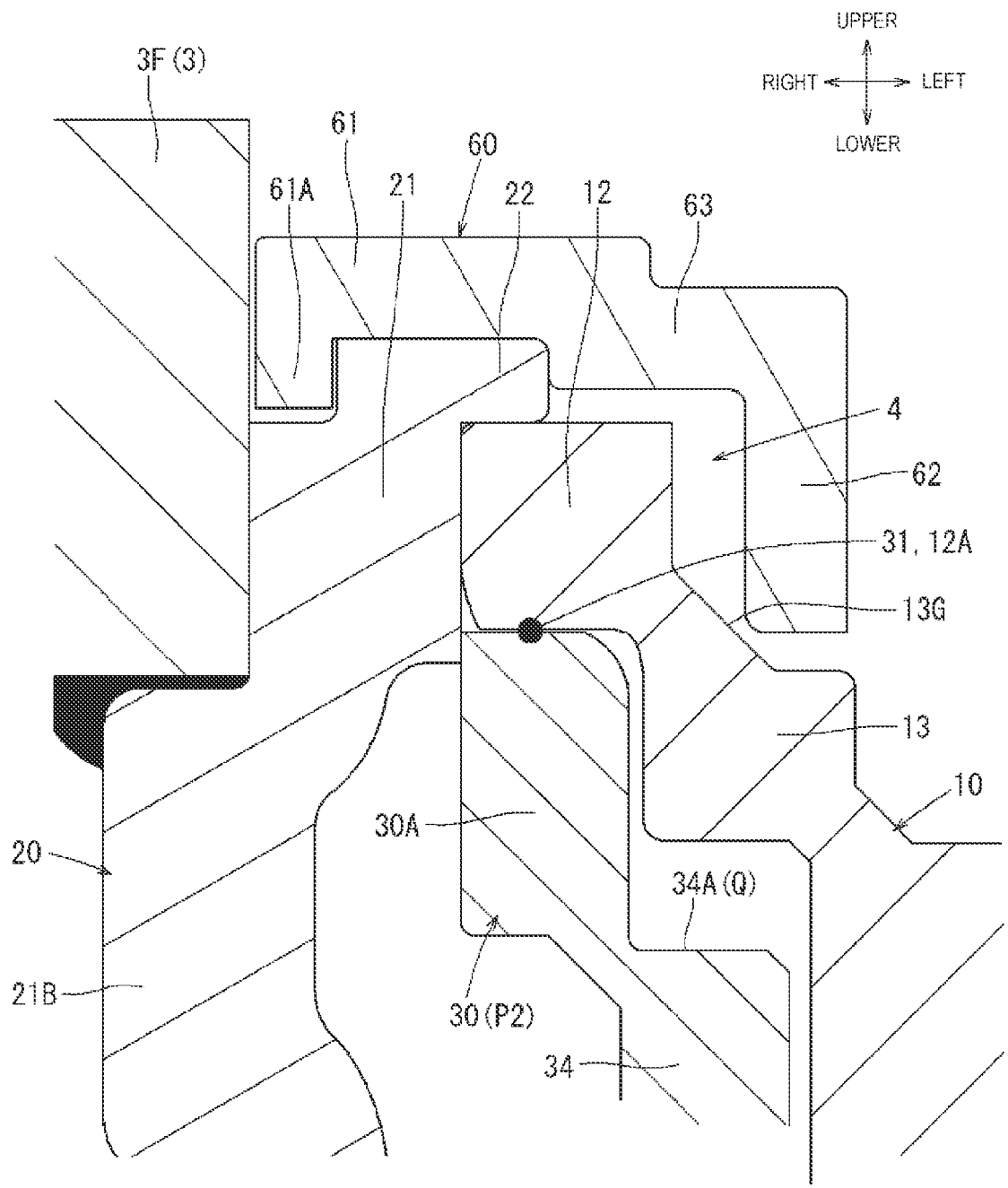
FIG. 15 is an enlarged view of a part XV in FIG. 9.

Then, as shown in FIG. 15, a projection tip portion (crimped portion 61A) of the coupling portion 61 is crimped onto an outer surface of the cylindrical portion 22 of the guide 20. As described above, the coupling portion 61 of the outer circumferential ring 60 is integrally coupled to the cylindrical portion 22 of the guide 20, and the flange portion 62 is abutted against the ratchet 10 from the outer side in the axial direction. Accordingly, the outer circumferential ring 60 is mounted across the outer circumferential portions of the ratchet 10 and the guide 20, and is assembled to prevent the ratchet 10 and the guide 20 from coming off in the axial direction.

The assembling will be described more specifically, and the outer circumferential ring 60 is set in a state in which the cylindrical portion 22 of the guide 20 is abutted in the axial direction against the stepped portion 63 by sequentially assembling the ratchet 10 and the guide 20 into the cylindrical portion (the coupling portion 61). Then, the cylindrical portion 12 of the ratchet 10 is set in a state of being abutted against the flange portion 62 from the inner side in the axial direction. Then, by the above setting, the cylindrical portion 22 of the guide 20 is fitted completely in the axial direction into the cylindrical coupling portion 61 of the outer circumferential ring 60.

After the above setting, the tip portion (crimped portion 61A) of the coupling portion 61 of the outer circumferential ring 60, which extends outward in the axial direction from the cylindrical portion 22 of the guide 20 is bent inward in the radial direction and crimped onto the outer surface of the cylindrical portion 22 of the guide 20 such that the cylindrical portion 22 is sandwiched in the axial direction between the crimped portion 61A and the stepped portion 63. Accordingly, the outer circumferential ring 60 is integrally coupled to the guide 20, and the ratchet 10 is abutted against the flange portion 62 from the outer side in the axial direction and thus not comes off in the axial direction.

Specifically, the flange portion 62 of the outer circumferential ring 60 is set such that a tip end portion thereof protruding inward in the radial direction is attached to an inclined surface 13G formed on an outer surface portion of the ratchet 10 in the axial direction at a position at which the intermediate cylindrical portion 13 and the cylindrical portion 12 are continuous. The inclined surface 13G has a shape facing obliquely outward in the radial direction, Therefore, by attaching the tip end portion of the flange portion 62 of the outer circumferential ring 60 to the inclined surface 13G, the ratchet 10 is prevented from rattling outward in the axial direction or outward in the radial direction.

Here, as shown in FIGS. 5 and 7, oblique abutting portions crimped to project inward in the axial direction are firmed on the flange portion 62 of the outer circumferential ring 60 at three positions in the rotation direction. When the oblique abutting portions 62A are disposed to overlap in the rotation direction with projecting inclined surfaces 13H that are formed on the inclined surface 13G of the ratchet 10 at three positions in the rotation direction and that each have a surface oriented outward in the axial direction and outward in the radial direction, each oblique abutting portion 62A rides on the corresponding projecting inclined surface 13H. Due to the ride-on, the oblique abutting portions 62A are held in a state in which the ratchet 10 is more appropriately prevented from rattling outward in the axial direction and outward in the radial direction.

Each of the oblique abutting portions 62A of the flange portion 62 is formed by partially bending the flange portion 62 obliquely inward in the axial direction with a joint with the stepped portion 63 as a base point. According to a shape of a die against which the ratchet 10 is abutted during half-punching, each projecting inclined surface 13H termed on the inclined surface 13G of the ratchet 10 is formed to project substantially parallel to the inclined surface 13G.

The projecting inclined surfaces 13H are arranged at equal intervals on the inclined surface 13G at three positions in the rotation direction. The projecting inclined surfaces 13H each have a length in the rotation direction of about 20 degrees. On both side portions of each projecting inclined surface 13H in the rotation direction, guide inclined surfaces 13H1 that are raised to obliquely smooth a step between the projecting inclined surface 13H and the inclined surface 13G are formed. The oblique abutting portions 62A formed on the flange portion 62 of the outer circumferential ring 60 are also arranged at equal intervals on the flange portion 62 at three positions in the rotation direction. The oblique abutting portions 62A each have a length in the rotation direction of about 20 degrees.

Figure 22:
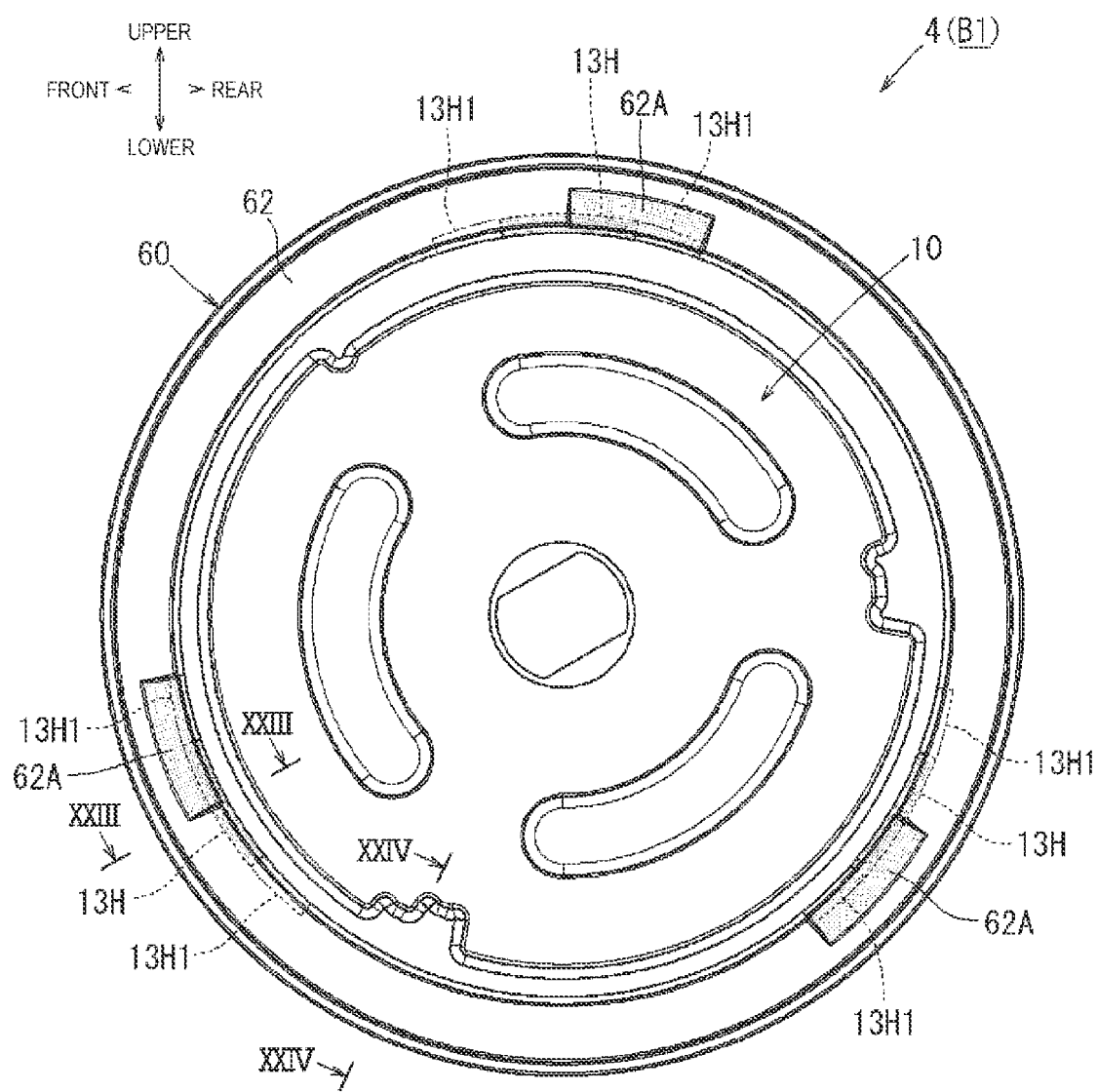
FIG. 22 is an inner side view showing a state of the vehicle seat reclining device in FIG. 21.
Figure 23:
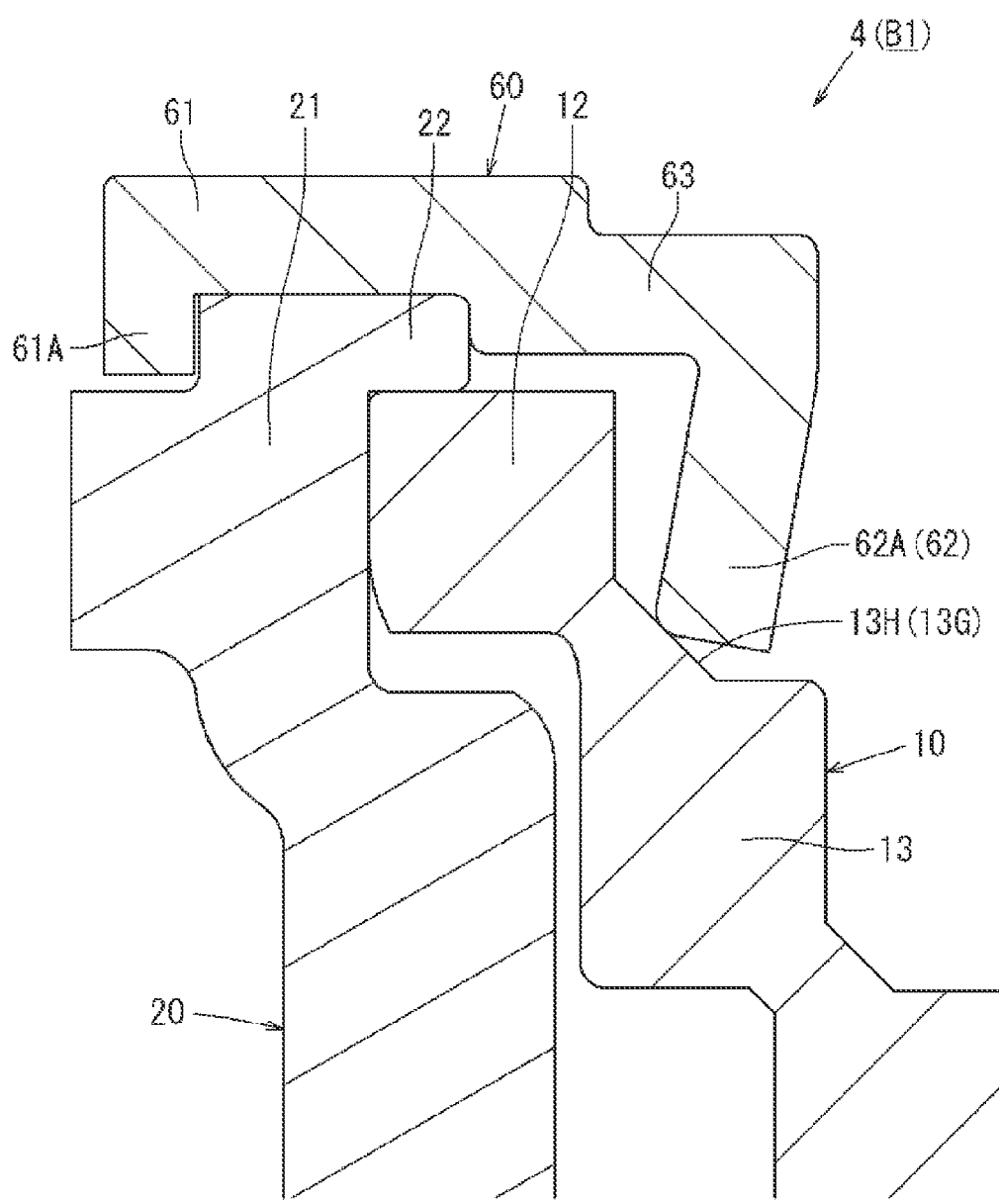
FIG. 23 is a cross-sectional view taken along a line XXIII-XXIII of FIG. 22.

The outer circumferential ring 60 is configured such that, when the backrest angle of the seat back 2 is in an angular region (abutting region B1) between a torso angle Pd (about 20 degrees) and the initial lock position Pb in a posture that the seat back 2 stands up straightly as shown in FIG. 21, the oblique abutting portions 62A of the flange portion 62 ride on and are abutted against the corresponding projecting inclined surfaces 13H formed on the inclined surface 13G of the ratchet 10 as shown in FIGS. 22 and 23.

Figure 24:
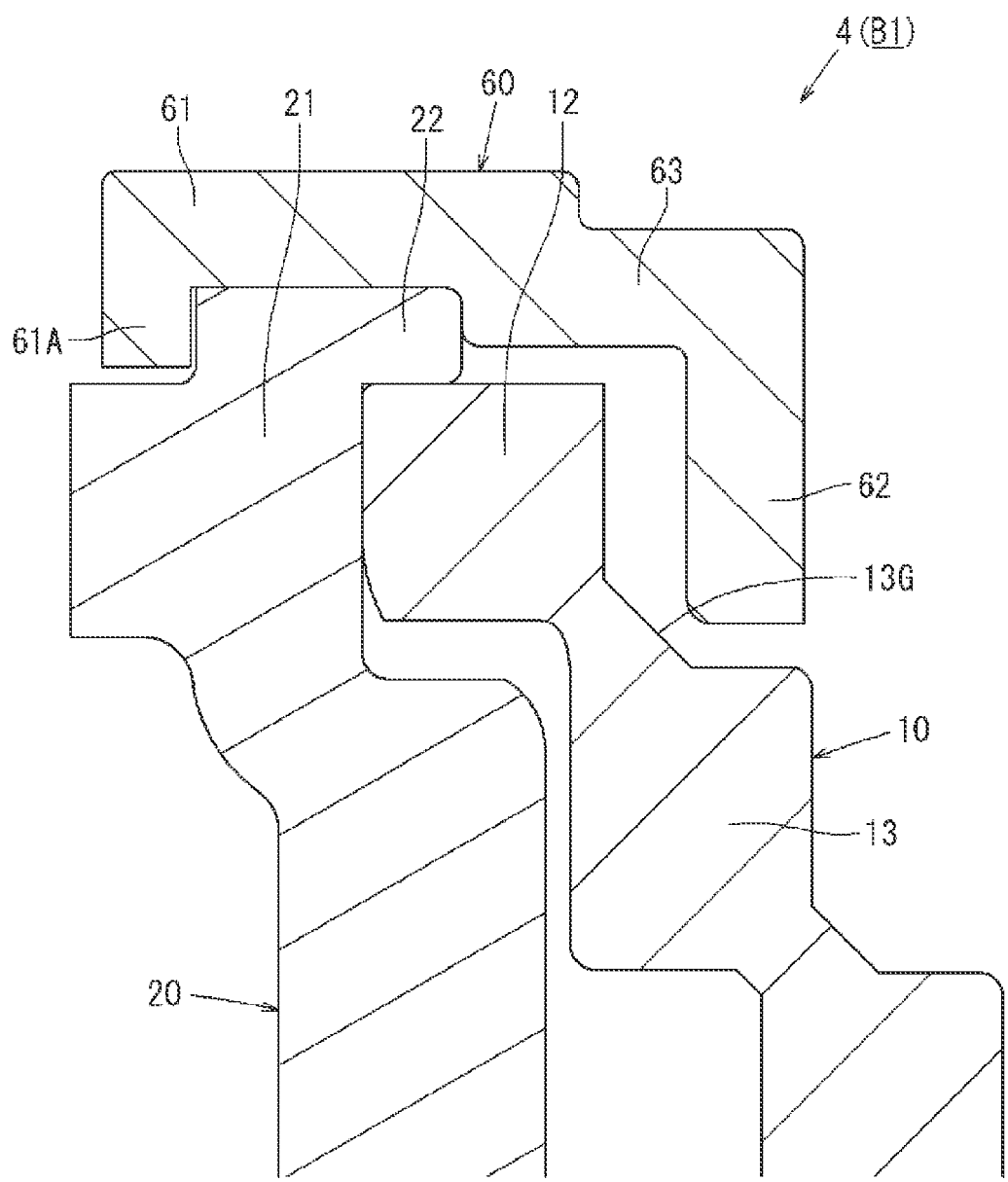
FIG. 24 is a cross-sectional view taken along a line XXIV-XXIV of FIG. 22.

Therefore, the outer circumferential ring 60 is held in a state in which the ratchet 10 is appropriately prevented from rattling in the axial direction and the radial direction by the oblique abutting portions 62A. At this time, as shown in FIG. 24, a general surface of the flange portion 62 of the outer circumferential ring 60 is in a non-abutting state of being separated from a general surface of the inclined surface 13G of the ratchet 10. As shown in FIG. 21, the abutting region B1 is set in an angular region of about 40 degrees in which the backrest angle of the seat back 2 is between an angular position at which the seat back 2 is inclined forward by about 10 degrees from the initial lock position Pb (upright position), and an angular position at which the seat back 2 is inclined rearward by about 10 degrees from the torso angle Pd.

In the abutting region B1, as shown in FIG. 22, since an effect of preventing the rattling of the ratchet 10 by the outer peripheral ring 60 is relatively strong, an effect of a sliding friction resistance force associated with the abutment between the ratchet 10 and the outer circumferential ring 60 tends to exert a prevention force on the rotational movement of the ratchet 10 with respect to the guide 20. However, when the seat back 2 is in the angular region in which the seat back 2 stands up, the biasing force of the return spring 6 (see FIG. 1) that biases the seat back 2 in the forward rotation direction is relatively strong. Therefore, even if an effect of the rattling elimination is strong, the seat back 2 can be smoothly rotationally moved.

Figure 25:
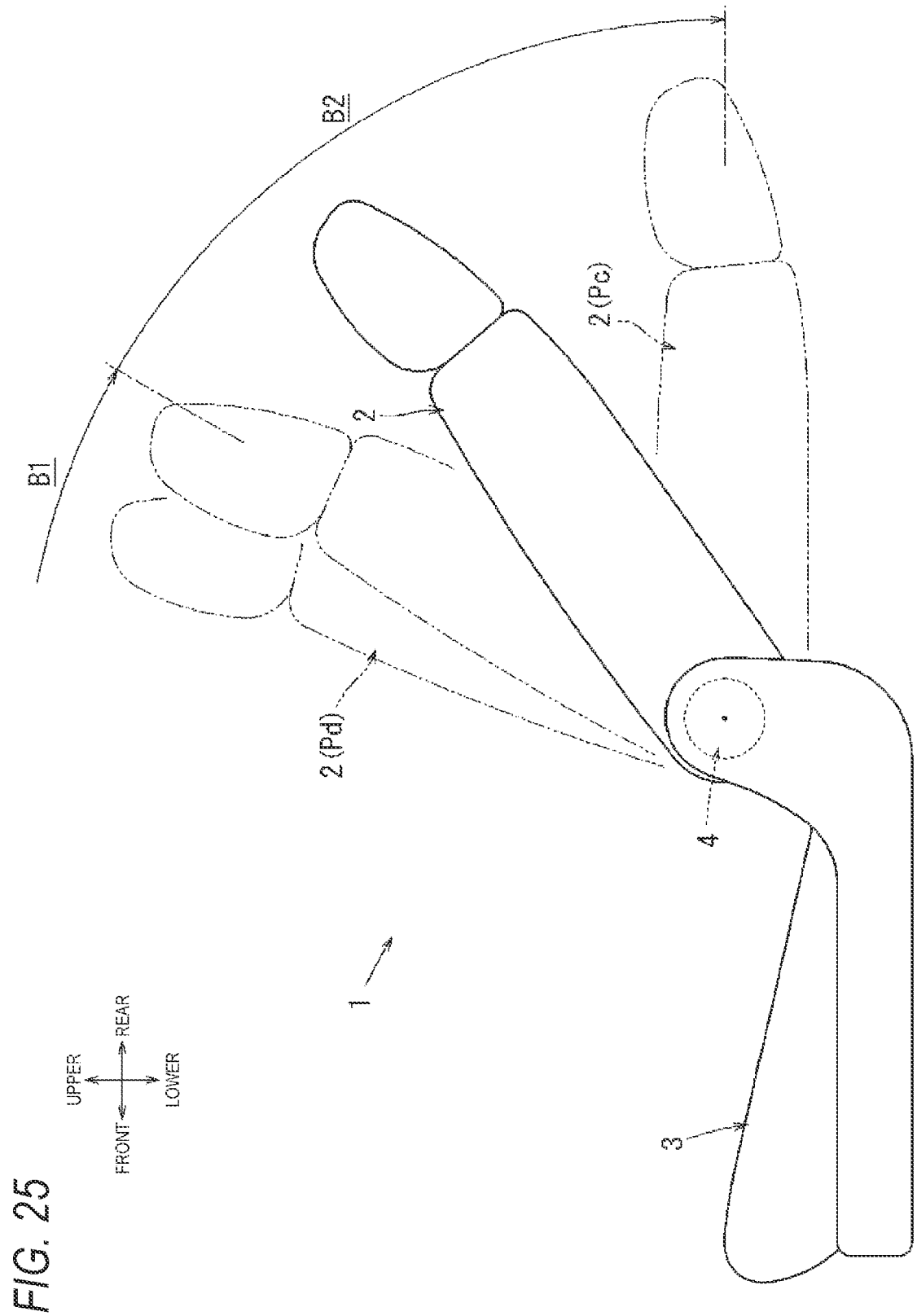
FIG. 25 is a side view showing a state in which the seat back is tilted rearward from a torso angle.
Figure 26:
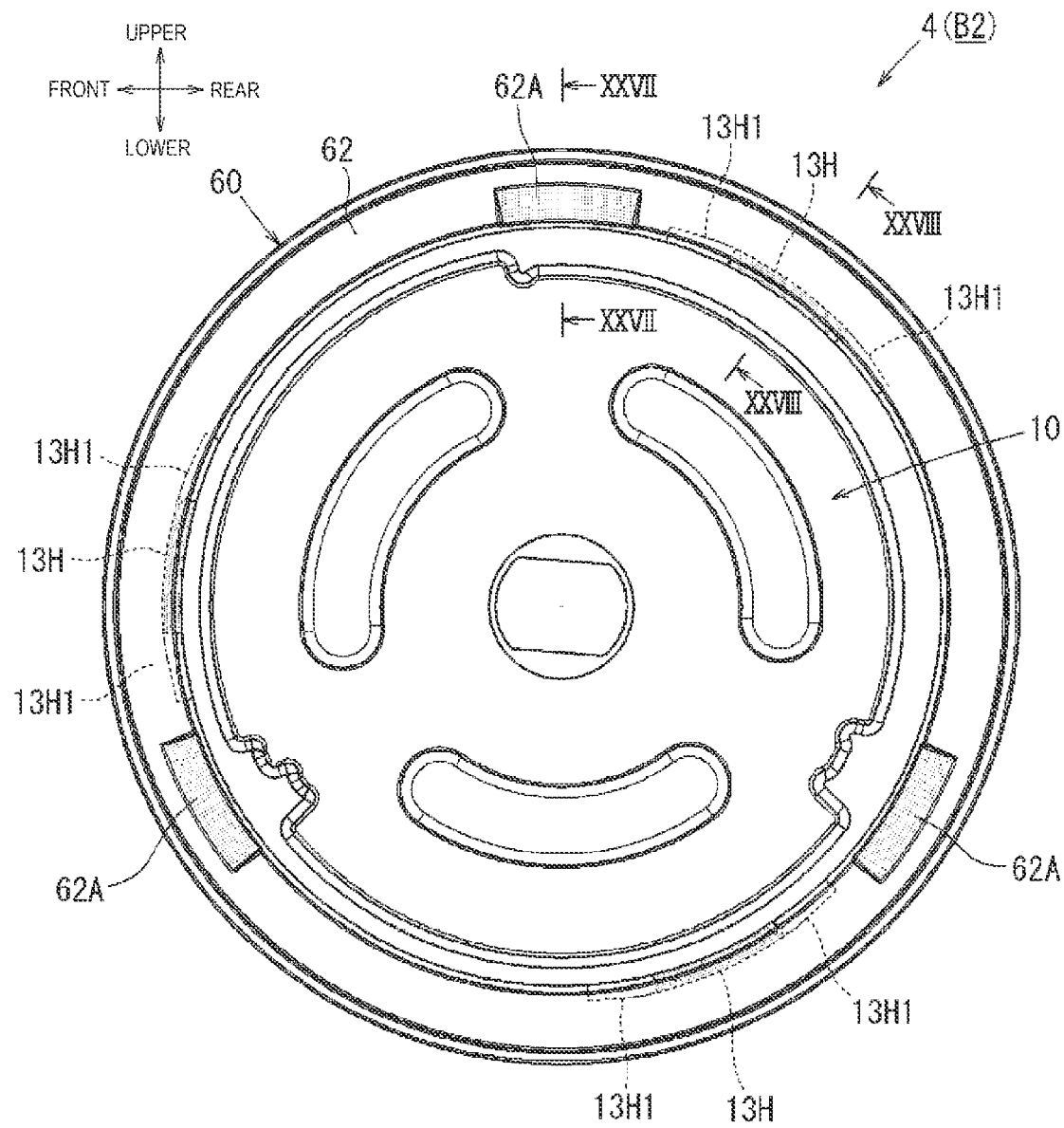
FIG. 26 is an inner side view showing a state of the vehicle seat reclining device in FIG. 25.
Figure 27:
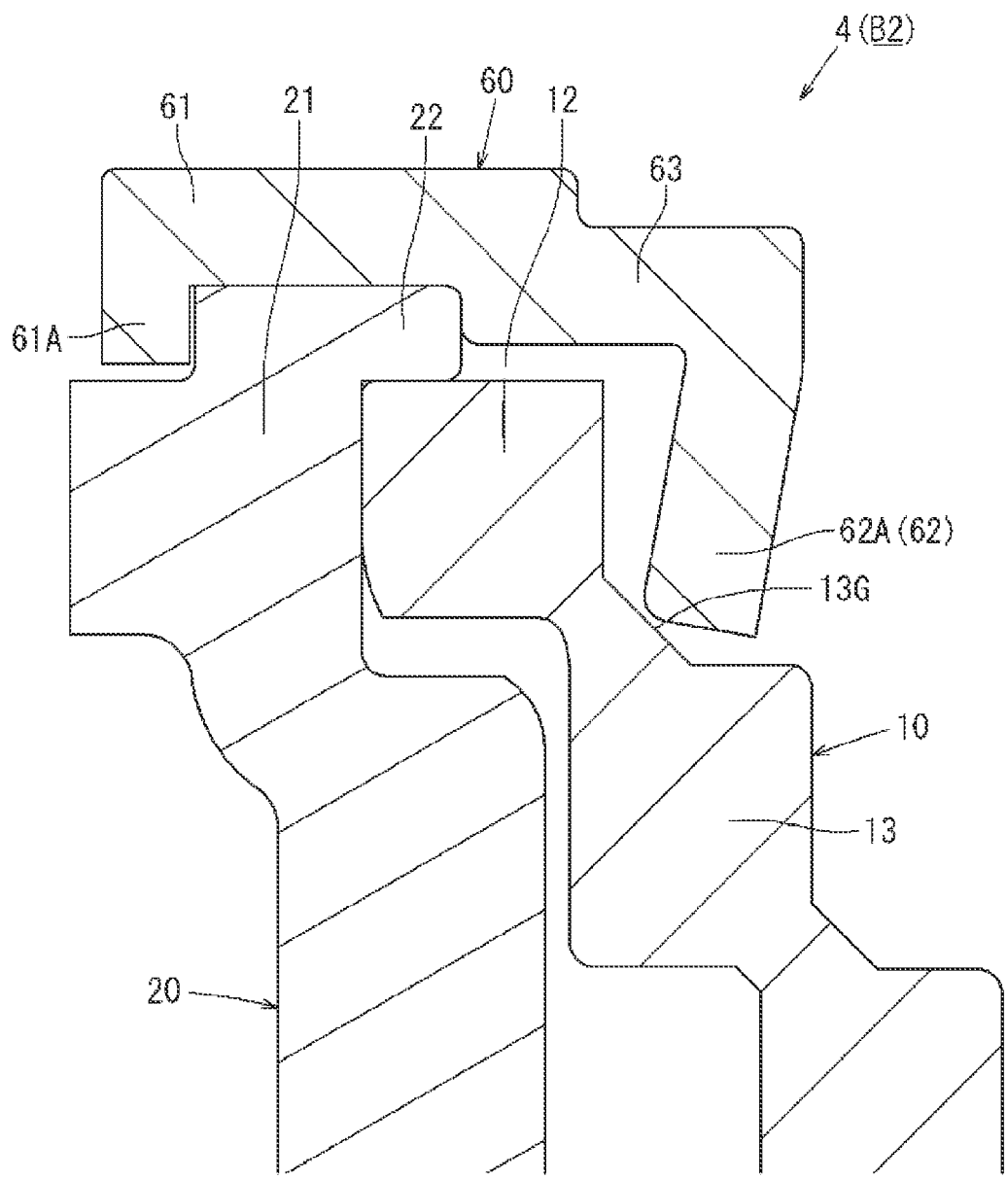
FIG. 27 is a cross-sectional view taken along a line XXVII-XXVII of FIG. 26.
Figure 28:
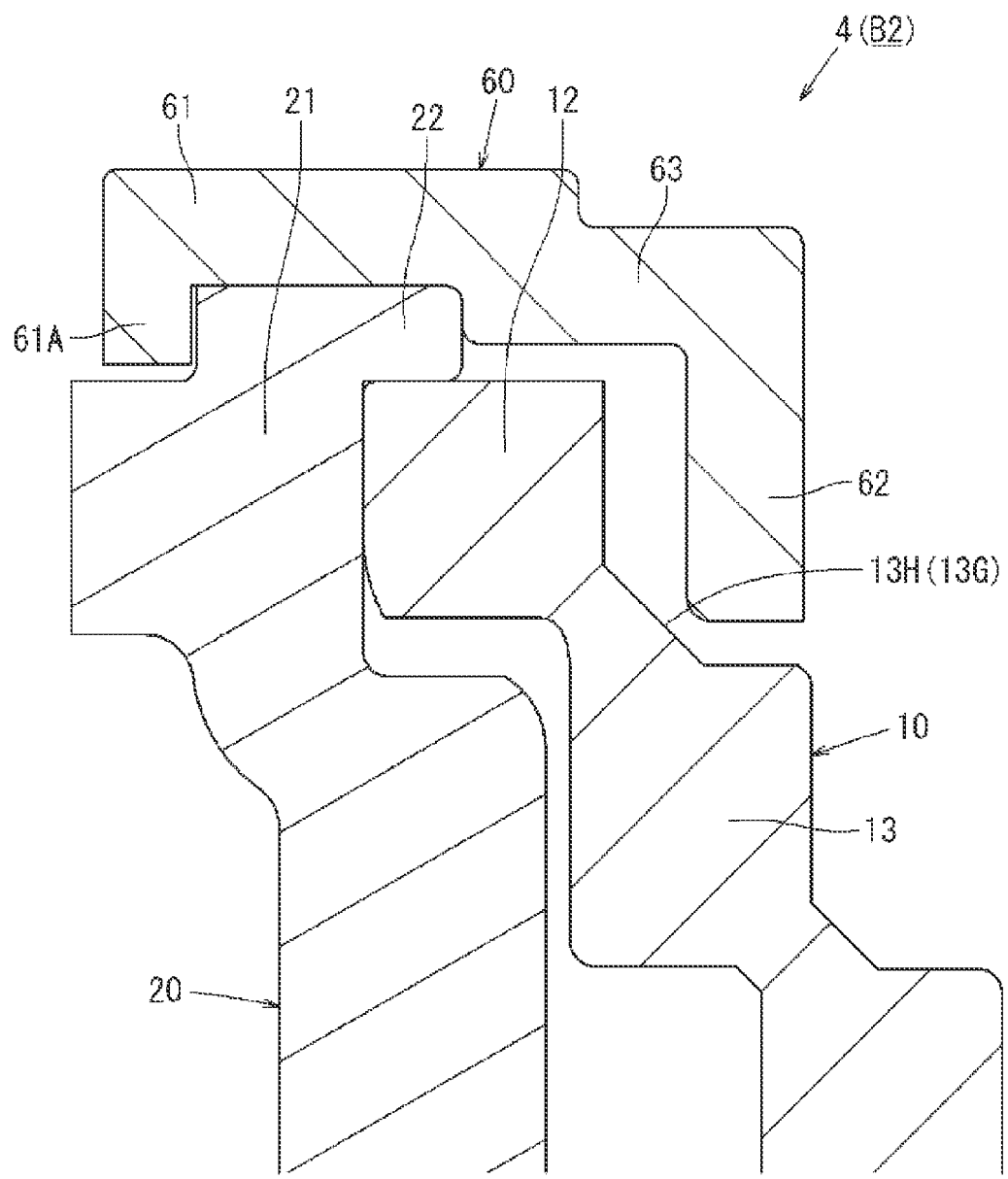
FIG. 28 is a cross-sectional view taken along a line XXVIII-XXVIII of FIG. 26.

The outer circumferential ring 60 is configured such that, as shown in FIG. 25, when the backrest angle of the seat back 2 is shifted to an angular region deviated rearward from the abutting region B1 shown in FIG. 21, as shown in FIGS. 26 to 28, the projecting inclined surfaces 13H formed on the inclined surface 13G of the ratchet 10 are deviated in the rotation direction from the corresponding oblique abutting portion 62A of the flange portion 62. As a result, the outer circumferential ring 60 is in a non-abutting state (non-abutting region B2) in which the inclined surface 13G of the ratchet 10 faces each oblique abutting portion 62A of the flange portion 62 with a slight gap.

In the non-abutting state, an effect of preventing rattling of the ratchet 10 by the outer circumferential ring 60 is weak, but the ratchet 10 can be smoothly and rotationally moved with respect to the guide 20 by the effect. Therefore, when the seat back 2 is in the angular region in which the seat back 2 is rearward tilted, although an effect of the biasing forces of the return springs 6 (see FIG. 1) that biases the seat back 2 in the forward rotation direction are relatively weak, the seat back 2 can be smoothly erected forward.

Figure 29:
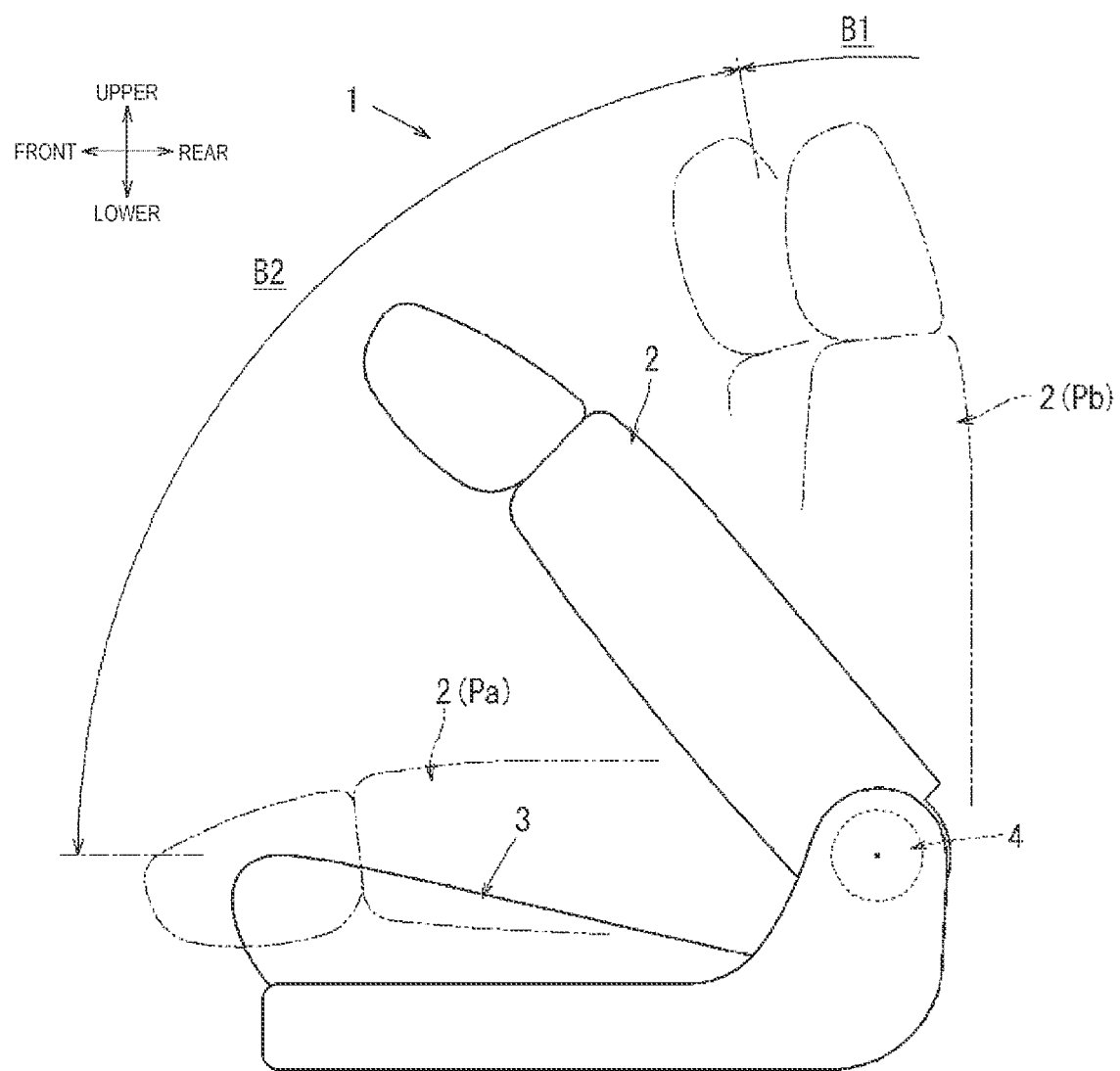
FIG. 29 is a side view showing a state in which the seat back is tilted forward from the torso angle.
Figure 30:
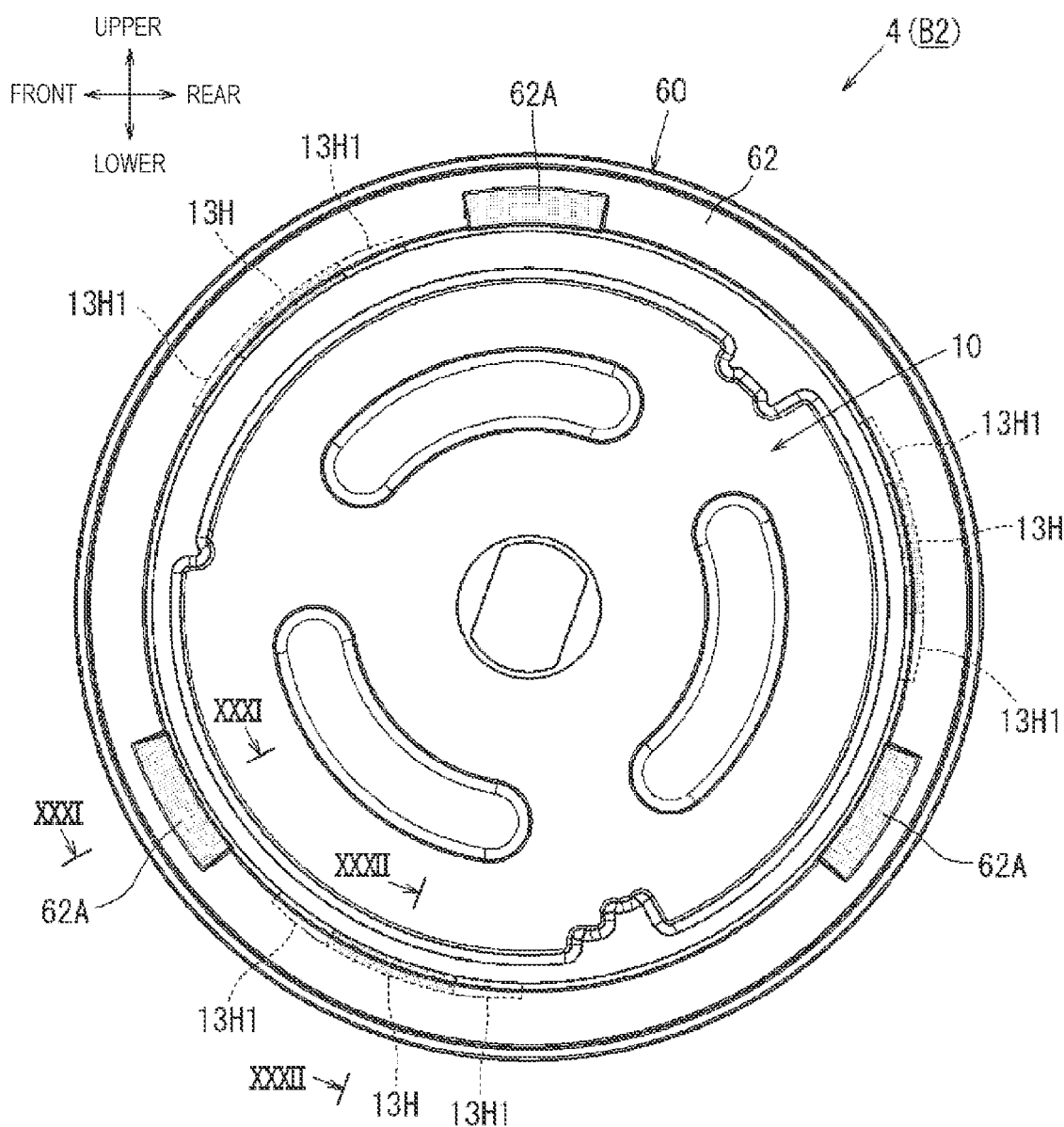
FIG. 30 is an inner side view showing a state of the vehicle seat reclining device in FIG. 29.
Figure 31:
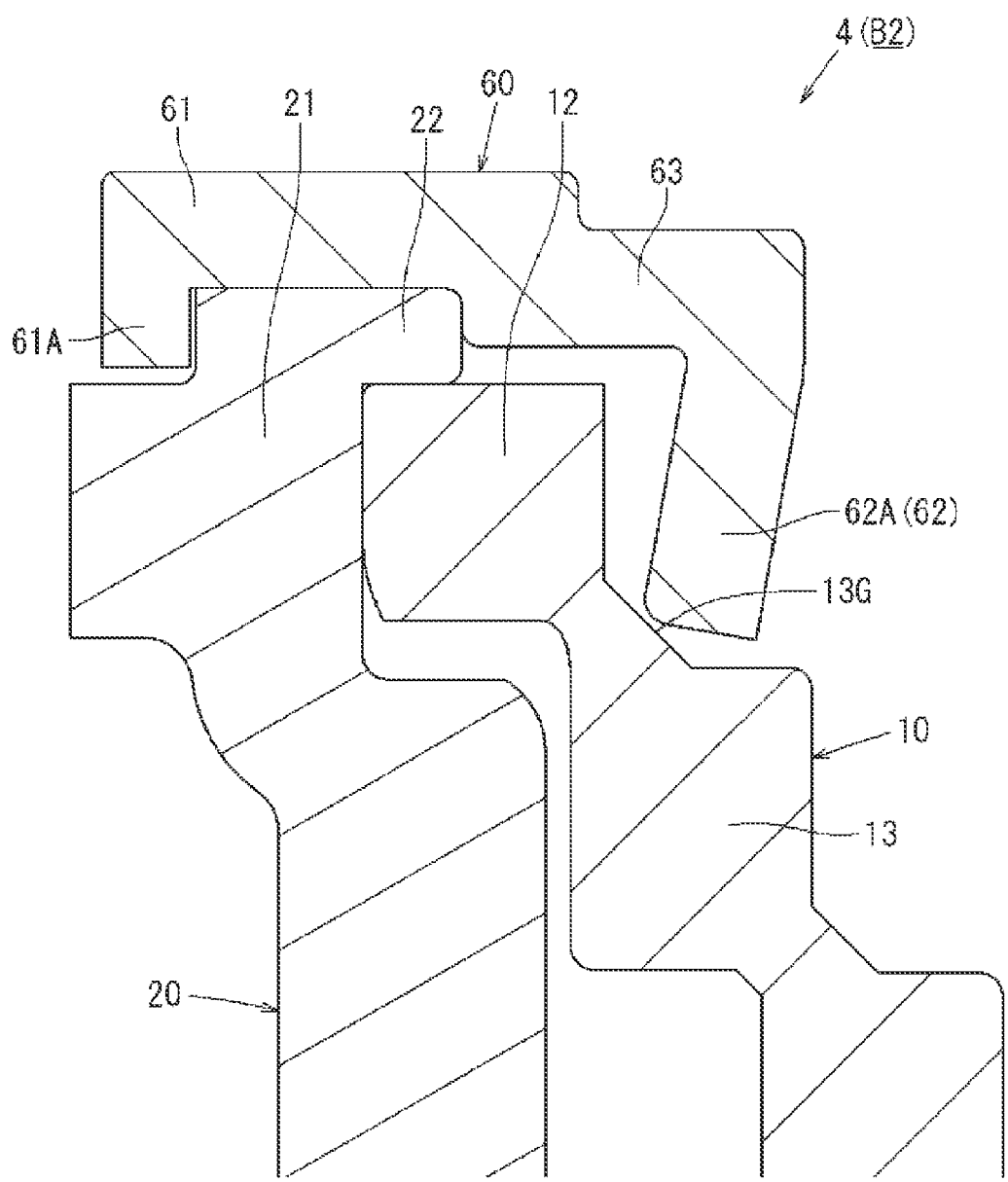
FIG. 31 is a cross-sectional view taken along a line XXXI-XXXI of FIG. 30.
Figure 32:
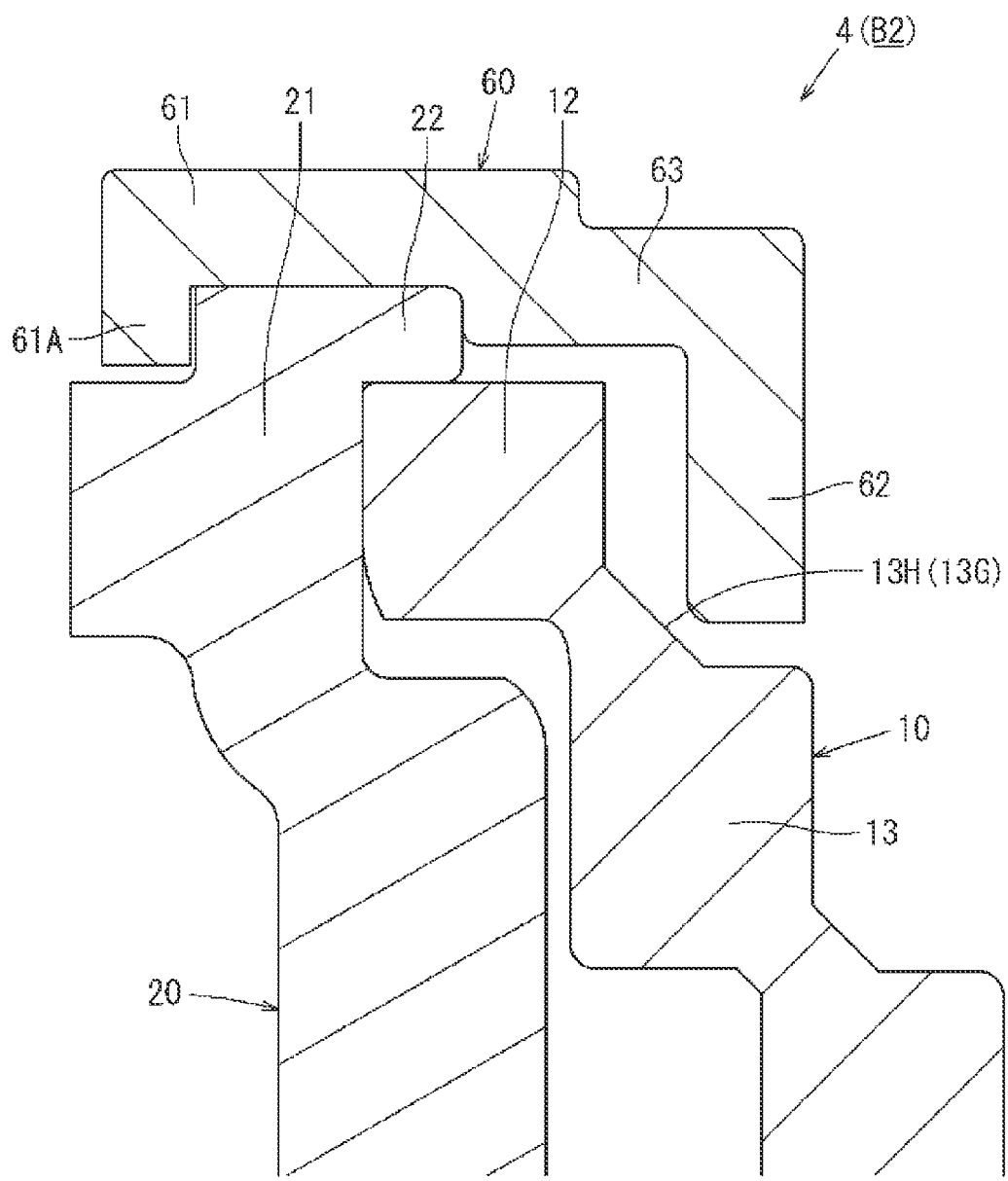
FIG. 32 is a cross-sectional view taken along a line XXXII-XXXII of FIG. 30.

The outer circumferential ring 60 is configured such that, as shown in FIG. 29, when the backrest angle of the seat back 2 is shifted to an angular region deviated forward from the abutting region B1 shown in FIG. 21, as shown in FIGS. 30 to 32, the projecting inclined surfaces 13H formed on the inclined surface 13G of the ratchet 10 are deviated in the rotation direction from the corresponding oblique abutting portion 62A of the flange portion 62. As a result, the outer circumferential ring 60 is in a non-abutting state (non-abutting region B2) in which the inclined surface 13G of the ratchet 10 faces each oblique abutting portion 62A of the flange portion 62 with a slight gap.

In the non-abutting state, an effect of preventing rattling of the ratchet 10 by the outer circumferential ring 60 is weak, but the ratchet 10 can be smoothly and rotationally moved with respect to the guide 20 by the effect. Therefore, when the seat back 2 is in the angular region in which the seat back 2 is forward tilted, although a force for erecting the seat back 2 rearward is increased, the seat back 2 can be relatively smoothly erected rearward.

Ratting Elimination Structure of Main Pawl P1

The main pawl P1 has a rattling elimination structure in which, as shown in FIG. 34, when the main pawl P1 is pressed by the rotation cam 40 and meshed with the inner teeth 12A of the ratchet 10, the main pawl P1 is slightly inclined so as to stretch between the guide walls 23 on both sides to eliminate the rattling in the rotation direction. Hereinafter, the rattling elimination structure of the main pawl P1 will be described in detail.

On the main pawl P1, a first protrusion 35A projecting toward a facing guide wall 23 is formed on a side portion of the main body surface portion 30A on a shown counter-clockwise direction side (right side in the figure). A second protrusion 35B projecting toward a facing guide wall 23 is also formed on a side portion of the main body surface portion 30A of the main pawl P1 on a shown clockwise direction side (left side in the figure).

The first protrusion 35A is formed at a position closer to an inner side than a center in the radial direction on the side portion of the main body surface portion 30A of the main pawl P1 on the shown counterclockwise direction side. The first protrusion 35A is formed to project in the shown counterclockwise direction in a projection curved surface shape having a uniform cross section over the entire area of the main pawl P1 in the plate thickness direction. The second protrusion 35B is formed at a radially outer end portion position on the side portion of the main body surface portion 30A of the main pawl P1 on the shown clockwise direction side. The second protrusion 35B is formed to project in the shown clockwise direction in a trapezoidal shape having a uniform cross section over the entire area of the main pawl P1 in the plate thickness direction.

Figure 35:
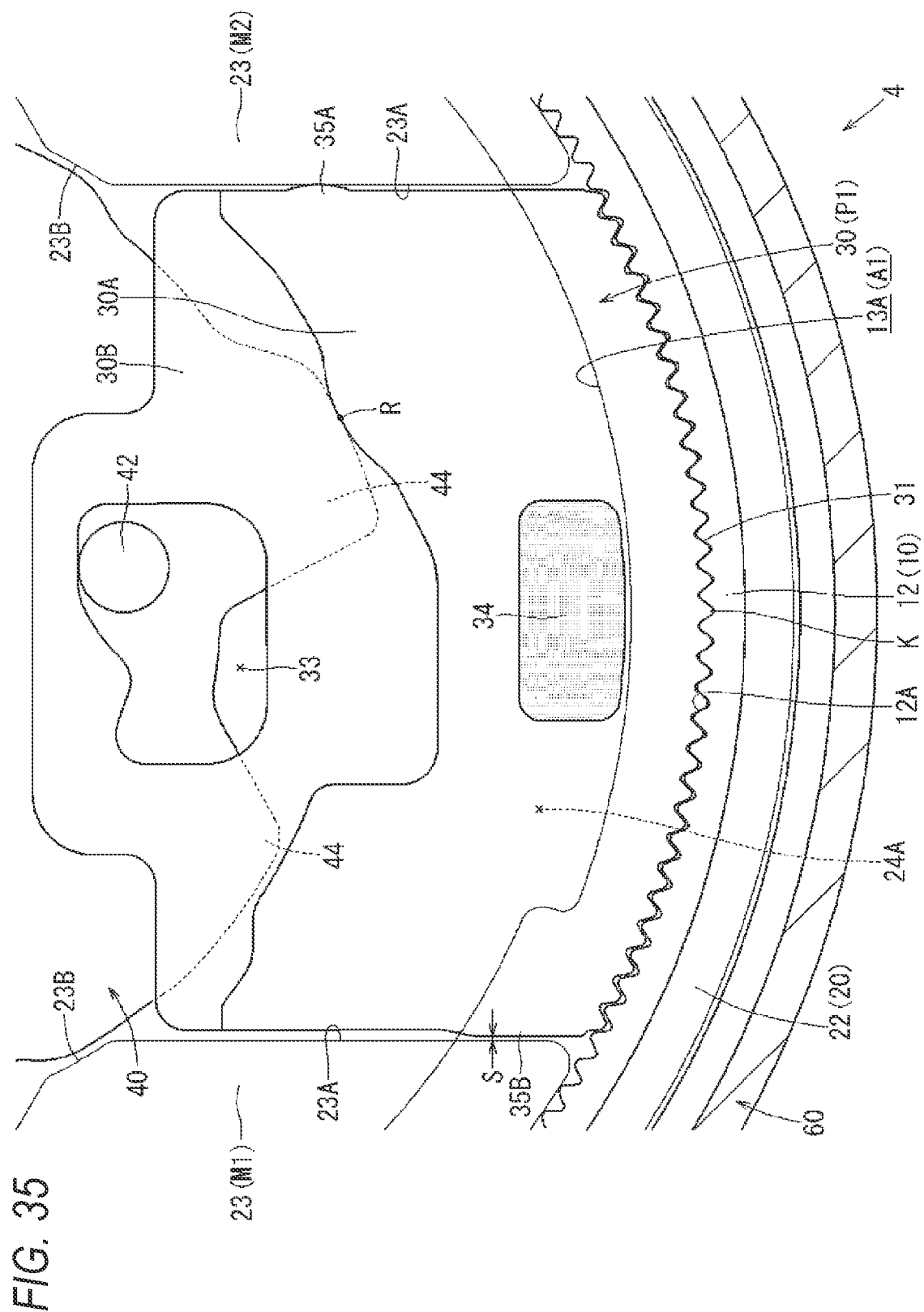
FIG. 35 is a cross-sectional view corresponding to FIG. 34 and showing a meshing state in which a first protrusion is abutted against the guide wall.

As shown in FIG. 35, the main pawl P1 has a configuration in which a gap S in the rotation direction is set between the main pawl P1 and the guide walls 23 on both sides thereof in order to ensure an inward and outward sliding performance in the radial direction. However, due to the setting of the gap S, when the main pawl P1 is pushed outward in the radial direction by the rotation cam 40 as described above in FIG. 10, rattling in which the main pawl P1 is inclined in the rotation direction between the guide walls 23 may occur.

Specifically, as shower in FIG. 35, the main pawl P1 is configured to be pressed outward from the inner side in the radial direction by the rotation cam 40 at a pressing point R that is eccentric in the shown counterclockwise direction from a central position in the rotation direction. Therefore, the main pawl P1 is configured to be pushed out to a position at which the main pawl P1 is meshed with the inner teeth 12A of the ratchet 10 while being rotated in the shown clockwise direction between both guide walls 23 with the pressing point R as a fulcrum, due to the pressing force. Alternatively, the main pawl P1 is configured such that, after the central tooth surface is meshed with the inner teeth 12A of ratchet 10, the main pawl P1 may be rotated in the shown clockwise direction with a meshing point K of the central tooth surface that is meshed most deeply with the inner teeth 12A as a fulcrum.

When the rotation of the main pawl P1 occurs, the main pawl P1 is inclined so as to stretch between both guide walls 23, and the main pawl P1 can be brought to a state in which rattling in the rotation direction is eliminated. However, when the inclination is large, the main pawl P1 may be moved such that the tooth surface on one end side, centering on the central tooth surface of the outer teeth 31 which is meshed most deeply with the inner teeth 12A of ratchet 10, reduces in a meshing depth with the inner teeth 12A. Therefore, in order to prevent occurrence of such a problem, the main pawl P1 has a configuration in which, when the main pawl P1 is inclined between both guide walls 23, the first protrusion 35A and the second protrusion 35B are respectively abutted against the guide walls 23 on both sides, so that the main pawl P1 is not greatly inclined, and the rattling in the rotation direction can be eliminated.

Specifically, as shown in FIG. 35, when the main pawl P1 is pressed outward from the inner side in the radial direction by the rotation cam 40, the main pawl P1 is rotated in the shown clockwise direction. However, due to the rotation, the first protrusion 35A is abutted with the facing guide wall 23, and thus the rotation of the main pawl P1 in the same direction is stopped at an early stage. Then, when the main pawl P1 is meshed with the inner teeth 12A of the ratchet 10 from that state, a rotational force in the shown clockwise direction around the meshing point K between the central tooth surface of the outer teeth 31 and the inner tooth 12A is applied to the main pawl P1 due to a force applied from the pressing point R.

Figure 36:
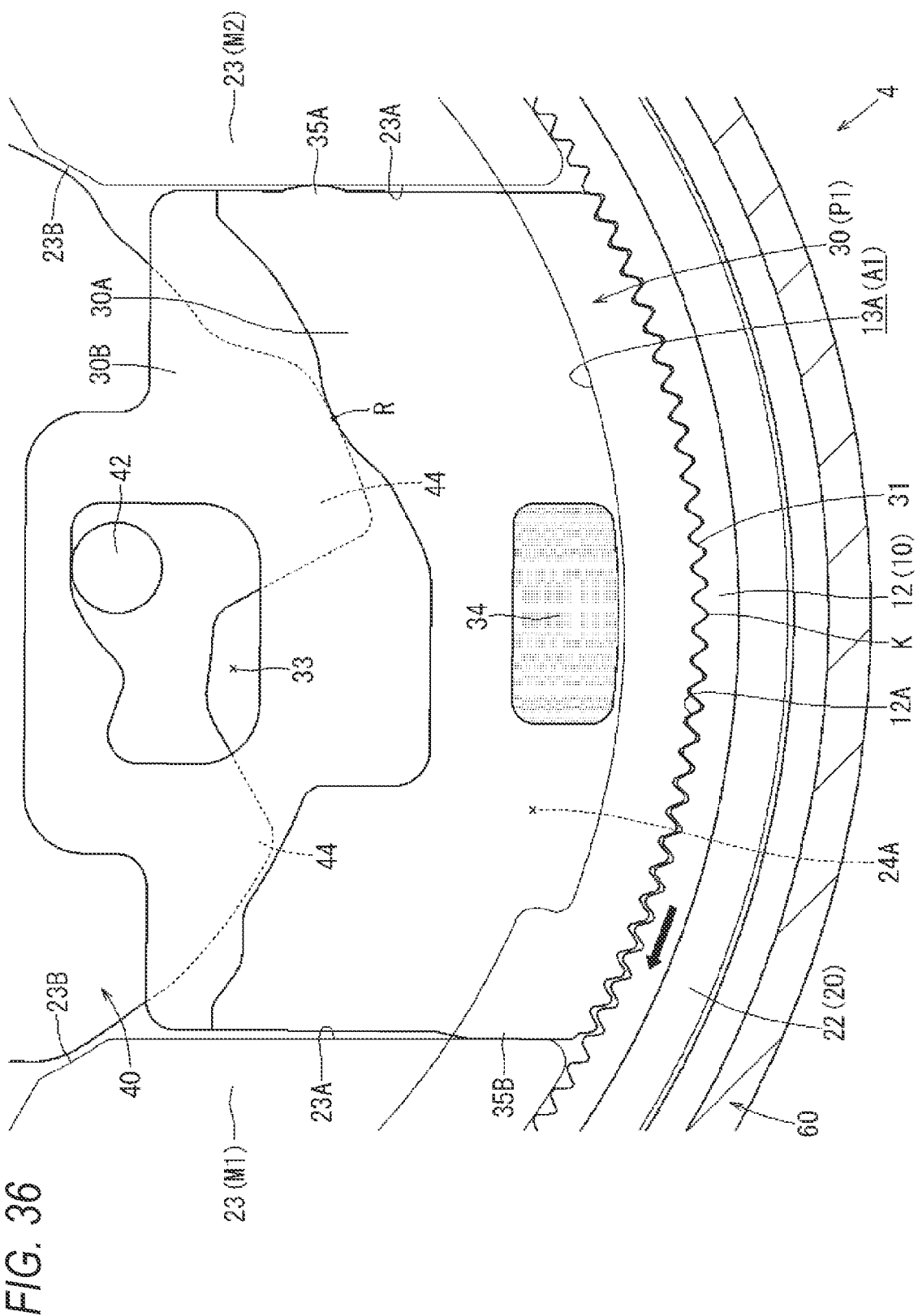
FIG. 36 is a cross-sectional view showing a state in which the ratchet is rotated in a shown clockwise direction from FIG. 35 to a position at which a second protrusion is abutted against the guide wall.

As a result, the main pawl P1 is applied with a pressing force due to the above rotational force on the guide wall 23 on the side with which the first protrusion 35A is abutted. Then, as a reaction, the main pawl P1 is applied with a rotational force for pushing the inner teeth 12A with which the central tooth surface (meshing point K) is abutted back to the shown clockwise direction with the abutting point between the first protrusion 35A and the guide wall 23 as a fulcrum. Then, as shown in FIG. 36, the main pawl P1 is slightly rotated in the shown clockwise direction with the abutting point between the first protrusion 35A and the guide wall 23 as a fulcrum and pushes the ratchet 10 in the same direction, and thus the second protrusion 35B is abutted against the facing guide wall 23.

The rotation of the main pawl P1 is stopped at an early stage due to the abutment of the second protrusion 35B with the guide wall 23. Then, due to the abutment, the main pawl P1 is meshed with the inner teeth 12A of the ratchet 10 in a state in which rattling of the main pawl P1 in the rotation direction between the guide walls 23 is eliminated.

As described above, the structure in which the first protrusion 35A and the second protrusion 35B of the main pawl P1 are abutted against the guide walls 23 on both side appropriately prevents the rattling in which the main pawl P1 is inclined in the rotation direction between the guide walls 23. As a result, the tooth surfaces on both ends of the outer teeth 31 of the main pawl P1 can be maintained in a well-balanced meshing state of being meshed with the inner teeth 12A of the ratchet 10 instead of shallow meshing.

Any phenomenon in the abutment of the main pawl P1 against the guide wall 23 on each side and the meshing of the central tooth surface (meshing point K) of the outer teeth 31 with the inner teeth 12A of the ratchet 10 may occur first. That is, no matter which phenomenon occurs first, the reaction caused by the phenomenon causes the other of the abutment and meshing. As described above, the main pawl P1 is meshed with the ratchet 10 in a state in which rattling between the main pawl P1 and the guide 20 in the rotation direction is eliminated, thus even there is rattling between other sub-pawls P2 and the guide 20 in the rotation direction as described in FIG. 10, the rattling in the rotation direction between the ratchet 10 and the guide 20 can be appropriately reduced.

Overview

In summary, the seat reclining device 4 according to the present embodiment has the following configuration. In the following description, reference numerals in parentheses correspond to respective configurations shown in the above embodiment.

That is, a vehicle seat reclining device (4) includes: a ratchet (10) and a guide (20) assembled in an axial direction to be rotatable relative to each other; a pawl (30) supported from both sides in a rotation direction by a pair of guide walls (23) provided on the guide (20), and configured to be meshed with the ratchet (10) due to movement in which the pawl (30) is pressed outward in a radial direction, so as to restrict the relative rotation between the ratchet (10) and the guide (20); and a cam (40) configured to press and move the pawl (30) outward from an inner side in the radial direction.

The pawl (30) has an eccentric structure in which the pawl (30) is pressed and inclined to one side in the rotation direction between the pair of guide walls (23) due to a pressing force received from the cam (40), and has a first protrusion (35A) that projects from a side surface of the pawl (30) on the one side in the rotation direction and restricts the inclination of the pawl (30) by contact with the guide wall (23) that the first protrusion (35A) faces.

According to the above configuration, although a gap (S) in the rotation direction is provided between the pawl (30) and each guide wall (23), the inclination of the pawl (30) in the gap (S) can be restricted by the abutment between the first protrusion (35A) and the guide wall (23). Therefore, a sliding performance of the pawl (30) can be ensured and the rattling can be prevented at the same time.

The pawl (30) further has a second protrusion (35B) that projects from a side surface of the pawl (30) on the other side in the rotation direction and holds, by contact with the guide wall (23) that the second protrusion (35B) faces, the pawl (30) in a posture in which the pawl (30) is in contact with both of the pair of guide walls (23). According to the above configuration, the pawl (30) can be abutted against both guide walls (23) and held in a state in which the gap (S) in the rotation direction is closed, and the rattling of the pawl (30) can be prevented more appropriately.

The second protrusion (35B) is located outward in the radial direction than the first protrusion (35A).

According to the above configuration, the second protrusion (35B) can be abutted against the guide wall (23) at a relatively early stage and restrict inclination of the pawl (30) when the pawl (30) is inclined, with an abutting point between the first protrusion (35A) and the guide wall (23) as a base point, in a direction to close the gap (S) between the guide wall (23) and the other side surface of the pawl (30) on an outer circumferential side close to the meshing portion with the ratchet (10).

Further, a plurality of pawls (30) are provided, and the first protrusion (35A) is firmed only on a specific pawl (P1). According to the above configuration, the rattling of the pawl (30) can be reasonably prevented.

Second Embodiment

Figure 37:
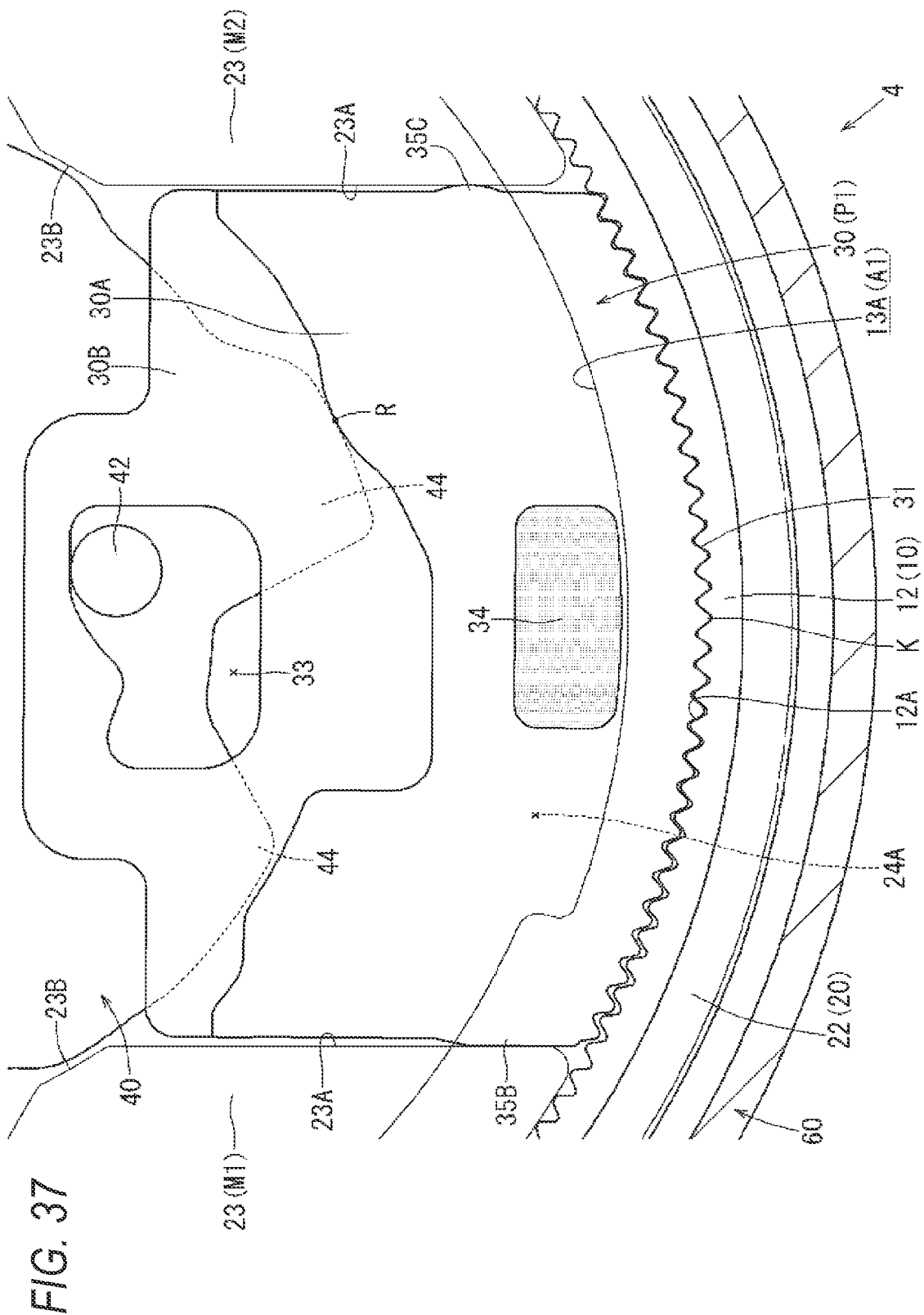
FIG. 37 is a cross-sectional view corresponding to FIG. 34 and showing a configuration of a vehicle seat reclining device according to a second embodiment.

Subsequently, a configuration of the seat reclining device 4 according to a second embodiment of the present invention will be described with reference to FIG. 37. In the present embodiment, the rattling elimination structure of the main pawl P1 is formed by a first protrusion 35C and the second protrusion 35B formed on side portions of the main pawl P1. The first protrusion 35C is formed at a position closer to an outer side than a center in the radial direction on a side portion of the main body surface portion 30A of the main pawl P1 on the shown counterclockwise direction side (right side in the figure). The first protrusion 35C is firmed to project in the shown counterclockwise direction in a projection curved surface shape having a uniform cross section over the entire area of the main pawl P1 in a plate thickness direction. The second protrusion 35B is formed at the same position as that shown in the first embodiment.

As described above, by forming the first protrusion 35C at a position closer to the outer circumferential side of the main body surface portion 30A of the main pawl P1, the following effects can be obtained. That is, after the first protrusion 35C is abutted against the facing guide wall 23, even if the main pawl P1 receives a fierce from the ratchet 10 by which the main pawl P1 is pushed back in the shown counterclockwise direction, due to an action of the pressing force received from the rotation cam 40, the main pawl P1 is easily pushed in the shown clockwise direction with an abutting point between the first protrusion 35C and the guide wall 23 as a fulcrum.

Therefore, the first protrusion 35C and the second protrusion 35B can be appropriately pressed against the guide walls 23 on both sides. Configurations other than the above are the same as those shown in the first embodiment and are accordingly denoted by the same reference numerals and detailed descriptions thereof are omitted.

Third Embodiment

Schematic Configuration of Seat Reclining Device 4 (Vehicle Seat Reclining Device)

Figure 38:
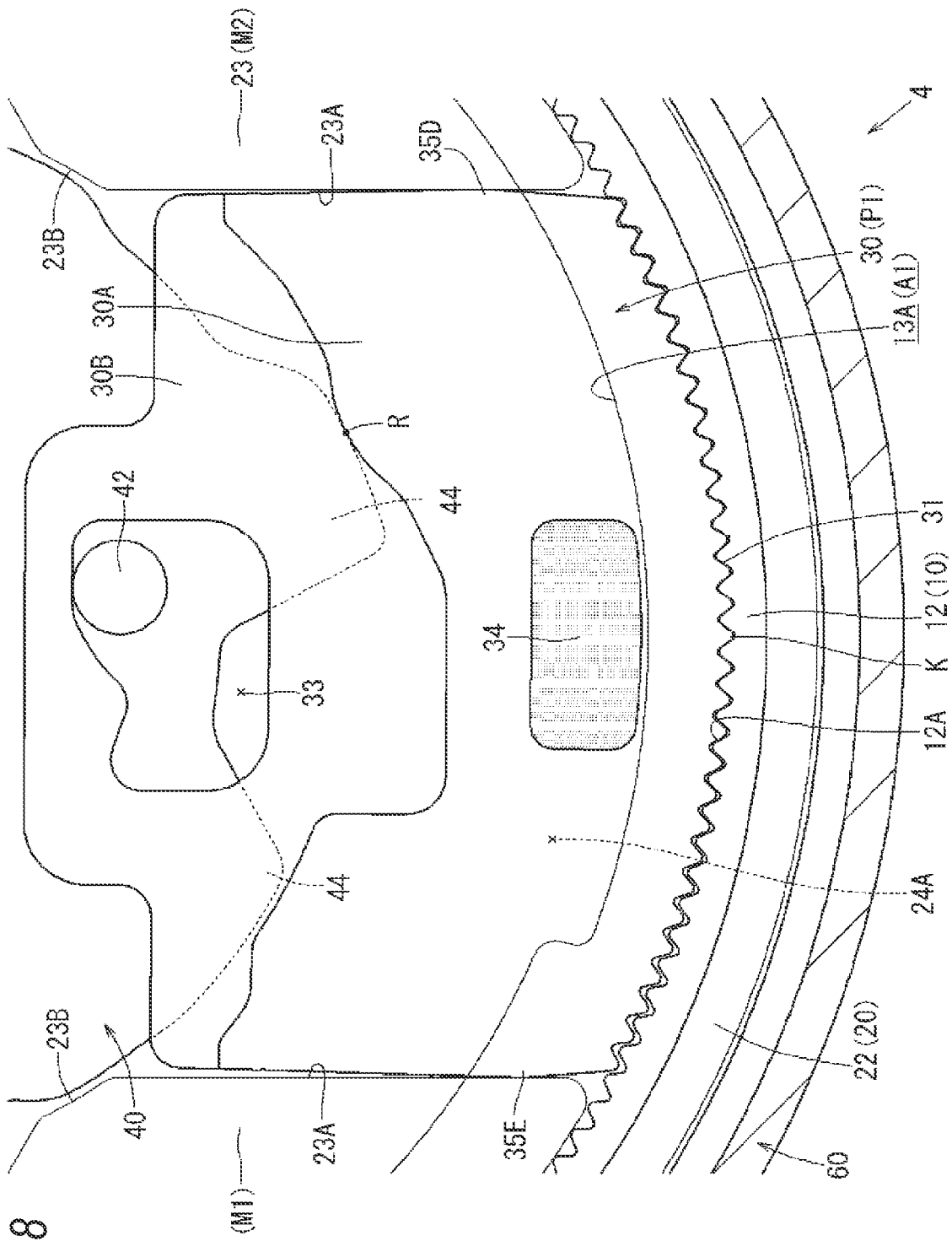
FIG. 38 is a cross-sectional view corresponding to FIG. 34 and showing a configuration of a vehicle seat reclining device according to a third embodiment.

Subsequently, a configuration of the seat reclining device 4 according to a third embodiment of the present invention will be described with reference to FIG. 38. In the present embodiment, the rattling elimination structure of the main pawl P1 is formed by a first protrusion 35D and a second protrusion 35E formed on side portions of the main pawl P1. The first protrusion 35D and the second protrusion 35E each have a shape in which a protrusion slope extends over the entire area from a radially inner edge portion to a radially outer edge portion of the main pawl P1.

Specifically, a protrusion apex of the first protrusion 35D is set at a position (the same position as the second embodiment) closer to an outer side than a center in the radial direction on the main body surface portion 30A of the main pawl P1. The first protrusion 35D is configured to project uniformly in cross section over the entire area of the main pawl P1 in a plate thickness direction. The first protrusion 35D has a shape in which protrusion slopes extend from the protrusion apex respectively to a radially inner edge portion and a radially outer edge portion of a side portion of the main pawl P1.

Specifically, the first protrusion 35D is configured such that a slope extending outward in the radial direction from the protrusion apex is formed to extend straight to an outer edge portion of a side region of the main body surface portion 30A excluding the outer teeth 31. Further, the first protrusion 35D is configured such that a slope extending inward in the radial direction from the protrusion apex is formed to extend straight to an inner edge portion of a side region of the offset surface portion 30A beyond the side region of the main body surface portion 30A.

A protrusion apex of the second protrusion 35E is set at a position (a position in a vicinity of an outer edge portion) closer to an outer side than a center in the radial direction on the main body surface portion 30A of the main pawl P1. The second protrusion 35E is firmed to project uniformly in cross section over the entire area of the main pawl P1 in a plate thickness direction. The second protrusion 35E has a shape in which protrusion slopes extend from the protrusion apex respectively to a radially inner edge portion and a radially outer edge portion of a side portion of the main pawl P1.

Specifically, the second protrusion 35E is configured such that a slope extending outward in the radial direction from the protrusion apex is formed to extend straight to an outer edge portion of a side region of the main body surface portion 30A excluding the outer teeth 31. Further, the second protrusion 35E is configured such that a slope extending inward in the radial direction from the protrusion apex is formed to extend straight to an inner edge portion of a side region of the offset surface portion 30A beyond the side region of the main body surface portion 30A.

The first protrusion 35D and the second protrusion 35E are formed before the offset surface portion 30B of the main pawl P1 is extruded into a half-punched shape from the main body surface portion 30A. By the above machining procedure, the first protrusion 35D and the second protrusion 35E have a configuration that enables simpler and more accurate shaping than those formed after the half-punched machining. By setting each of the first protrusion 35D and the second protrusion 35E into a shape in which long slopes extend inward and outward in the radial direction, the first protrusion 35D and the second protrusion 35E can be formed simply and with high accuracy as compared with those partially formed on the side portions of the main pawl P1.

Further, the first protrusion 35B and the second protrusion 35E are configured to have higher structural strength than those partially formed on the side portions of the main pawl P1. The first protrusion 35D and the second protrusion 35E each may be formed such that the protrusion slope extends at least over the entire area in the radial direction of the main body surface portion 30A, and may not extend to the offset surface portion 30B. Configurations other than the above are the same as those shown in the first embodiment and are accordingly denoted by the same reference numerals and detailed descriptions thereof are omitted, Overview In summary, the seat reclining device 4 according to the present embodiment has the following configuration. In the following description, reference numerals in parentheses correspond to respective configurations shown in the above embodiment.

That is, the pawl (30) has an eccentric structure in which the paw (30) is pressed and inclined to one side in the rotation direction between the pair of guide walls (23) due to a pressing force received from the cam (40), and has a first protrusion (35D) that projects from a side surface of the pawl (30) on the one side in the rotation direction and restricts the inclination of the pawl (30) by contact with the guide wall (23) that the first protrusion (35D) faces.

According to the above configuration, although the gap (S) in the rotation direction is provided between the pawl (30) and each guide wall (23), the inclination of the pawl (30) in the gap (S) can be restricted by the contact between the first protrusion (35D) and the guide wall (23). Therefore, a sliding performance of the pawl (30) can be ensured and the rattling can be prevented at the same time.

The pawl (30) further has a second protrusion (35E) that projects from a side surface of the pawl (30) on the other side in the rotation direction and holds, by contact with the guide wall (23) that the second protrusion (35E) faces, the pawl (30) in a posture in which the pawl (30) is in contact with both of the pair of guide walls (23). According to the above configuration, the pawl (30) can be abutted against both guide walls (23) and held in a state in which the gap (S) in the rotation direction is closed, and the rattling of the pawl (30) can be prevented more appropriately.

The second protrusion (35E) is located outward in the radial direction than the first protrusion (35D). According to the above configuration, the second protrusion (35E) can be abutted against the guide wall (23) at a relatively early stage and restrict inclination of the pawl (30) when the pawl (30) is inclined, with an abutting point between the first protrusion (35D) and the guide wall (23) as a base point, in a direction to close the gap (S) between the guide wall (23) and the other side surface of the pawl (30) on an outer circumferential side close to the meshing portion with the ratchet (10).

Further, the pawl (30) has a main body surface portion (30A) that receives, from the inner side in the radial direction, the pressing force from the cam (40), and an offset surface portion (30B) that has a shape of being extruded from the main body surface portion (30A) into a half-punched shape in the axial direction and is disposed adjacently with the cam (40) in the axial direction. The second protrusion (35E) has a shape in which a slope of the second protrusion (35E) extends over at least an entire area of the main body surface portion (30A) on the side surface of the pawl (30) on the other side in the rotation direction. According to the above configuration, the structural strength of the second protrusion (35E) can be increased as compared with a configuration in which the second protrusion (35E) is partially formed on the other side surface of the pawl (30) in the rotation direction. Further, the second protrusion (35E) can be simply shaped.

Further, a plurality of pawls (30) are provided, and the first protrusion (35D) is formed only on a specific pawl (P1). According to the above configuration, the rattling of the pawl (30) can be reasonably prevented.

The first protrusion (35D) has a shape in which a protrusion slope extends over at least an entire area of the main body surface portion (30A) on the side surface of the pawl (30) on the one side in the rotation direction. According to the above configuration, the structural strength of the first protrusion (35D) can be increased as compared with a configuration in which the first protrusion (35D) is partially formed on the one side surface of the pawl (30) in the rotation direction. Further, the first protrusion (35D) can be simply shaped.

Fourth Embodiment

Schematic Configuration of Seat Reclining Device 4 (Vehicle Seat Reclining Device)

Figure 39:
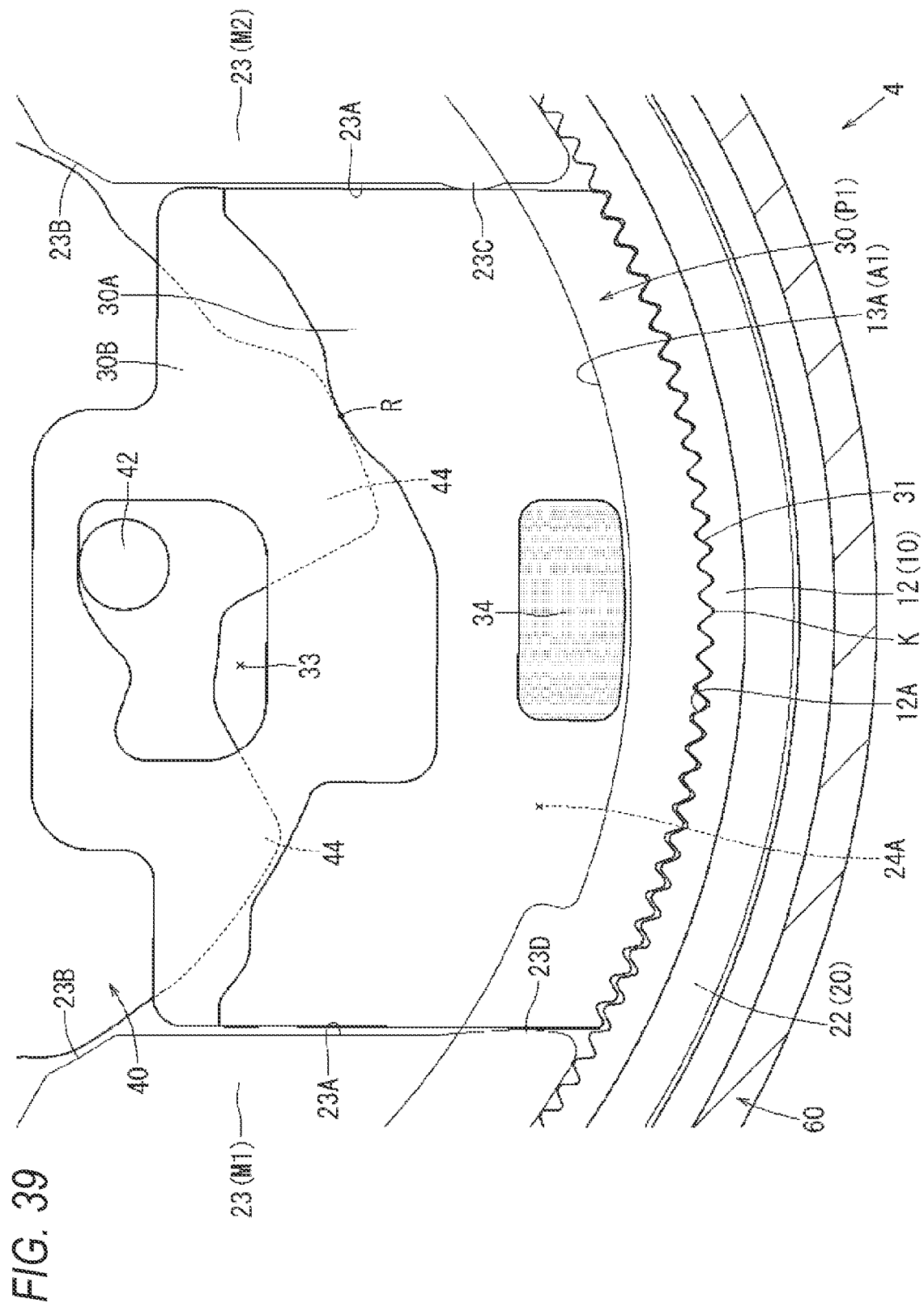
FIG. 39 is a cross-sectional view corresponding to FIG. 34 and showing a configuration of a vehicle seat reclining device according to a fourth embodiment.

Subsequently, a configuration of the seat reclining device 4 according to a fourth embodiment of the present invention will be described with reference to FIG. 39. In the present embodiment, the rattling elimination structure of the main pawl P1 is formed by a first protrusion 23C and a second protrusion 23D formed on regulating surfaces 23A of each guide wall 23 which supports the main pawl P1 from both sides in the rotation direction.

Specifically, the first protrusion 23C is formed to project in a mountain shape at a position of the guide wall 23 at which the main pawl P1 is abutted against the guide wall 23 from a lateral side at a position (a position corresponding to the abutting point of the second embodiment) closer to the outer side than the center in the radial direction on the main body surface portion 30A when the main pawl P1 is meshed with the ratchet 10. The first protrusion 23C is formed to project in the shown clockwise direction in a projection curved surface shape having a uniform cross section over the entire area of the guide wall 23 in a plate thickness direction.

The second protrusion 23D is formed to project in a mountain shape at a position of the guide wall 23 at which the main pawl P1 is abutted against the guide wall 23 from a lateral side at a position (a position in the vicinity of the outer edge portion: a position corresponding to the abutting point of the second embodiment) closer to the outer side than the center in the radial direction on the main body surface portion 30A when the main pawl P1 is meshed with the ratchet 10. The second protrusion 23D is formed to project in the shown counterclockwise direction in a projection curved surface shape having a uniform cross section over the entire area of the guide wall 23 in a plate thickness direction.

The first protrusion 23C and the second protrusion 23D are disposed to be located inward in the radial direction than the outer teeth 31 of the main pawl PT, even when the main pawl P1 is released from the meshing with the ratchet 10 and pulled inward as much as possible in the radial direction. Accordingly, the first protrusion 23C and the second protrusion 23D are not abutted against the main pawl P1 in the radial direction when the main pawl P1 is pushed outward in the radial direction so as to be meshed with the ratchet 10. Configurations other than the above are the same as those shown in the first embodiment and are accordingly denoted by the same reference numerals and detailed descriptions thereof are omitted.

Overview

In summary, the seat reclining device 4 according to the present embodiment has the following configuration. In the following description, reference numerals in parentheses correspond to respective configurations shown in the above embodiment.

That is, a vehicle seat reclining device (4) includes an eccentric structure in which the pawl (30) is pressed and inclined to one side in the rotation direction between the pair of guide walls (23) due to a pressing force received from the cam (40), and a first protrusion (23C) that projects from the guide wall (23) that faces a side surface of the pawl (30) on the one side in the rotation direction and restricts the inclination of the pawl (30) by contact with the pawl (30).

According to the above configuration, although the gap (S) in the rotation direction is provided between the pawl (30) and each guide wall (23), the inclination of the pawl (30) in the gap (S) can be restricted by the contact between the first protrusion (23C) and the pawl (30). Therefore, a sliding performance of the pawl (30) can be ensured and the rattling can be prevented at the same time.

The vehicle seat reclining device (4) further includes a second protrusion (23D) configured to project from the guide wall (23) that faces a side surface of the pawl (30) on the other side in the rotation direction and restrict the inclination of the pawl (30) by contact with the pawl (30), so as to hold the pawl (30) in a posture in which the pawl (30) is in contact with both of the pair of guide walls (23).

According to the above configuration, the pawl (30) can be abutted against both guide walls (23) and held in a state in which the gap (S) in the rotation direction is closed, and the rattling of the pawl (30) can be prevented more appropriately.

Fifth Embodiment

Schematic Configuration of Seat Reclining Device 4 (Vehicle Seat Reclining Device)

Figure 40:
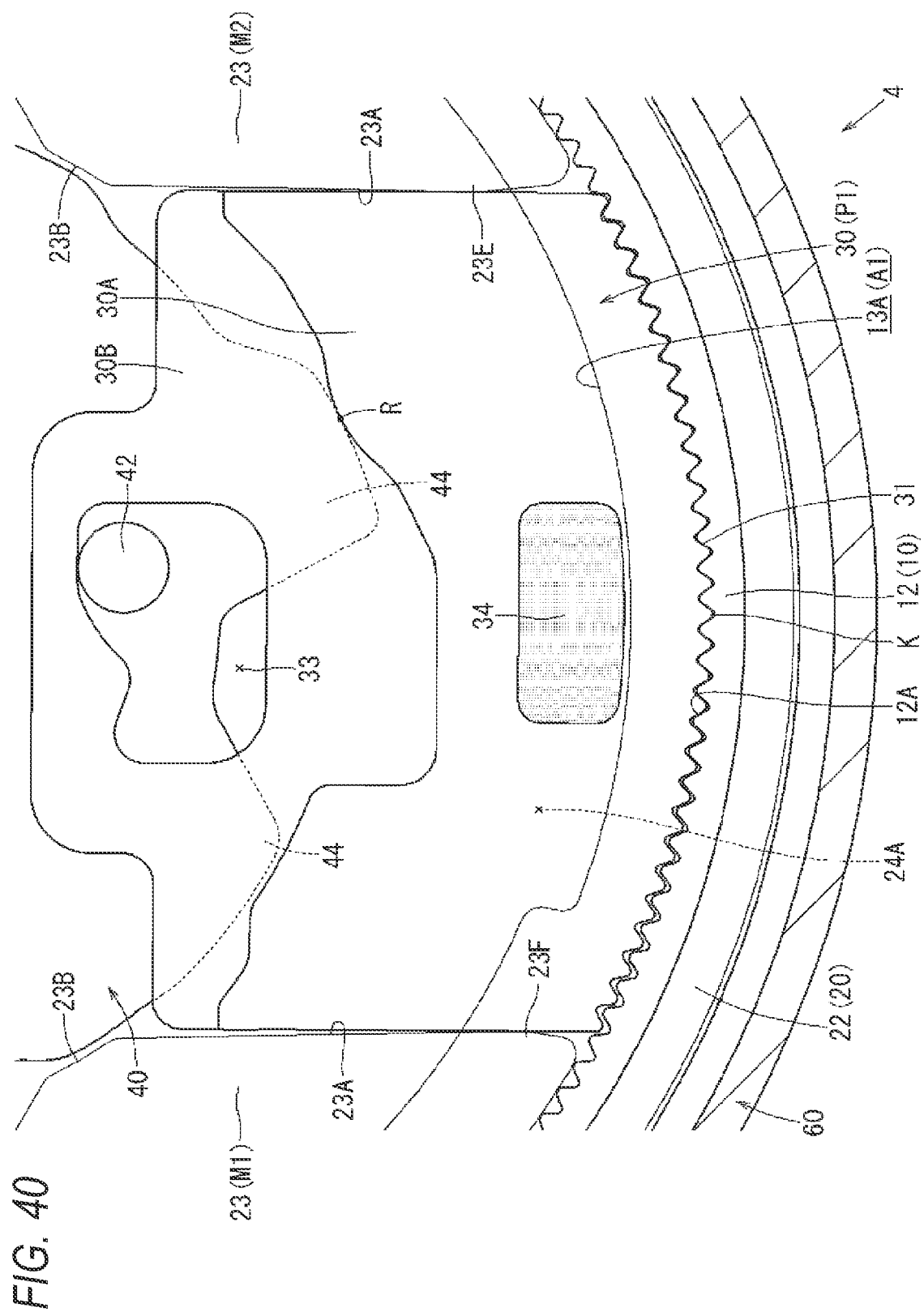
FIG. 40 is a cross-sectional view corresponding to FIG. 34 and showing a configuration of a vehicle seat reclining device according to a fifth embodiment.

Subsequently, a configuration of the seat reclining device 4 according to a fifth embodiment of the present invention will be described with reference to FIG. 40. In the present embodiment, the rattling elimination structure of the main pawl P1 is formed by a first protrusion 23E and a second protrusion 23F formed on regulating surfaces 23A of each guide wall 23 which supports the main pawl P1 from both sides in the rotation direction. The first protrusion 23E and the second protrusion 23F each have a shape in which a protrusion slope extends over the entire area from a radially inner edge portion to a radially outer edge portion of each regulating surface 23A.

Specifically, the first protrusion 23E is set at a position at which a protrusion apex thereof is abutted from a lateral side against the main pawl P1 at a position (the position corresponding to the abutting point of the fourth embodiment) closer to an outer side than a center in the radial direction on the main body surface portion 30A when the main pawl P1 is meshed with the ratchet 10. The first protrusion 23E is formed to project uniformly in cross section over the entire area of the guide wall 23 in a plate thickness direction. The first protrusion 23E has a shape in which protrusion slopes extend from the protrusion apex respectively to a radially inner edge portion (round end) and a radially outer edge portion (round end) of the regulating surface 23A of the guide wall 23.

Specifically, the first protrusion 23E is configured such that a slope extending outward in the radial direction from the protrusion apex is formed to extend straight to the radially outer edge portion (round end) of the regulating surface 23A of the guide wall 23. Further, the first protrusion 23E is configured such that a slope extending inward in the radial direction from the protrusion apex is formed to extend straight to the radially inner edge portion (round end) of the regulating surface 23A of the guide wall 23.

Specifically, the second protrusion 23F is set at a position at which a protrusion apex thereof is abutted from a lateral side against the main pawl P1 at a position (a position in a vicinity of an outer edge portion: the position corresponding to the abutting point of the fourth embodiment) closer to an outer side than a center in the radial direction on the main body surface portion 30A when the main pawl P1 is meshed with the ratchet 10. The second protrusion 23F is formed to project uniformly in cross section over the entire area of the guide wall 23 in a plate thickness direction. The second protrusion. 23F has a shape in which protrusion slopes extend from the protrusion apex respectively to a radially inner edge portion (round end) and a radially outer edge portion (round end) of the regulating surface 23A of the guide wall 23.

Specifically, the second protrusion 23F is configured such that a slope extending outward in the radial direction from the protrusion apex is formed to extend straight to the radially outer edge portion (round end) of the regulating surface 23A of the guide wall 23. Further, the second protrusion 23F is configured such that a slope extending inward in the radial direction from the protrusion apex is formed to extend straight to the radially inner edge portion (round end) of the regulating surface 23A of the guide wall 23.

By setting each of the first protrusion 23E and the second protrusion 23F into a shape in which long slopes extend inward and outward in the radial direction, the first protrusion 23E and the second protrusion 23F can be formed simply and with high accuracy as compared with those partially formed on the regulating surfaces 23A of the guide walls 23. Further, the first protrusion 23E and the second protrusion 23F are configured to have higher structural strength than those partially formed on the regulating surfaces 23A of the guide walls 23.

The first protrusion 23E and the second protrusion 23F each have a shape in which the protrusion apex is located inward in the radial direction than the outer teeth 31 of the main pawl P1, even when the main pawl P1 is released from the meshing with the ratchet 10 and pulled inward as much as possible in the radial direction. Accordingly, the first protrusion 23E and the second protrusion 23F are configured such that the slopes erected toward the protrusion apex do not hinder outward movement of the main pawl P1 in the radial direction when the main pawl P1 is pushed outward in the radial direction so as to be meshed with the ratchet 10. Configurations other than the above are the same as those shown in the first embodiment and are accordingly denoted by the same reference numerals and detailed descriptions thereof are omitted.

Overview

In summary, the seat reclining device 4 according to the present embodiment has the following configuration. In the following description, reference numerals in parentheses correspond to respective configurations shown in the above embodiment.

That is, a vehicle seat reclining device (4) includes an eccentric structure in which the pawl (30) is pressed and inclined to one side in the rotation direction between the pair of guide walls (23) due to a pressing force received from the cam (40), and a first protrusion (23E) that projects from the guide wall (23) that faces a side surface of the pawl (30) on the one side in the rotation direction and restricts the inclination of the pawl (30) by contact with the pawl (30).

According to the above configuration, although the gap (S) in the rotation direction is provided between the pawl (30) and each guide wall (23), the inclination of the pawl (30) in the gap (S) can be restricted by the abutment between the first protrusion (23E) and the pawl (30). Therefore, a sliding performance of the pawl (30) can be ensured and the rattling can be prevented at the same time.

The vehicle seat reclining device (4) further includes a second protrusion (23F) configured to project from the guide wall (23) that faces a side surface of the pawl (30) on the other side in the rotation direction and restrict the inclination of the pawl (30) by contact with the pawl (30), so as to hold the pawl (30) in a posture in which the pawl (30) is in abutted with both of the pair of guide walls (23). According to the above configuration, the pawl (30) can be abutted against both guide walls (23) and held in a state in which the gap (S) the rotation direction is closed, and the rattling of the pawl (30) can be prevented more appropriately.

Further, the second protrusion (23F) has a shape in which a slope of the second protrusion (23F) extends over an entire area of a side surface of the guide wall (23) that faces the pawl (30). According to the above configuration, the structural strength of the second protrusion (23F) can be increased as compared with a configuration in which the second protrusion (23F) is partially formed on the guide wall (23). Further, the second protrusion (23F) can be simply shaped.

Further, the first protrusion (23E) has a shape in which a slope of the first protrusion (23E) extends over an entire area of a side surface of the guide wall (23) that faces the pawl (30). According to the above configuration, the structural strength of the first protrusion (23E) can be increased as compared with a configuration in which the first protrusion (23E) is partially formed on the guide wall (23). Further, the first protrusion (23E) can be simply shaped.

Other Embodiments

Although the embodiments of the present invention have been described using five embodiments, the present invention can be implemented in various forms other than the above embodiments.

1. The vehicle seat reclining device of the present invention can be applied to a seat other than a right seat of an automobile, and can also be widely applied to a seat provided for a vehicle other than an automobile such as a railway, or various vehicles such as an aircraft and a ship. The vehicle seat reclining device may couple the seat back to the seat cushion in a state in which the backrest angle can be adjusted, and may also couple the seat back to a base, such as a bracket fixed to a vehicle main body, in a state in which the backrest angle can be adjusted.

2. The vehicle seat reclining device may be configured such that the ratchet is coupled to a base fixed to a vehicle main body, such as a seat cushion, and the guide is coupled to a seat back.

3. Two or four or more pawls for locking the relative rotation between the ratchet and the guide may be provided adjacently in the rotation direction. An arrangement of the pawls in the rotation direction is not limited to an even arrangement, and the pawls may be arranged in a biased manner.

4. The cam that presses the pawls outward from the inner side in the radial direction is not limited to a rotation type configuration, and may be a sliding type configuration in which the cam presses the pawls outward from the inner side in the radial direction by sliding in the radial direction, as disclosed in JP-A-2014-217662 or the like. Further, the operation of pulling back the pawls inward in the radial direction may be performed using a member separated from the cam such as a release plate as disclosed in JP-A-2015-227071 or the like.

5. The abutting portion of the outer circumferential ring is obliquely abutted against the ratchet, and may also be abutted against the ratchet straightly from an outer side in the axial direction. The outer circumferential ring may be configured such that the coupling portion is coupled to the ratchet and the abutting portion is abutted against the guide from the outer side in the axial direction. Further, the coupling portion of the outer circumferential ring is coupled by crimping to one of the ratchet and the guide, and may also be coupled by welding. The cylindrical portion may be set on the ratchet, rather than the guide, so as to cover the guide in a manner surrounding from the outer circumferential side.

6. The eccentric structure of the pawl, that is, an eccentric structure that receives, due to the pressing force received from the cam, a force by which the pawl is pressed and inclined in one direction in the rotation direction between the pair of guide walls is a configuration in which the pawl is pressed outward from the inner side in the radial direction to a position at which the pawl is eccentric in the rotation direction by the cam, and may also be a configuration in which the pawl is pressed obliquely in the rotation direction by the cam.

7. It is sufficient for the second protrusion to be located at least outward in the radial direction than the first protrusion, and does not necessarily have to be located at a position of the radially outer end portion of the pawl. A protrusion shape and projection amount of each of the first protrusion and the second protrusion are appropriately determined by an arrangement of these pawls in the radial direction.

That is, a projection height required for the first protrusion reduces as the first protrusion approaches a position closer to the inner side in the radial direction of the pawl. Further a projection height required for the second protrusion reduces as the second protrusion approaches a position closer to the outer side in the radial direction of the pawl. Further, the pawl may have a configuration in which the pawl has only the first protrusion and does not have the second protrusion. One of the first protrusion and the second protrusion may be formed on the pawl and the other of the first protrusion and the second protrusion may be formed on the guide.

The present application is based on Japanese Patent Application No. 2019-084148, filed on Apr. 25, 2019 and Japanese Patent Application No. 2020-035602, filed on Mar. 3, 2020 the contents of which are incorporated herein by reference.

INDUSTRIAL APPLICABILITY

According to the vehicle seat reclining device of the present invention, the sliding performance of the pawl can be ensured and the rattling can be prevented at the same time. The present invention having the effect can be used, for example, as a seat reclining device used in a seat of an automobile or the like.

REFERENCE SIGNS LIST

1: seat
2: seat back
2F: side frame
2Fa: fitting hole
2Fb: penetrating hole
2Fc: locking plate
3: seat cushion
3F: reclining plate
3Fa: fitting hole
3Fb: penetrating hole
3Fc: front stopper
3Fd: rear stopper
4: seat reclining device (vehicle seat reclining device)
5: reclining lever
5A: operation pin
5B: connecting rod
6: return spring
10: ratchet
11: disk main body
11A: through hole
11B: expanded surface portion
12: cylindrical portion
12A: inner teeth
13: intermediate cylindrical portion
13A: first region 13B: second region
13C: third region
13D: first projection portion
13E: second projection portion
13E1: relief recess portion
Y: gap
13G: inclined surface
13H: projecting inclined surface
13H1: guide inclined surface
A1: lock region
A2: free region
A3: relief region
M: coupling region
14: dowel
B1: abutting region
B2: non-abutting region
20: guide
21: disk main body
21A: through hole
21Aa: hooking hole
21B: dowel
22: cylindrical portion
23: guide wall
23A: regulating surface
23B: support surface
23C: first protrusion
23D: second protrusion
23E: first protrusion
23F: second protrusion
M1: guide wall
M2: guide wall
T: gap
24A: pawl accommodating groove
24B: cam accommodating groove
30: pawl
30A: main body surface portion
30B: offset surface portion
31: outer teeth
32: pressed surface portion
33: pull-in hole
34: abutting protrusion
34A: outer circumferential surface portion
35A: first protrusion
35B: second protrusion
35C: first protrusion
35D: first protrusion
35E: second protrusion
P1: main pawl (specific pawl)
P2: sub-pawl
Q: accuracy control surface
40: rotation cam (cam)
41: through hole
42: pull-in pin
43: hook pin
44: pressing portion
50: lock spring
51: inner end portion
52: outer end portion
60: outer circumferential ring
61: coupling portion
61A: crimped portion
62: flange portion
62A: oblique abutting portion
63: stepped portion
C: rotation center
Pa: forward tilt position
Pb: initial lock position
Pc: rearward tilt position
Pd: torso angle
K: meshing point
R: pressing point
S: gap

The invention claimed is:

1. A vehicle seat reclining device comprising:
a ratchet and a guide assembled in an axial direction of the ratchet and the guide to be rotatable relative to each other;
a pawl supported from both sides in a rotation direction by a pair of guide walls provided on the guide, and configured to be meshed with the ratchet due to movement in which the pawl is pressed outward in a radial direction, so as to restrict the relative rotation between the ratchet and the guide; and
a cam configured to press and move the pawl outward from an inner side in the radial direction, wherein
the pawl has an eccentric structure in which the pawl is pressed and inclined to one side in the rotation direction between the pair of guide walls due to a pressing force received from the cam, and has a first protrusion that projects from a side surface of the pawl on the one side in the rotation direction and restricts the inclination of the pawl by contact with the guide wall that the first protrusion faces,
the pawl has a second protrusion that projects from a side surface of the pawl on the other side in the rotation direction and holds, by contact with the guide wall that the second protrusion faces, the pawl in a posture in which the pawl is in contact with both of the pair of guide walls, and
the second protrusion is located outward in the radial direction than the first protrusion.

2. The vehicle seat reclining device according to claim 1, wherein
the pawl has a main body surface portion that receives, from the inner side in the radial direction, the pressing force from the cam, and an offset surface portion that has a shape of being extruded from the main body surface portion into a half-punched shape in the axial direction and is disposed adjacently to the cam in the axial direction, and
the second protrusion has a shape in which a slope of the second protrusion extends over at least an entire area of the main body surface portion on the side surface of the pawl on the other side in the rotation direction.

3. The vehicle seat reclining device according to claim 1, wherein
a plurality of pawls are provided, and
the first protrusion is formed on at least one of the pawls.

4. The vehicle seat reclining device according to claim 1, wherein
the pawl has a main body surface portion that receives, from the inner side in the radial direction, the pressing force from the cam, and an offset surface portion that has a shape of being extruded from the main body surface portion into a half-punched shape in the axial direction and is disposed adjacently with the cam in the axial direction, and
the first protrusion has a shape in which a slope of the first protrusion extends over at least an entire area of the main body surface portion on the side surface of the pawl on the one side in the rotation direction.

5. A vehicle seat reclining device comprising:
a ratchet and a guide assembled in an axial direction to be rotatable relative to each other;

a pawl supported from both sides in a rotation direction by a pair of guide walls provided on the guide, and configured to be meshed with the ratchet due to movement in which the pawl is pressed outward in a radial direction, so as to restrict the relative rotation between the ratchet and the guide;

a cam configured to press and move the pawl outward from an inner side in the radial direction;

an eccentric structure in which the pawl is pressed and inclined to one side in the rotation direction between the pair of guide walls due to a pressing force received from the cam; and a first protrusion configured to project from the guide wall that faces a side surface of the pawl on the one side in the rotation direction and restrict the inclination of the pawl by contact with the pawl; and a second protrusion configured to project from the guide wall that faces a side surface of the pawl on the other side in the rotation direction and restrict the inclination of the pawl by contact with the pawl, so as to hold the pawl in a posture in which the pawl is in contact with both of the pair of guide walls.

6. The vehicle seat reclining device according to claim 5, wherein the second protrusion has a shape in which a slope of the second protrusion extends over an entire area of a side surface of the guide wall that faces the pawl.

7. The vehicle seat reclining device according to claim 5, wherein the first protrusion has a shape in which a slope of the first protrusion extends over an entire area of a side surface of the guide wall that faces the pawl.

* * * * *